US010152483B2

(12) United States Patent
Bowman et al.

(10) Patent No.: US 10,152,483 B2
(45) Date of Patent: *Dec. 11, 2018

(54) DISTRIBUTED DATA SET STORAGE AND RETRIEVAL

(71) Applicant: SAS Institute Inc., Cary, NC (US)

(72) Inventors: Brian Payton Bowman, Apex, NC (US); Steven E. Krueger, Raleigh, NC (US); Richard Todd Knight, Raleigh, NC (US); Chih-Wei Ho, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,570

(22) Filed: Nov. 6, 2017

(65) Prior Publication Data
US 2018/0075051 A1 Mar. 15, 2018

Related U.S. Application Data

(63) Continuation of application No. 15/220,182, filed on Jul. 26, 2016, now Pat. No. 9,811,524, which is a
(Continued)

(51) Int. Cl.
G06F 12/00 (2006.01)
G06F 13/00 (2006.01)
(Continued)

(52) U.S. Cl.
CPC ........ G06F 17/30097 (2013.01); G06F 3/061 (2013.01); G06F 3/0604 (2013.01);
(Continued)

(58) Field of Classification Search
CPC ........ G06F 3/0604; G06F 3/061; G06F 3/064; G06F 3/0643; G06F 3/0644; G06F 3/067;
(Continued)

(56) References Cited

U.S. PATENT DOCUMENTS 9,722,974 B1 8/2017 Fuller et al.
2010/0313040 A1 12/2010 Lumb
(Continued)

FOREIGN PATENT DOCUMENTS

WO 2017006118 A 1/2017

OTHER PUBLICATIONS

International Search Report received for PCT Patent Application No. PCT/US2017/052486, dated Dec. 11, 2017, 2 pages.
(Continued)

Primary Examiner — Shane Woolwine

(57) ABSTRACT

An apparatus includes a processor component caused to: retrieve metadata of organization of data within a data set, and map data of organization of data blocks within a data file; receive indications of which node devices are available to perform a processing task with a data set portion; and in response to the data set including partitioned data, compare the quantities of available node devices and of the node devices last involved in storing the data set. In response to a match, for each map data map entry: retrieve a hashed identifier for a data sub-block, and a size for each of the data sub-blocks within the corresponding data block; divide the hashed identifier by the quantity of available node devices; compare the modulo value to a designation assigned to each of the available node devices; and provide a pointer to the available node device assigned the matching designation.

30 Claims, 41 Drawing Sheets

Related U.S. Application Data continuation of application No. 15/220,034, filed on Jul. 26, 2016, now Pat. No. 9,619,148.

(60) Provisional application No. 62/197,514, filed on Jul. 27, 2015, provisional application No. 62/197,519, filed on Jul. 27, 2015.

(51) Int. Cl.
    *G06F 13/28*     (2006.01)
    *G06F 17/30*     (2006.01)
    *G06F 12/02*     (2006.01)
    *G06F 9/50*     (2006.01)
    *G06F 3/06*     (2006.01)

(52) U.S. Cl.
CPC .............. *G06F 3/064* (2013.01); *G06F 3/067* (2013.01); *G06F 3/0643* (2013.01); *G06F 3/0644* (2013.01); *G06F 9/5072* (2013.01); *G06F 9/5077* (2013.01); *G06F 12/0292* (2013.01); *G06F 17/302* (2013.01); *G06F 17/30312* (2013.01); *G06F 17/30584* (2013.01); *G06F 2212/1016* (2013.01); *G06F 2212/1056* (2013.01); *G06F 2212/154* (2013.01); *G06F 2212/262* (2013.01); *G06F 2212/263* (2013.01)

(58) Field of Classification Search
CPC ......... G06F 12/0292; G06F 2212/1016; G06F 2212/1056; G06F 2212/154; G06F 2212/262; G06F 2212/263; G06F 17/30097; G06F 17/0302; G06F 17/30312; G06F 17/30584; G06F 9/5072; G06F 9/5077; G06F 17/302
USPC .......................................... 711/135, 170–173
See application file for complete search history.

(56) References Cited

U.S. PATENT DOCUMENTS

| | | |
|---|---|---|
| 2011/0107112 A1 | 5/2011 | Resch |
| 2013/0275776 A1 | 10/2013 | Baptist et al. |
| 2013/0291080 A1 | 10/2013 | Somerfield et al. |
| 2015/0134796 A1* | 5/2015 | Theimer ........... G06F 17/30569 709/223 |
| 2015/0339210 A1* | 11/2015 | Kopp ................. G06F 11/3495 718/100 |
| 2017/0031937 A1 | 2/2017 | Bowman et al. |
| 2017/0169223 A1 | 6/2017 | Lin et al. |

OTHER PUBLICATIONS

Notice of Allowance received for U.S. Appl. No. 15/694,674, dated Dec. 18, 2017, 13 pages.

* cited by examiner

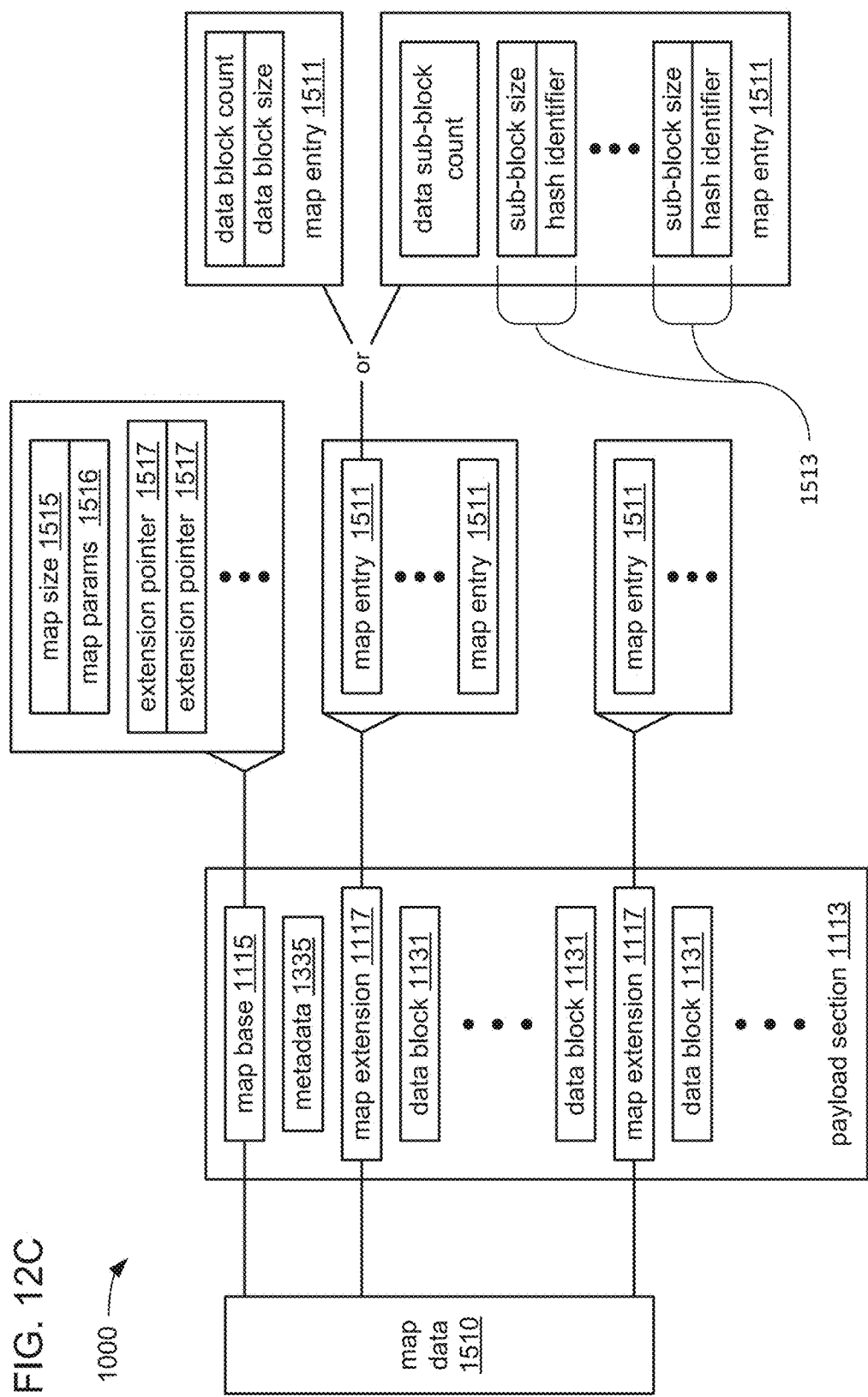

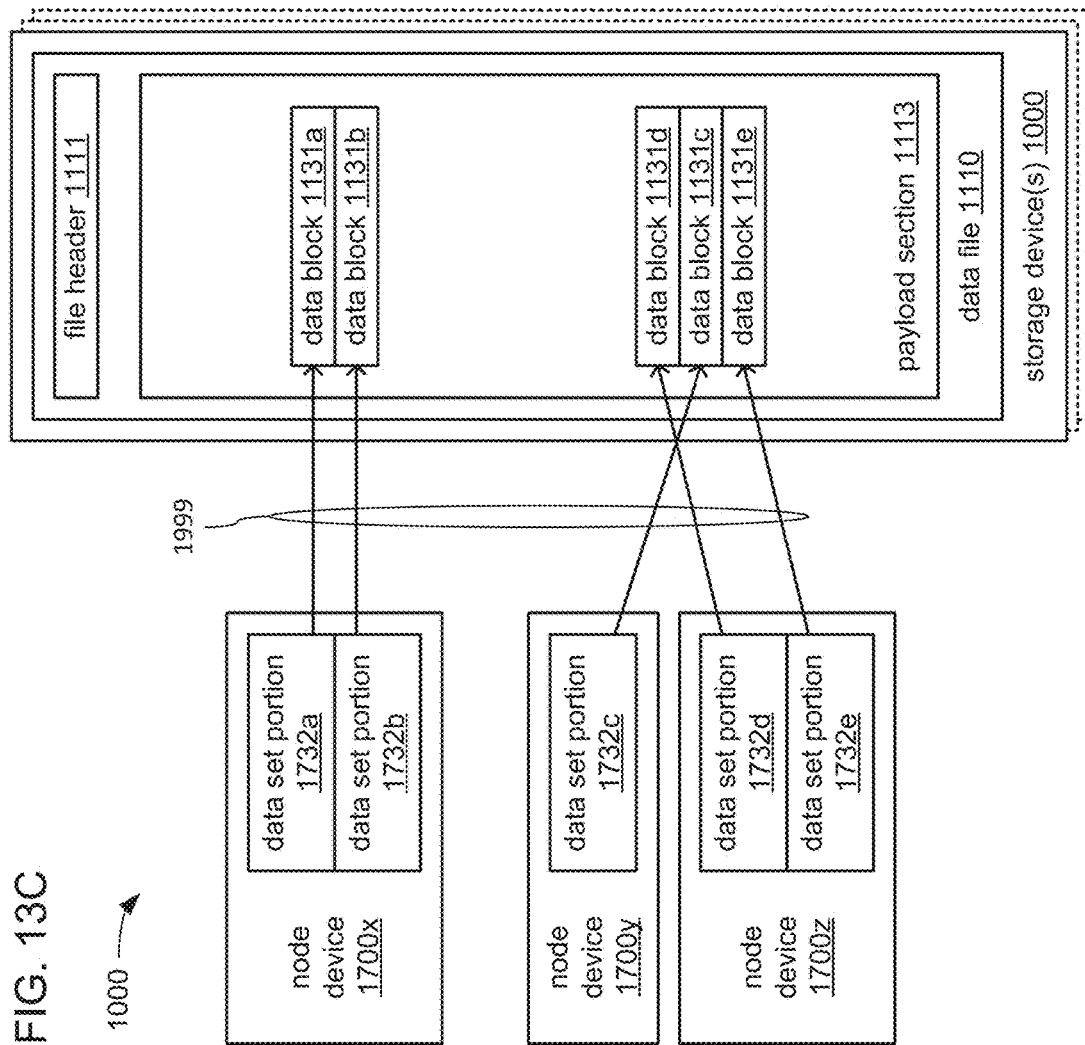

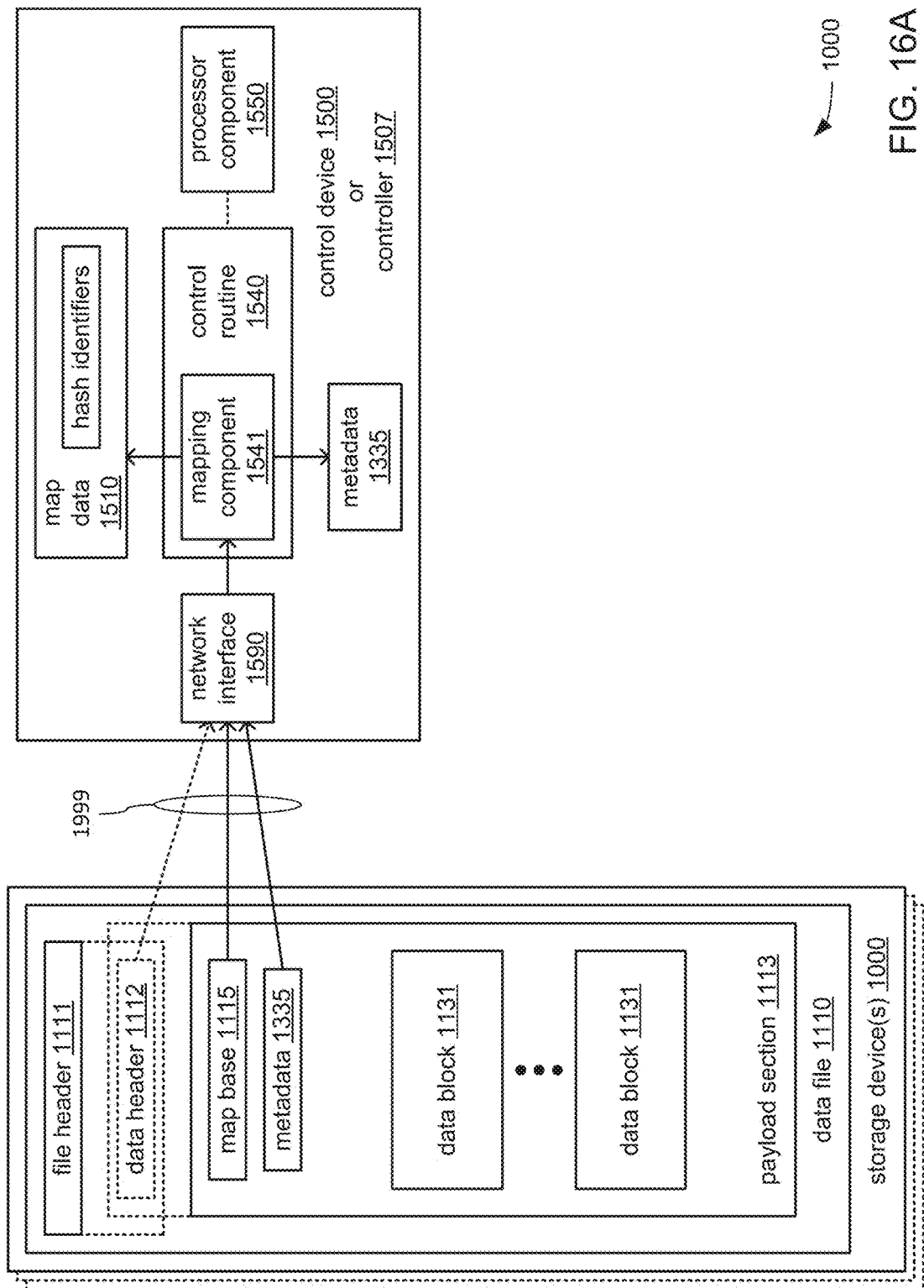

2100

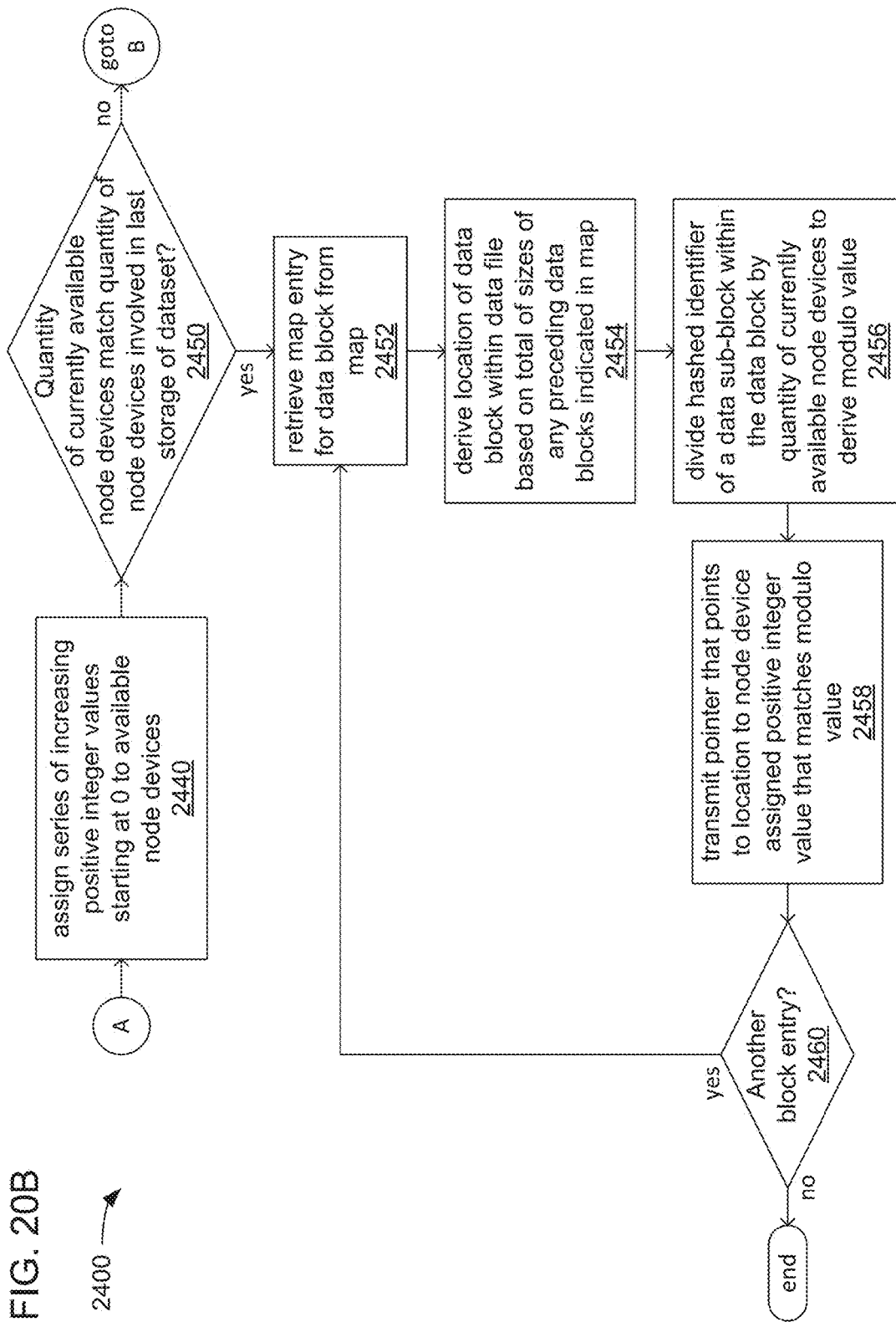

DISTRIBUTED DATA SET STORAGE AND RETRIEVAL

CROSS-REFERENCE TO RELATED APPLICATIONS

This application is a continuation under 35 U.S.C. § 120 of U.S. application Ser. No. 15/220,182 filed Jul. 26, 2016, which is a continuation under 35 U.S.C. § 120 of U.S. application Ser. No. 15/220,034 also filed Jul. 26, 2016 (and issued Apr. 11, 2017 as U.S. Pat. No. 9,619,148), which claims the benefit of priority under 35 U.S.C. § 119(e) to U.S. Provisional Application Ser. No. 62/197,514 filed Jul. 27, 2015, and U.S. Provisional Application Ser. No. 62/197,519 also filed Jul. 27, 2015. The disclosures of U.S. application Ser. No. 15/220,182, U.S. application Ser. No. 15/220,034, U.S. Provisional Application Ser. No. 62/197,514, and U.S. Provisional Application Ser. No. 62/197,519 are hereby incorporated herein by reference in their respective entireties for all purposes.

TECHNICAL FIELD

Various embodiments described herein are generally directed to inter-device coordination and data set organization to improve distributed storage and retrieval of a data set processed by multiple node devices.

BACKGROUND

The performance of analyses of large data sets (e.g., what is commonly referred to as "big data") is becoming increasingly commonplace in such areas as simulations, process monitoring, decision making, behavioral modeling and making predictions. Such analysis are often performed by grids of varying quantities of available node devices, while the data sets are often stored within a separate set of storage devices. This begets the challenge of efficiently exchanging such large data sets between storage devices and varying ones of the node devices among a grid of node devices.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus may include a processor component and a storage to store instructions that, when executed by the processor component, may cause the processor component to retrieve, from one or more storage devices through a network, metadata indicative of organization of data within a data set, and map data indicative of organization of multiple data blocks within a data file maintained by the one or more storage devices, wherein the map data includes multiple map entries, and each map entry of the multiple map entries corresponds to one or more data blocks of the multiple data blocks; and receive, from multiple node devices, indications of which node devices among the multiple node devices are available node devices that are each able to perform a processing task with at least one data set portion of the one or more data set portions. In response to an indication within the metadata or the map data that the data set includes partitioned data wherein the data within the data set is organized into multiple partitions that are each distributable to a single node device, and each map entry corresponds to a single data block, the processor component may be caused to perform operations including: determine a first quantity of the available node devices based on the indications of which node devices are available node devices; retrieve a second quantity of node devices last involved in storage of the data set within the data file from the metadata or the map data; compare the first and second quantities of node devices to detect a match between the first and second quantities; and assign each of the available node devices one of a series of positive integer values as a designation value, wherein the series extends from an integer value of 0 to a positive integer value equal to the first quantity minus the integer value of 1. Additionally, in response to detection of a match between the first and second quantities, for each map entry of the map data, the processor component may be caused to perform operations including: retrieve, from the map entry, a hashed identifier for one data sub-block indicated in the map entry as within the corresponding data block, and a data sub-block size for each of the data sub-blocks indicated in the map entry as within the corresponding data block, wherein the hashed identifier is derived from a partition label of a partition of the multiple partitions and the data sub-block includes a data set portion of the one or more data set portions; determine a location of the corresponding data block within the data file; divide the hashed identifier by the first quantity to obtain a modulo value; compare the modulo value to the designation value assigned to each of the available node devices to identify an available node device assigned a designation value that matches the modulo value; and provide a pointer to the available node device assigned the designation value that matches the modulo value, the pointer including an indication of the location of the corresponding data block, and a sum of the data sub-block sizes of all of the data sub-blocks within the corresponding data block.

In response to the indication that the data set includes partitioned data and in response to detection of a lack of a match between the first and second quantities, the processor component may, for each indication within each map entry of a data sub-block within a corresponding data block, be caused to perform operations including: retrieve, from the map entry, the data sub-block size and hashed identifier of the data sub-block; determine a location of the data sub-block within the data file; divide the hashed identifier by the first quantity to obtain a modulo value; compare the modulo value to the designation value assigned to each of the available node devices to identify an available node device assigned a designation value that matches the modulo value; and provide a pointer to the available node device assigned the designation value that matches the modulo value, wherein the pointer includes an indication of the location of the data sub-block and the data sub-block size.

In response to an indication within the metadata or the map data that the data set does not include partitioned data, for each map entry of the map data, the processor component may retrieve, from the map entry, a data block size and a data block quantity, wherein the data block quantity indicates a quantity of adjacent data blocks in the data file that correspond to the map entry. The processor component may also, for each data block that corresponds to the map entry, perform operations including: determine a location of the corresponding data block within the data file; select one of the available node devices; and provide a pointer to the selected one of the available node devices, the pointer including an indication of the location of the corresponding data block, and the data block size. The selection of one of the available node devices may include a round robin selection of one of the available node devices.

The apparatus may include one of the available node devices. The processor component may be caused to perform a processing task with at least one data set portion retrieved from the data file as the one of the available node devices at least partially in parallel with at least one other of the available node devices.

To retrieve the map data from the one or more storage devices, the processor component may be caused to perform operations including: retrieve a map base from the data file; analyze the map base to determine whether at least a portion of the map data is stored within one or more map extensions within the data file; and in response to a determination that at least a portion of the map data is stored within one or more map extensions, retrieve the one or more map extensions from the data file and retrieve at least a subset of the map entries from the one or more map extensions. In response to a determination that no portion of the map data is stored within one or more map extensions, the processor may be caused to retrieve all of the map entries from the map base.

To receive indications of which node devices among the multiple node devices are available, the processor component may be caused to perform operations including: recurringly receive indications of status from the multiple node devices; and recurringly update a stored indication of the availability of each node device of the multiple node devices. The processor component may be caused to perform operations including provide an indication of a task to perform with the data set to the multiple node devices to enable at least a first node device of the multiple node devices to perform the task with a first data set portion of the data set and at least a second node device of the multiple node devices to perform the task with a second data set portion of the data set at least partially in parallel.

A computer-program product tangibly embodied in a non-transitory machine-readable storage medium, the computer-program product including instructions operable to cause a processor component to perform operations including: retrieve, from one or more storage devices through a network, metadata indicative of organization of data within a data set, and map data indicative of organization of multiple data blocks within a data file maintained by the one or more storage devices, wherein the map data includes multiple map entries, and each map entry of the multiple map entries corresponds to one or more data blocks of the multiple data blocks; and receive, from multiple node devices, indications of which node devices among the multiple node devices are available node devices that are each able to perform a processing task with at least one data set portion of the one or more data set portions. In response to an indication within the metadata or the map data that the data set includes partitioned data wherein the data within the data set is organized into multiple partitions that are each distributable to a single node device, and each map entry corresponds to a single data block, the processor component may be caused to perform operations including: determine a first quantity of the available node devices based on the indications of which node devices are available node devices; retrieve a second quantity of node devices last involved in storage of the data set within the data file from the metadata or the map data; compare the first and second quantities of node devices to detect a match between the first and second quantities; and assign each of the available node devices one of a series of positive integer values as a designation value, wherein the series extends from an integer value of 0 to a positive integer value equal to the first quantity minus the integer value of 1. In response to detection of a match between the first and second quantities, for each map entry of the map data, the processor component may be caused to perform operations including: retrieve, from the map entry, a hashed identifier for one data sub-block indicated in the map entry as within the corresponding data block, and a data sub-block size for each of the data sub-blocks indicated in the map entry as within the corresponding data block, wherein the hashed identifier is derived from a partition label of a partition of the multiple partitions and the data sub-block includes a data set portion of the one or more data set portions; determine a location of the corresponding data block within the data file; divide the hashed identifier by the first quantity to obtain a modulo value; compare the modulo value to the designation value assigned to each of the available node devices to identify an available node device assigned a designation value that matches the modulo value; and provide a pointer to the available node device assigned the designation value that matches the modulo value, wherein the pointer includes an indication of the location of the corresponding data block and a sum of the data sub-block sizes of all of the data sub-blocks within the corresponding data block.

In response to the indication that the data set includes partitioned data and in response to detection of a lack of a match between the first and second quantities, the processor component may, for each indication within each map entry of a data sub-block within a corresponding data block, perform operations including: retrieve, from the map entry, the data sub-block size and hashed identifier of the data sub-block; determine a location of the data sub-block within the data file; divide the hashed identifier by the first quantity to obtain a modulo value; compare the modulo value to the designation value assigned to each of the available node devices to identify an available node device assigned a designation value that matches the modulo value; and provide a pointer to the available node device assigned the designation value that matches the modulo value, wherein the pointer includes an indication of the location of the data sub-block and the data sub-block size.

In response to an indication within the metadata or the map data that the data set does not include partitioned data, for each map entry of the map data, the processor component may retrieve, from the map entry, a data block size and a data block quantity, wherein the data block quantity indicates a quantity of adjacent data blocks in the data file that correspond to the map entry. The processor component may also, for each data block that corresponds to the map entry, perform operations including: determine a location of the corresponding data block within the data file; select one of the available node devices; and provide a pointer to the selected one of the available node devices, wherein the pointer includes an indication of the location of the corresponding data block and the data block size. The selection of one of the available node devices includes a round robin selection of one of the available node devices. The processor component may be caused to employ, in response to the data set not including partitioned data, the indication of the location and data block size of a data block corresponding to one of the map entries to retrieve the data block from the data file as one of the available node devices at least partially in parallel with at least one other of the available node devices. The processor component may be caused to perform a processing task with the data block as the one of the available node devices at least partially in parallel with at least one other of the available node devices.

To retrieve the map data from the one or more storage devices, the processor component may be caused to perform operations including: retrieve a map base from the data file; analyze the map base to determine whether at least a portion of the map data is stored within one or more map extensions within the data file; and in response to a determination that at least a portion of the map data is stored within one or more map extensions, retrieve the one or more map extensions from the data file and retrieve at least a subset of the map entries from the one or more map extensions. In response to a determination that no portion of the map data is stored within one or more map extensions, the processor component may be caused to perform operations including retrieve all of the map entries from the map base.

To receive indications of which node devices among the multiple node devices are available, the processor component may be caused to perform operations including: recurringly receive indications of status from the multiple node devices; and recurringly update a stored indication of the availability of each node device of the multiple node devices. The processor component may be caused to perform operations including: provide an indication of a task to perform with the data set to the multiple node devices to enable at least a first node device of the multiple node devices to perform the task with a first data set portion of the data set; and perform the task with a second data set portion of the data set, as a second node device, at least partially in parallel with the performance of the task by the first node device.

A computer-implemented method may include: retrieving, from one or more storage devices through a network, metadata indicative of organization of data within a data set, and map data indicative of organization of multiple data blocks within a data file maintained by the one or more storage devices, wherein the map data includes multiple map entries and each map entry of the multiple map entries corresponds to one or more data blocks of the multiple data blocks; and receiving, from multiple node devices, indications of which node devices among the multiple node devices are available node devices that are each able to perform a processing task with at least one data set portion of the one or more data set portions. In response to an indication within the metadata or the map data that the data set includes partitioned data wherein the data within the data set is organized into multiple partitions that are each distributable to a single node device, and each map entry corresponds to a single data block, the method may include: determining a first quantity of the available node devices based on the indications of which node devices are available node devices; retrieving a second quantity of node devices last involved in storage of the data set within the data file from the metadata or the map data; comparing the first and second quantities of node devices to detect a match between the first and second quantities; and assigning each of the available node devices one of a series of positive integer values as a designation value, wherein the series extends from an integer value of 0 to a positive integer value equal to the first quantity minus the integer value of 1. In response to detection of a match between the first and second quantities, the method may include, for each map entry of the map data: retrieving, from the map entry, a hashed identifier for one data sub-block indicated in the map entry as within the corresponding data block, and a data sub-block size for each of the data sub-blocks indicated in the map entry as within the corresponding data block, wherein the hashed identifier is derived from a partition label of a partition of the multiple partitions, and the data sub-block includes a data set portion of the one or more data set portions; determining a location of the corresponding data block within the data file; dividing the hashed identifier by the first quantity to obtain a modulo value; comparing the modulo value to the designation value assigned to each of the available node devices to identify an available node device assigned a designation value that matches the modulo value; and providing a pointer to the available node device assigned the designation value that matches the modulo value, wherein the pointer includes an indication of the location of the corresponding data block and a sum of the data sub-block sizes of all of the data sub-blocks within the corresponding data block.

In response to the indication that the data set includes partitioned data and in response to detection of a lack of a match between the first and second quantities, the method may include, for each indication within each map entry of a data sub-block within a corresponding data block: retrieving, from the map entry, the data sub-block size and hashed identifier of the data sub-block; determining a location of the data sub-block within the data file; dividing the hashed identifier by the first quantity to obtain a modulo value; comparing the modulo value to the designation value assigned to each of the available node devices to identify an available node device assigned a designation value that matches the modulo value; and providing a pointer to the available node device assigned the designation value that matches the modulo value, wherein the pointer includes an indication of the location of the data sub-block and the data sub-block size.

In response to an indication within the metadata or the map data that the data set does not include partitioned data, the method may include, for each map entry of the map data, retrieving, from the map entry, a data block size and a data block quantity, wherein the data block quantity indicates a quantity of adjacent data blocks in the data file that correspond to the map entry. The method may also include, for each data block that corresponds to the map entry: determining a location of the corresponding data block within the data file; selecting one of the available node devices; and providing a pointer to the selected one of the available node devices, wherein the pointer includes an indication of the location of the corresponding data block and the data block size. Selecting one of the available node devices may include a round robin selection of one of the available node devices.

In response to the data set including partitioned data, the method may include acting as one of the available node devices by employing the indication of the location and data block size of a data block corresponding to one of the map entries to retrieve the data block from the data file at least partially in parallel with at least one other of the available node devices. The method may include performing a processing task with each data sub-block within the data block as the one of the available node devices at least partially in parallel with at least one other of the available node devices.

Retrieving the map data from the one or more storage devices may include: retrieving a map base from the data file; analyzing the map base to determine whether at least a portion of the map data is stored within one or more map extensions within the data file; and in response to a determination that at least a portion of the map data is stored within one or more map extensions, retrieving the one or more map extensions from the data file, and retrieving at least a subset of the map entries from the one or more map extensions. Retrieving the map data from the one or more storage devices may include, in response to a determination that no portion of the map data is stored within one or more map extensions, retrieving all of the map entries from the map base.

Receiving indications of which node devices among the multiple node devices are available may include: recurringly receiving indications of status from the multiple node devices; and recurringly updating a stored indication of the availability of each node device of the multiple node devices. The method may include providing an indication of a task to perform with the data set to the multiple node devices to enable at least a first node device of the multiple node devices to perform the task with a first data set portion of the data set and at least a second node device of the multiple node devices to perform the task with a second data set portion of the data set at least partially in parallel.

An apparatus may include a processor component and a storage to store instructions that, when executed by the processor component, may cause the processor component to perform operations including: receive, from at least one node device of multiple node devices, at least a portion of metadata indicative of organization of data within a data set; receive, from the multiple node devices, indications of which node devices among the multiple node devices are to be involved in a storage of the data set as multiple data blocks within a data file maintained by one or more storage devices, wherein the organization of the multiple data blocks within the data file is indicated in map data that includes multiple map entries, and each map entry of the multiple map entries corresponds to one or more data blocks of the multiple data blocks; and receive, from each node device involved in the storage of the data set, a request for a pointer to a location within the data file at which the node device is to store at least one data set portion as a data block. In response to an indication received from the at least one node device that the data set includes partitioned data, wherein the data within the data set is organized into multiple partitions that are each distributable to a single node device and each map entry corresponds to a single data block, the processor component may be caused, for each request for a pointer received from a node device involved in the storage of the data set, to perform operations including: determine the location within the data file at which the node device is to store the data block; generate a map entry within the map data that corresponds to the data block; generate within the map entry a data sub-block count indicative of a quantity of data sub-blocks to be stored by the node device within the data block, wherein each data sub-block includes a data set portion of the data set that is to be stored by the node device; generate within the map entry a separate map sub-entry for each of the data sub-blocks, wherein each map sub-entry includes a sub-block size indicative of a size of a corresponding data set portion and a hashed identifier derived from a partition label of the partition to which the corresponding data set portion belongs; and provide a pointer to the node device, the pointer including an indication of the location at which the node device is to store the data block in the data file. In response to successful storage of all data blocks of the data set within the data file by all of the node devices involved in the storage of the data set, the processor component may be caused to store the map data in the data file.

In response to a lack of indication received from the at least one node device that the data set includes partitioned data, the processor component may, for each request for a pointer received from a node device involved in the storage of the data set, be caused to perform operations including: determine the location within the data file at which the node device is to store the data block; compare a data block size of the data block to a data block size indicated in the map data for an adjacent data block to be stored by another node device of the multiple node devices at an adjacent location within the data file to detect a match between the two data block sizes; in response to detection of a match between the two data block sizes, increment a data block count of a map entry within the map data that corresponds to the adjacent data block; in response to detection of a lack of a match between the two data block sizes, generate a new map entry within the map data that corresponds to the data block, wherein the new map entry includes a data block count indicative of correspondence to a single data block and a data block size indicative of the size of the data block; and provide a pointer to the node device, the pointer including an indication of the location at which the node device is to store the data block in the data file.

The at least a portion of the metadata may include the indication received from the at least one node device that the data set includes partitioned data. Each node device involved in the storage of the data set may be required to generate a single request for a pointer for the storage of all data set portions distributed to the node device; and the processor component may be caused to determine that all pointers have been generated for the storage of all data set portions of the data set in the data file by all of the node devices involved in the storage of the data set based on reception of a single request for a pointer from each node device involved in the storage of the data set. The apparatus may include one of the node devices involved in the storage of the data set. To receive indications of which node devices among the multiple node devices are involved in the storage of the data set within the data file, the processor component may be caused to perform operations including: recurringly receive indications of status from each node device of the multiple node devices; and recurringly update a stored indication of whether each node device of the multiple node devices is involved in the storage of the data set.

To store the map data in the data file, the processor component may be caused to determine whether a size of the map data exceeds a predetermined data size. In response to a determination that the size of the map data exceeds the predetermined data size, the processor component may also be caused to perform operations including: divide the map data into one or more map extensions; store the one or more map extensions within the data file at locations dispersed among the data blocks stored by node devices involved in the storage of the data set; and store, within the data file, a map base including one or more pointers to the location of each map extension within the data file. A size of each map extension stored within the data file at a location following a first one of the map extensions may be twice the size of a preceding map extension.

The processor component may be caused to perform operations including provide an indication of a task to perform with the data set to the node devices involved in the storage of the data set to enable at least a first node device of the multiple node devices to perform the task with a first data set portion of the data set and at least a second node device of the multiple node devices to perform the task with a second data set portion of the data set at least partially in parallel. Each hashed identifier may include an integer value derived from a hash taken of a partition label that uniquely identifies one of the partitions of the multiple partitions.

A computer-program product tangibly embodied in a non-transitory machine-readable storage medium, the computer-program product including instructions operable may cause a processor component to perform operations including: receive, from at least one node device of multiple node devices, at least a portion of metadata indicative of organization of data within a data set; receive, from the multiple node devices, indications of which node devices among the multiple node devices are to be involved in a storage of the data set as multiple data blocks within a data file maintained by one or more storage devices, wherein the organization of the multiple data blocks within the data file is indicated in map data that includes multiple map entries, and each map entry of the multiple map entries corresponds to one or more data blocks of the multiple data blocks; and receive, from each node device involved in the storage of the data set, a request for a pointer to a location within the data file at which the node device is to store at least one data set portion as a data block. In response to an indication received from the at least one node device that the data set includes partitioned data, wherein the data within the data set is organized into multiple partitions that are each distributable to a single node device and each map entry corresponds to a single data block, the processor component may be caused, for each request for a pointer received from a node device involved in the storage of the data set, to perform operations including: determine the location within the data file at which the node device is to store the data block; generate a map entry within the map data that corresponds to the data block; generate within the map entry a data sub-block count indicative of a quantity of data sub-blocks to be stored by the node device within the data block, wherein each data sub-block includes a data set portion of the data set that is to be stored by the node device; generate within the map entry a separate map sub-entry for each of the data sub-blocks, wherein each map sub-entry includes a sub-block size indicative of a size of a corresponding data set portion and a hashed identifier derived from a partition label of the partition to which the corresponding data set portion belongs; and provide a pointer to the node device, the pointer including an indication of the location at which the node device is to store the data block in the data file. In response to successful storage of all data blocks of the data set within the data file by all of the node devices involved in the storage of the data set, the processor component may be caused to store the map data in the data file.

In response to a lack of indication received from the at least one node device that the data set includes partitioned data, the processor component may, for each request for a pointer received from a node device involved in the storage of the data set, be caused to perform operations including: determine the location within the data file at which the node device is to store the data block; compare a data block size of the data block to a data block size indicated in the map data for an adjacent data block to be stored by another node device of the multiple node devices at an adjacent location within the data file to detect a match between the two data block sizes; in response to detection of a match between the two data block sizes, increment a data block count of a map entry within the map data that corresponds to the adjacent data block; in response to detection of a lack of a match between the two data block sizes, generate a new map entry within the map data that corresponds to the data block, wherein the new map entry includes a data block count indicative of correspondence to a single data block and a data block size indicative of the size of the data block; and provide a pointer to the node device, the pointer including an indication of the location at which the node device is to store the data block in the data file.

The at least a portion of the metadata may include the indication received from the at least one node device that the data set includes partitioned data. Each node device involved in the storage of the data set may be required to generate a single request for a pointer for the storage of all data set portions distributed to the node device; and the processor component may be caused to determine that all pointers have been generated for the storage of all data set portions of the data set in the data file by all of the node devices involved in the storage of the data set based on reception of a single request for a pointer from each node device involved in the storage of the data set. The processor component may be caused to perform operations including: request, as one of the node devices involved in the storage of the data set, a pointer to a location within the data file at which to store at least one data set portion as a data block; generate a pointer in response to the request; and store, as one of the node devices involved in the storage of the data set, the at least one data set portion at a location within the data file indicated by the pointer at least partially in parallel with storage of at least one other data set portion by another node device involved in the storage of the data set. To receive indications of which node devices among the multiple node devices are involved in the storage of the data set within the data file, the processor component may be caused to perform operations including: recurringly receive indications of status from each node device of the multiple node devices; and recurringly update a stored indication of whether each node device of the multiple node devices is involved in the storage of the data set.

To store the map data in the file, the processor component may be caused to determine whether a size of the map data exceeds a predetermined data size. In response to a determination that the size of the map data exceeds the predetermined data size, the processor component may also be caused to: divide the map data into one or more map extensions; store the one or more map extensions within the data file at locations dispersed among the data blocks stored by node devices involved in the storage of the data set; and store, within the data file, a map base including one or more pointers to the location of each map extension within the data file. A size of each map extension stored within the data file at a location following a first one of the map extensions is twice the size of a preceding map extension.

The processor component may be caused to perform operations including: provide an indication of a task to perform with the data set to each node device involved in the storage of the data set to enable at least a first node device involved in the storage of the data set to perform the task with a first data set portion of the data set; and perform the task with a second data set portion of the data set, as a second node device involved in the storage of the data set, at least partially in parallel with the performance of the task by the first node device. Each hashed identifier may include an integer value derived from a hash taken of a partition label that uniquely identifies one of the partitions of the multiple partitions.

A computer-implemented method may include: receiving, from at least one node device of multiple node devices via a network, at least a portion of metadata indicative of organization of data within a data set; receiving, from the multiple node devices via the network, indications of which node devices among the multiple node devices are to be involved in a storage of the data set as multiple data blocks within a data file maintained by one or more storage devices, wherein the organization of the multiple data blocks within the data file is indicated in map data that includes multiple map entries, and each map entry of the multiple map entries corresponds to one or more data blocks of the multiple data blocks; and receiving, from each node device involved in the storage of the data set via the network, a request for a pointer to a location within the data file at which the node device is to store at least one data set portion as a data block. In response to an indication received via the network from the at least one node device that the data set includes partitioned data, wherein the data within the data set is organized into multiple partitions that are each distributable to a single node device and each map entry corresponds to a single data block, for each request for a pointer received from a node device involved in the storage of the data set, the method may include: determining the location within the data file at which the node device is to store the data block; generating a map entry within the map data that corresponds to the data block; generating within the map entry a data sub-block count indicative of a quantity of data sub-blocks to be stored by the node device within the data block, wherein each data sub-block includes a data set portion of the data set that is to be stored by the node device; generating within the map entry a separate map sub-entry for each of the data sub-blocks, wherein each map sub-entry includes a sub-block size indicative of a size of a corresponding data set portion and a hashed identifier derived from a partition label of the partition to which the corresponding data set portion belongs; and providing a pointer to the node device via the network, the pointer including an indication of the location at which the node device is to store the data block in the data file. In response to successful storage of all data blocks of the data set within the data file by all of the node devices involved in the storage of the data set, the method may include storing the map data in the data file.

In response to a lack of indication received from the at least one node device that the data set includes partitioned data, the method may include, for each request for a pointer received from a node device involved in the storage of the data set: determining the location within the data file at which the node device is to store the data block; comparing a data block size of the data block to a data block size indicated in the map data for an adjacent data block to be stored by another node device of the multiple node devices at an adjacent location within the data file to detect a match between the two data block sizes; in response to detecting a match between the two data block sizes, incrementing a data block count of a map entry within the map data that corresponds to the adjacent data block; in response to detecting a lack of a match between the two data block sizes, generating a new map entry within the map data that corresponds to the data block, wherein the new map entry includes a data block count indicative of correspondence to a single data block and a data block size indicative of the size of the data block; and providing a pointer to the node device via the network, wherein the pointer includes an indication of the location at which the node device is to store the data block in the data file.

At least a portion of the metadata may include the indication received from the at least one node device that the data set includes partitioned data. Each node device involved in the storage of the data set may be required to generate a single request for a pointer for the storage of all data set portions distributed to the node device; and the method may include determining that all pointers have been generated for the storage of all data set portions of the data set in the data file by all of the node devices involved in the storage of the data set based on receiving a single request for a pointer from each node device involved in the storage of the data set. The method may include: requesting, as one of the node devices involved in the storage of the data set, a pointer to a location within the data file at which to store at least one data set portion as a data block; generating a pointer in response to the requesting; and storing, as one of the node devices involved in the storage of the data set, the at least one data set portion at a location within the data file indicated by the pointer at least partially in parallel with storing of at least one other data set portion by another node device involved in the storage of the data set. Receiving indications of which node devices among the multiple node devices are involved in the storage of the data set within the data file may include: recurringly receiving indications of status from each node device of the multiple node devices via the network; and recurringly updating a stored indication of whether each node device of the multiple node devices is involved in the storage of the data set.

Storing the map data in the file may include determining whether a size of the map data exceeds a predetermined data size. In response to determining that the size of the map data exceeds the predetermined data size, the method may also include: dividing the map data into one or more map extensions; storing the one or more map extensions within the data file at locations dispersed among the data blocks stored by node devices involved in the storage of the data set; and storing, within the data file, a map base including one or more pointers to the location of each map extension within the data file. A size of each map extension stored within the data file at a location following a first one of the map extensions may be twice the size of a preceding map extension.

The method may include providing an indication of a task to perform with the data set to the node devices involved in the storage of the data set to enable at least a first node device of the multiple node devices to perform the task with a first data set portion of the data set and at least a second node device of the multiple node devices to perform the task with a second data set portion of the data set at least partially in parallel. Each hashed identifier may include an integer value derived from a hash taken of a partition label that uniquely identifies one of the partitions of the multiple partitions.

An apparatus including a processor component and a storage to store instructions that, when executed by the processor component, cause the processor component to perform operations including: provide, to a control device, an indication of being currently available to participate in a performance of a processing task as a node device among multiple node devices; receive, from the control device, an indication of the processing task to perform with one or more data set portions of multiple data set portions of a data set, wherein the data set includes data organized in a manner indicated in metadata; perform the processing task with the one or more data set portions; and provide a request to the control device for a pointer to a location at which to store the one or more data set portions as a data block of multiple data blocks within a data file maintained by one or more storage devices, wherein the multiple data blocks are organized within the data file in a manner indicated in map data that includes multiple map entries, and each map entry of the multiple map entries corresponds to one or more data blocks of the multiple data blocks. In response to an indication in the metadata that the data set includes partitioned data, wherein the data within the data set is organized into multiple partitions that are each distributable to a single node device and each map entry corresponds to a single data block, the processor component is caused to perform operations including: for each data set portion of the one or more data set portions, include a data sub-block size indicative of a size of the data set portion in the request, derive a hashed identifier of a partition label of the partition to which the data set portion belongs of the multiple partitions, and include the hashed identifier in the request; receive, from the control device, the requested pointer indicating the location within the data file at which to store the data block; and store each data set portion of the one or more data set portions as a data sub-block within the data block starting at the location within the data file.

In response to a lack of indication in the metadata that the data set includes partitioned data, the processor component may be caused to perform operations including: derive a sum of sizes each data set portion of the one or more data set portions; include the sum of sizes as a data block size of the data block in the request; receive, from the control device, the requested pointer indicating the location within the data file at which to store the data block; and store the one or more data set portions together as the data block at the location within the data file. The processing task may include generation of the data set as an output, and the processor component may be caused to generate at least a portion of the metadata and to provide the at least a portion of the metadata to the control device. The processing task includes use of the data set as an input; and the processor component may be caused to receive the metadata from the control device.

The processor component may include multiple processor cores, and may be caused to perform the processing task with each data set portion of the one or more data set portions using a separate one of the multiple processor cores at least partially in parallel. The processor component may be caused to perform the processing task with at least one data set portion of the one or more data set portions at least partially in parallel with a performance, by at least one other node device of the multiple node devices, of the processing task with at least one other data set portion of the multiple data set portions. Each node device of the multiple node devices may be required to generate a single request for a pointer for all data set portions with which the processing task is performed by each node device; and the processor component may be caused to generate the request to be associated with all of the data set portions of the one or more data set portions with which the processor component performs the processing task.

The processor component may be caused to store the one or more data portions within the data block within the data file at least partially in parallel with storage of at least one other data set portion of the multiple data set portions by at least one other node device of the multiple node devices. The processor component may be caused to, in response to completion of storage of the one or more data set portions within the data block within the data file, provide an indication of the completion of the storage to the control device.

The node device may include a separate and distinct device from any of the one or more storage devices; the node device includes the control device implemented as a controller within the node device; and the controller includes a controller processor component and a controller storage to store controller instructions that, when executed by the controller processor component, cause the controller processor component to perform operations including determine the location within the data file at which to store the data block indicated by the requested pointer, and provide the requested pointer to the processor component. In response to the indication in the metadata that the data set includes partitioned data, the controller processor component may be caused to: generate a map entry within the map data that corresponds to the data block; generate within the map entry a data sub-block count indicative of a quantity of data sub-blocks to be stored by the node device within the data block, wherein each data sub-block includes a data set portion of the one or more data set portions; and generate within the map entry a separate map sub-entry for each of the data sub-blocks, wherein each map sub-entry includes a sub-block size indicative of a size of a corresponding data set portion and a hash identifier derived from a partition label of the partition to which the corresponding data set portion belongs. In response to generation of all pointers for the storage of all data set portions of the data set in the data file by all of the multiple node devices, the controller processor component may also be caused to store the map data in the data file. In response to a lack of indication in the metadata that the data set includes partitioned data, the controller processor component may be caused to perform operations including: compare a data block size of the data block to a data block size of an adjacent data block to be stored by another node device of the multiple node devices at an adjacent location within the data file to detect a match between the two data block sizes; in response to detection of a match between the two data block sizes, increment a data block count of a map entry within the map data that corresponds to the adjacent data block; and in response to detection of a lack of a match between the two data block sizes, generate a new map entry within the map data that corresponds to the data block, wherein the new map entry includes a data block count indicative of correspondence to a single data block and a data block size indicative of the size of the data block.

A computer-program product tangibly embodied in a non-transitory machine-readable storage medium, the computer-program product including instructions operable to cause a processor component to perform operations including: provide, to a control device, an indication of being currently available to participate in a performance of a processing task as a node device among multiple node devices; receive, from the control device, an indication of the processing task to perform with one or more data set portions of multiple data set portions of a data set, wherein the data set includes data organized in a manner indicated in metadata; perform the processing task with the one or more data set portions; and provide a request to the control device for a pointer to a location at which to store the one or more data set portions as a data block of multiple data blocks within a data file maintained by one or more storage devices, wherein the multiple data blocks are organized within the data file in a manner indicated in map data that includes multiple map entries, and each map entry of the multiple map entries corresponds to one or more data blocks of the multiple data blocks. In response to an indication in the metadata that the data set includes partitioned data, wherein the data within the data set is organized into multiple partitions that are each distributable to a single node device and each map entry corresponds to a single data block, the processor component may caused to perform operations including: for each data set portion of the one or more data set portions, include a data sub-block size indicative of a size of the data set portion in the request, derive a hashed identifier of a partition label of the partition to which the data set portion belongs of the multiple partitions, and include the hashed identifier in the request; receive, from the control device, the requested pointer indicating the location within the data file at which to store the data block; and store each data set portion of the one or more data set portions as a data sub-block within the data block starting at the location within the data file.

In response to a lack of indication in the metadata that the data set includes partitioned data, the processor component may be caused to perform operations including: derive a sum of sizes each data set portion of the one or more data set portions; include the sum of sizes as a data block size of the data block in the request; receive, from the control device, the requested pointer indicating the location within the data file at which to store the data block; and store the one or more data set portions together as the data block at the location within the data file. The processing task may include generation of the data set as an output, and the processor component may be caused to generate at least a portion of the metadata and to provide the at least a portion of the metadata to the control device. The processing task includes use of the data set as an input, and the processor component may be caused to receive the metadata from the control device.

The processor component may be caused to perform the processing task with each data set portion of the one or more data set portions using a separate one of multiple processor cores of the processor component at least partially in parallel. The processor component may be caused to perform the processing task with at least one data set portion of the one or more data set portions at least partially in parallel with a performance, by at least one other node device of the multiple node devices, of the processing task with at least one other data set portion of the multiple data set portions. Each node device of the multiple node devices may be required to generate a single request for a pointer for all data set portions with which the processing task is performed by each node device; and the processor component may be caused to generate the request to be associated with all of the data set portions of the one or more data set portions with which the processor component performs the processing task.

The processor component may be caused to store the one or more data portions within the data block within the data file at least partially in parallel with storage of at least one other data set portion of the multiple data set portions by at least one other node device of the multiple node devices. The processor component may be caused to, in response to completion of storage of the one or more data set portions within the data block within the data file, provide an indication of the completion of the storage to the control device.

A computer-implemented method may include: providing, to a control device, an indication of being currently available to participate in a performance of a processing task as a node device among multiple node devices; receiving, from the control device, an indication of the processing task to perform with one or more data set portions of multiple data set portions of a data set, wherein the data set includes data organized in a manner indicated in metadata; performing the processing task with the one or more data set portions; and providing a request to the control device for a pointer to a location at which to store the one or more data set portions as a data block of multiple data blocks within a data file maintained by one or more storage devices, wherein the multiple data blocks are organized within the data file in a manner indicated in map data that includes multiple map entries, and each map entry of the multiple map entries corresponds to one or more data blocks of the multiple data blocks. In response to an indication in the metadata that the data set includes partitioned data, wherein the data within the data set is organized into multiple partitions that are each distributable to a single node device and each map entry corresponds to a single data block, the method may include: for each data set portion of the one or more data set portions, including, in the request, a data sub-block size indicative of a size of the data set portion, derive a hashed identifier of a partition label of the partition to which the data set portion belongs of the multiple partitions, and including, in the request, the hashed identifier; receiving, from the control device, the requested pointer indicating the location within the data file at which to store the data block; and storing each data set portion of the one or more data set portions as a data sub-block within the data block starting at the location within the data file.

In response to a lack of indication in the metadata that the data set includes partitioned data, the method may include: deriving a sum of sizes each data set portion of the one or more data set portions; including the sum of sizes as a data block size of the data block in the request; receiving, from the control device, the requested pointer indicating the location within the data file at which to store the data block; and storing the one or more data set portions together as the data block at the location within the data file. The processing task may include generation of the data set as an output, and the method may include generating at least a portion of the metadata and to provide the at least a portion of the metadata to the control device. The processing task may include use of the data set as an input, and the method may include includes receiving the metadata from the control device.

The method may include performing the processing task with each data set portion of the one or more data set portions using a separate one of multiple processor cores of a processor component of the node device at least partially in parallel. The method may include performing the processing task with at least one data set portion of the one or more data set portions at least partially in parallel with a performance, by at least one other node device of the multiple node devices, of the processing task with at least one other data set portion of the multiple data set portions. Each node device of the multiple node devices may be required to generate a single request for a pointer for all data set portions with which the processing task is performed by each node device; and the method may include generating the request to be associated with all of the data set portions of the one or more data set portions with which the processor component performs the processing task.

The method may include storing the one or more data portions within the data block within the data file at least partially in parallel with storage of at least one other data set portion of the multiple data set portions by at least one other node device of the multiple node devices. The method may include, in response to completion of storage of the one or more data set portions within the data block within the data file, providing an indication of the completion of the storage to the control device.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 12A, 12B and 12C each illustrate an example embodiment of distribution of portions of a data set.

FIGS. 13A, 13B, 13C, 13D and 13E, together, illustrate an example of storing portions of non-partitioned data of a data set.

FIGS. 16A, 16B, 16C and 16D, together, illustrate an example of retrieving partitioned data of a data set.

FIGS. 20A, 20B and 20C, together, illustrate an example embodiment of a logic flow of a control device coordinating retrieval of data set portions.

DETAILED DESCRIPTION

Figure 1:
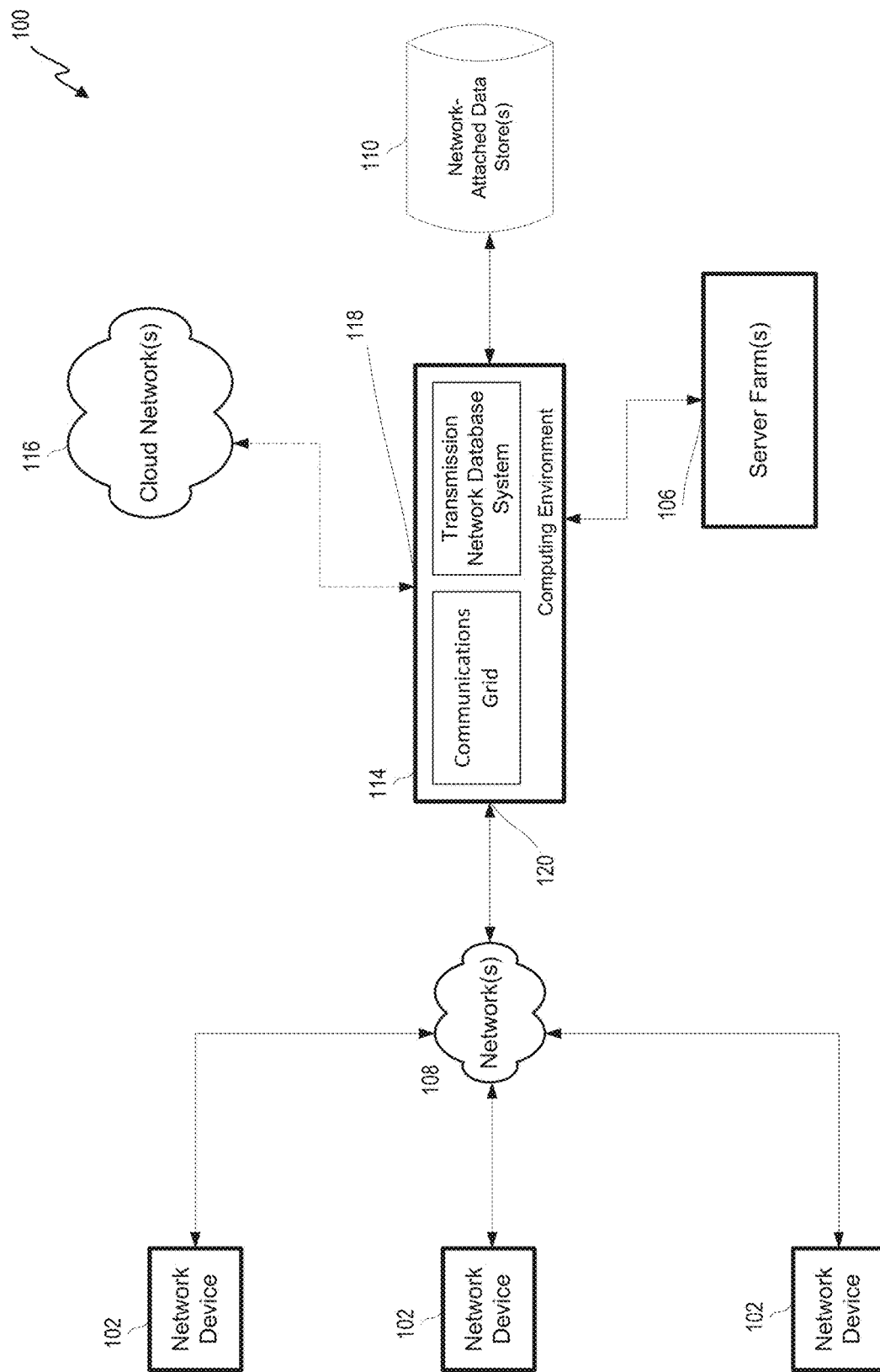
FIG. 1 illustrates a block diagram that provides an illustration of the hardware components of a computing system, according to some embodiments of the present technology.

Various embodiments described herein are generally directed to inter-device coordination and data set organization to improve distributed storage and retrieval of a data set processed by multiple node devices. A data set may be stored within a single data file for relatively long term storage (also commonly referred to as "persisted") in a distributed manner among one or more storage devices. The data of the data set may be divided into multiple data blocks and/or data sub-blocks within the data file in a manner that correlates to the manner in which portions of the data set are distributed among multiple node devices during processing. The data file may include a map of the manner in which the data blocks and/or data sub-blocks are organized within the single data file, including the quantity, size(s) and/or location(s) within the data file. The one or more storage devices may employ any of a variety of file systems to store the data file, and the data file may include a file header providing indications of various characteristics of the data file relevant to that file system. It should be noted that the manner in which the data file is distributed among the one or more storage devices may be entirely unrelated to the manner in which the data of the data set is divided into data blocks. By way of example, the manner in which the data of the data set is divided into data blocks advantageously does not affect or preclude the distribution of the data file among multiple storage devices configured to cooperate to form a redundant array of inexpensive disks (RAID) array to provide protection against loss of the data file and/or to provide faster access to the data file.

The data within the data set may be organized in any of a variety of ways (e.g., rows and columns, columnar, one or more hypercubes, etc.) with any of a variety of indexing mechanisms that may employ any of a variety of labeling schemes. To enable access to and use of the data, the data set may include metadata that is descriptive of such aspects of the manner in which the data of the data set is so organized. In some embodiments, the data within the data set may be organized into multiple partitions in which the data within each partition is required be processed all together as a single atomic unit. Therefore, if the data set is partitioned, the data blocks, and the one or more data sub-blocks into which each data block may be divided, may be at least partially defined by the manner in which data is organized into partitions. As will be explained in greater detail, the manner in which the data set is stored within the data file by the multiple node devices and the manner in which the data set is retrieved by the multiple node devices may be at least partially dependent on whether the data of the data set is partitioned. The metadata and/or the map may include an indication of whether the data of the data set is partitioned, and if so, the metadata may describe various aspects of the partitioning. Partitioning of the data within a data set may aid in simplifying and optimizing processing in a distributed multi-node computational environment, by serving as a mechanism by which logically-related data are physically grouped together for processing on the same node device. Co-locating all data within a partition on the same node device may eliminate the need for time-consuming and/or resource-consuming inter-node data shuffling as computations are done on the partition data as a whole. Furthermore, a straightforward scheme may be used to locate the specific node device containing the partition which will be explained in greater detail herein.

The actions taken by the multiple node devices to store and retrieve the data set may be coordinated thereamong by a control device. In some embodiments, the control device may be separate and distinct from all of the node devices. In other embodiments, such a coordinating function of the control device may be performed by one of the multiple node devices (e.g., on a separate execution thread, by a separate processor core, within a separate virtual machine, etc.). In storing or retrieving the data set, the control device and each node device of the multiple node devices may directly access the single data file in which the data set is stored. More specifically, the control device may directly store or retrieve the metadata and the map, while each of the node devices may directly store or retrieve one or more different data blocks and/or data sub-blocks. At least the accesses made by the node devices to store or retrieve data blocks and/or data sub-blocks may be performed at least partially in parallel. The control device may provide each of the node devices with one or more pointers to locations within the data file at which the different data blocks and/or data sub-blocks may be stored or retrieved in the form of offsets relative to a designated starting location of the data file (e.g., offsets from the first byte of the data file or from the first byte of a payload portion of the data file). Through such use of pointers, the need for coordination between the node devices and the control device is greatly minimized. The node devices are each able to separately act to store or retrieve data block(s) and/or data sub-block(s) without the need to synchronize the timing of such acts with each other and/or with the control device. In some embodiments, the control device may store or retrieve the metadata and/or the map at least partially in parallel with the storage or retrieval, respectively, of data blocks and/or data sub-blocks performed by one or more of the multiple node devices.

In embodiments in which the data of the data set is not partitioned, the map may include indications of the size of each data block and/or how many data blocks are used to store the data of the data set. To reduce storage requirements for the map, itself, the map may include a table or similar data structure of multiple entries in which each entry includes an indication of a data block size and a quantity of how many data blocks stored adjacently within the data file share that data block size. In embodiments in which the data of the data set is partitioned, the map may include entries for each data block in which each entry indicates sizes and hashed identifiers for each of the one or more data sub-blocks within each data block. As will be explained in greater detail, each partition may have a unique partition label that may be described in the metadata and/or may be included with the data belonging to that partition, and a hash may be taken of each such partition label to generate a corresponding hashed identifier. Depending on the storage requirements for the map, itself, the map may be stored entirely within a single location within data file, or portions of the map may be stored at multiple locations distributed within the data file.

In storing the data set within the data file in embodiments in which the data of the data set is not partitioned, each of the node devices may transmit a request to the control device for a pointer to a location within the data file at which to store a data block. Each such request may include an indication of the size of the data block that the requesting node device is to store at that location. The specification of the size of the data block to be stored in each request enables the control device to derive the location within the data file to specify in the next pointer that the control device provides in response to the next request for a pointer from another node device. The control device may also employ the specified size to add an indication to the map of the data block to be stored by the requesting node device. Each node device that so requests a pointer, upon being provided with the requested pointer, may employ the pointer to store the data block for which the pointer was requested. Such requesting and provision of pointers at which to store data blocks within the data file may continue until there are no more data blocks of the data set to be stored by any of the node devices for which a pointer has not been requested. In some embodiments, each of the node devices may transmit an indication to the control device of having no more data blocks of the data set to request pointers for. However, in other embodiments in which each of the node devices is required to request only a single pointer for all data that is to be stored by that node device, the control device may determine whether there are more data blocks for which pointers remain to be requested based on whether or not requests for pointers have been received from all of the node devices involved in processing the data set. In some embodiments, the control device may store the map and/or the metadata of the data set within the data file in response to there being no more data blocks of the data set for which pointers need to be requested. In such embodiments, the storage of the map and/or the metadata by the control device is thereby not dependent upon, and need not be synchronized with, the storage of any of the data blocks and/or data sub-blocks performed by the node devices. However, in other embodiments, the control device may delay storage of the map and/or metadata of the data set within the data file until indications have been received by the control device from all of the node devices that all of the data blocks have been successfully stored. This may be deemed desirable as a measure to address errors in transmission of one or more data blocks to the one or more storage devices via a network and/or errors in storage of one or more data blocks by the one or more storage devices.

In embodiments in which the data of the data set is not partitioned, the lack of a requirement to keep any two or more specific portions of the data of the data set together for processing may result in the division of the data of the data set into data blocks being correlated solely to the manner in which the data of the data set was distributed among the multiple node devices at the time the data set was generated and/or most recently stored. More specifically, each data block stored within the data file is stored therein by only one node device such that no data block within the data file includes data stored therein by more than one node device. However, in some embodiments, a single node device may store more than one data block within the data file such that a single node may request more than one pointer from the control device. In some embodiments, this may arise as a result of a distribution of data and of processing of the data among multiple execution threads, multiple virtual machines and/or multiple processor cores within a single node device. Thus, for each portion of the data within a single node device has been fully processed within and/or by a separate corresponding execution thread, virtual machine and/or processor core, the node device may make a separate request for a separate pointer to a location within the data file at which a separate corresponding data block is to be stored. Alternatively, a single request for a single pointer at which to contiguously store all of the data blocks associated with a single node device may be requested, and the request may specify a size that is sum of the sizes of all of those data blocks. This may be the case in embodiments in which each node device is required to make only one request for a pointer. However, as an alternative to such a single request specifying a size that is the sum of the sizes of all of the data blocks to be stored by a node device, the request alternatively may include specifications of a separate size for each data block.

In retrieving the data set from the data file in embodiments in which the data of the data set is not partitioned, the control device may retrieve indications of which node devices are available to perform processing on the data set. In some embodiments, the quantity of node devices that are available may vary with time based on any of a variety of factors, including demands for the processing resources of each of the node devices to perform other processing tasks, user sessions that indicate a specific node device count based on policy, known performance characteristics, service-level agreements, etc., instances of node devices having malfunctioned or being taken out of service for other reasons, etc. The control device may then access the data file to retrieve the map and the metadata of the data set, and may relay an indication of a task to be performed and/or the metadata to each of the available ones of the multiple node devices. The control device may then employ the information concerning each data block within the map to distribute the data blocks among the available node devices. The control device may employ any of a variety of techniques to distribute the data blocks among the available ones of the node devices, from simpler round robin techniques to any of a variety of data size balancing techniques.

In effecting this distribution of the data blocks, for each data block that the control device assigns to a node device, the control device may transmit a pointer to the location of the data block within the data file to the node device, along with an indication of the size of the data block. For each such combination of pointer and size of a data block received by a node device, the node device may employ the pointer to access and retrieve the data block from within the data file, starting at the location pointed to by the pointer and ceasing when the amount of data of the data block indicated by the size has been retrieved. In some embodiments, each node device may transmit an indication to the control device of having completed each such retrieval of a data block. As each node device to which the retrieval of one or more data blocks has been assigned completes the retrieval of the assigned one or more data blocks, the node device may begin performing processing tasks with the assigned one or more data blocks. Again, through such use of pointers, the need for coordination among the node devices and/or between the node devices and the control device is greatly minimized. More specifically, there may be no synchronization of when each node begins performing processing tasks with the one or more data blocks assigned to it, such that each node may immediately begin such processing upon retrieving at least a portion of at least one data block.

Various aspects of storing the data set within the data file in embodiments in which the data of the data set is partitioned may differ from storing the data set in embodiments in which the data of the data set is not partitioned. Each of the node devices may transmit a request to the control device for a pointer to a location within the data file at which to store a single data block that includes one or more data sub-blocks. Each such request may include a data structure providing indications of the quantity of data sub-blocks, the size of each data sub-block and/or the hashed identifier of each data sub-block. The specifications of the quantity of data sub-blocks within each data block and the size of each data sub-block enables the control device to derive the location within the data file to specify in the next pointer that the control device provides in response to the next request for a pointer from this or another node device. The control device may also employ such information, as well as the hashed identifiers, in adding indications of the data block and of the one or more data sub-blocks therein to the map. Each node device that so requests a pointer, upon being provided with the requested pointer, may employ the pointer to store the data block for which the pointer was requested as part of the data file. As each node device receives pointer for the data block that it is to store, each node device may transmit an indication to the control device of having no more data blocks to request pointers for. However, in embodiments in which each of the node devices is required to request only a single pointer for all data that is to be stored by that node device, the control device may determine whether there are more data blocks for which pointers remain to be requested based on whether or not requests for pointers have been received from all of the node devices involved in processing the data set. In response to there being no more data blocks of the data set for which any of the node devices need to be provided with a pointer, the control device may store the map, the metadata of the data set and/or a data header within the data file. The data header may include an indication of how many node devices were involved in generating the data set and/or in storing the data set following its generation.

As previously discussed, in embodiments in which the data of the data set is partitioned, all of the data within each partition may be required to be processed together within a single node device, and not distributed among multiple node devices. However, a single node device may perform processing operations involving the data of more than one partition. As also previously discussed, all of the data within each partition must be stored together within a single data block within the data file, and not distributed among multiple data blocks within the data file. However, within each data block, the data of a single partition may be divided into multiple data sub-blocks, and a single data block may include data sub-blocks of the data of more than one partition. The hashed identifiers associated with each data sub-block by the map may be employed by the control device to distinguish between the multiple partitions to which the data within each data sub-block belongs.

Various aspects of retrieving the data set from the data file in embodiments in which the data of the data set is partitioned may differ from retrieving the data set in embodiments in which the data of the data set is not partitioned. The control device may retrieve indications of which node devices are available to perform processing on the data set. Again, in some embodiments, the quantity of available node devices may vary over time. The control device may access the data file to retrieve the map, the metadata of the data set and/or the data header. The control device may then transmit an indication of a task to perform with the data set and/or the metadata to each of the available ones of the multiple node devices. The control device may then employ a combination of the hashed identifiers associated with the data sub-blocks, the quantity of partitions into which the data set is divided, the quantity of node devices involved in generating and/or in most recently storing the data set within the data file, and the quantity of node devices that are currently available in deriving a distribution of the data blocks and/or data sub-blocks of the data set among the currently available node devices.

More specifically, the control device may compare the quantity of node devices involved in the most recent storage of the data set within the data file to the quantity of currently available node devices. If these two quantities of node devices match, then the control device may distribute the data blocks among the currently available node devices in a manner that recreates the distribution of partitions among node devices that existed at the time the data set was most recently stored within the data file. To effect this distribution of partitions among the currently available node devices, the control device may provide each currently available node device with at least one pointer to a location within the data file from which the node device may retrieve a data block, along with an indication of the size of the data block. Thus, distribution of the pointers, and accordingly, of the data of the data set, is based on the data blocks within the data file, thereby avoiding the time and/or data transmission overhead of distributing what may be a considerably greater quantity of pointers to individual data sub-blocks.

However, if the quantity of node devices involved in at least storing the data set within the data file does not match the quantity of currently available node devices, then the control device may distribute the data sub-blocks among the currently available node devices using any of a variety of techniques, while ensuring that there are no instances in which the data of any partition is distributed among multiple node devices. In so doing, the control device may employ the hashed identifier associated by the map with each individual data sub-block. By way of example, the control device may divide each of the hashed identifiers by the quantity of currently available node devices to derive the modulo value from each such division. The control device may then employ the modulo value as the indicator of which node device to distribute each data sub-block to. To effect this distribution of partitions among the currently available node devices, the control device may provide each currently available node device with at least one pointer to a location within the data file from which the node device may retrieve a data sub-block, along with an indication of the size of the data sub-block. Such a distribution of pointers to locations of individual data sub-blocks within data blocks, instead of a distribution of pointers to locations of data blocks, may be performed in recognition of the fact that a single data block may include data sub-blocks associated with more than one partition.

For each such combination of pointer and size of a data block or a data sub-block received by a node device, the node device may employ the pointer to access and retrieve the data block or data sub-block within the data file, starting at the location pointed to by the pointer and ceasing when the amount of data of the data block or the data sub-block indicated by the size has been retrieved. In some embodiments, each node device may transmit an indication to the control device of having completed the retrieval of each data block or data sub-block. As each node device to which one or more data blocks or data sub-blocks has been assigned completes the retrieval of those one or more data blocks or data sub-blocks, the node device may begin performing a processing task with the data of those data blocks or data sub-blocks. Alternatively, a node device may begin performance of a processing task even as the node continues to retrieve those one or more data blocks or data sub-blocks.

In various embodiments, the control device and the multiple node devices may cooperate to provide security for the data of the data set. In some embodiments, the control device may encrypt the metadata and/or the map prior to storage within the data file during storage of the data set within the data file. Correspondingly, the control device may decrypt the metadata and/or map prior to providing the metadata and/or pointers to the node devices during retrieval of the data set from the data file. In some embodiments, the node devices may encrypt the data blocks and/or the data sub-blocks during storage of the data set within the data file, and/or may decrypt the data blocks and/or the data sub-blocks during retrieval of the data set from the data file. In support of such encryption and/or decryption by the node devices, the control device may distribute one or more security credentials employed in such encryption and/or decryption among the node devices. Alternatively or additionally, the control device may store indications of such security credentials within the data file during storage of the data set therein and/or may retrieve those indications from the data file during retrieval of the data set therefrom.

With general reference to notations and nomenclature used herein, portions of the detailed description that follows may be presented in terms of program procedures executed by a processor component of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
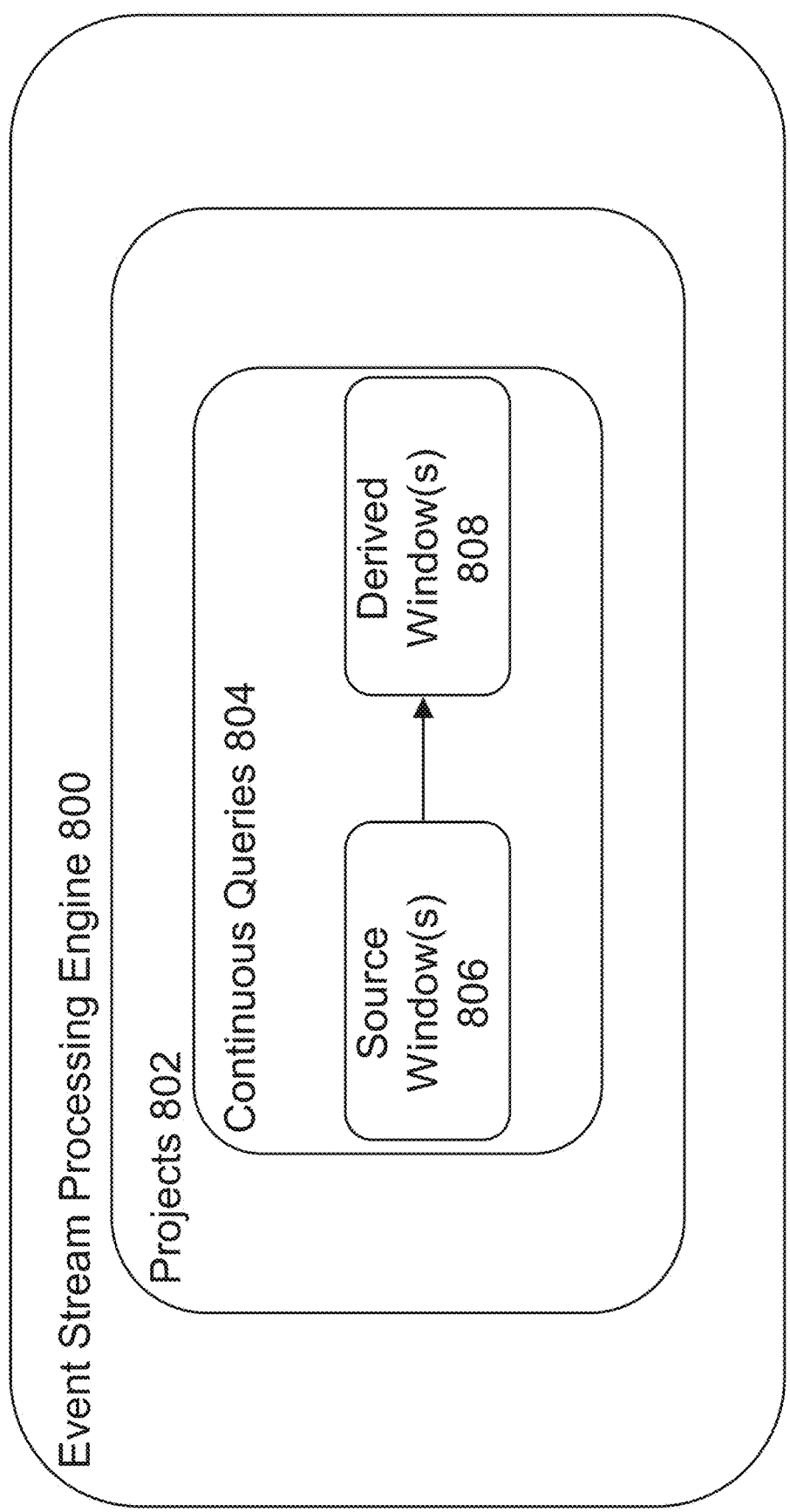
FIG. 8 illustrates a block diagram including components of an Event Stream Processing Engine (ESPE), according to embodiments of the present technology.
Figure 9:
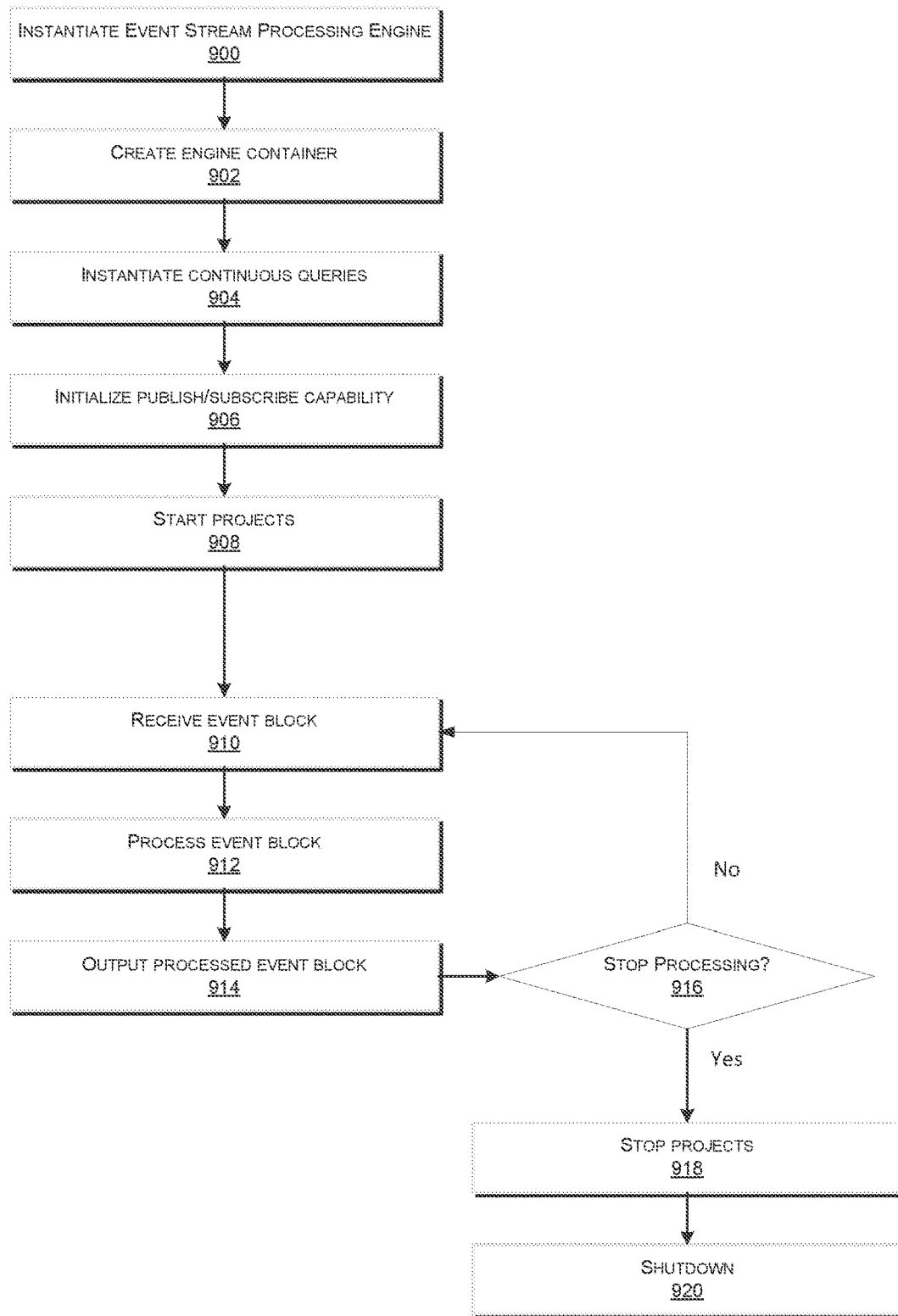
FIG. 9 illustrates a flow chart showing an example process including operations performed by an event stream processing engine, according to some embodiments of the present technology.
Figure 10:
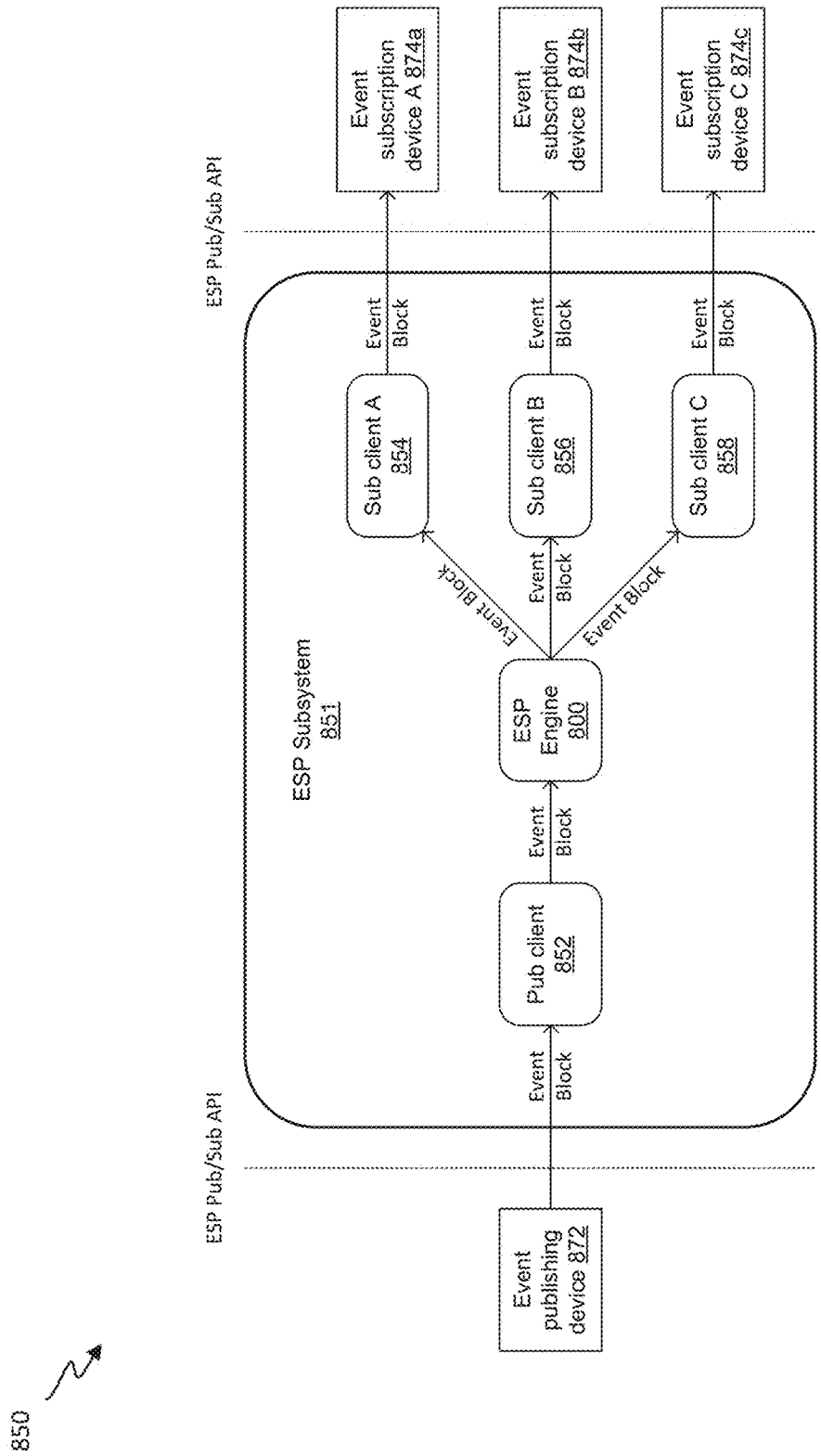
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
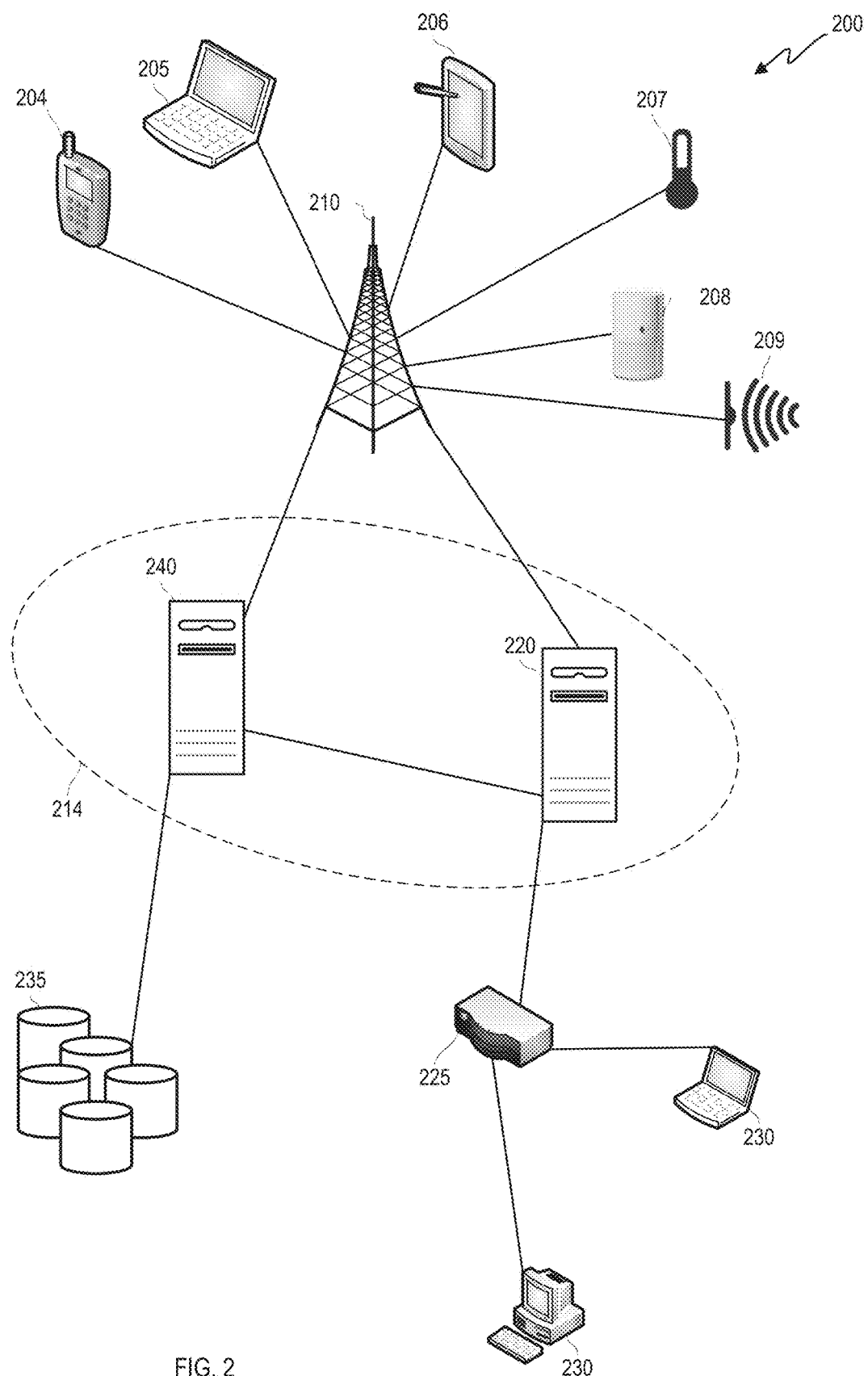
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
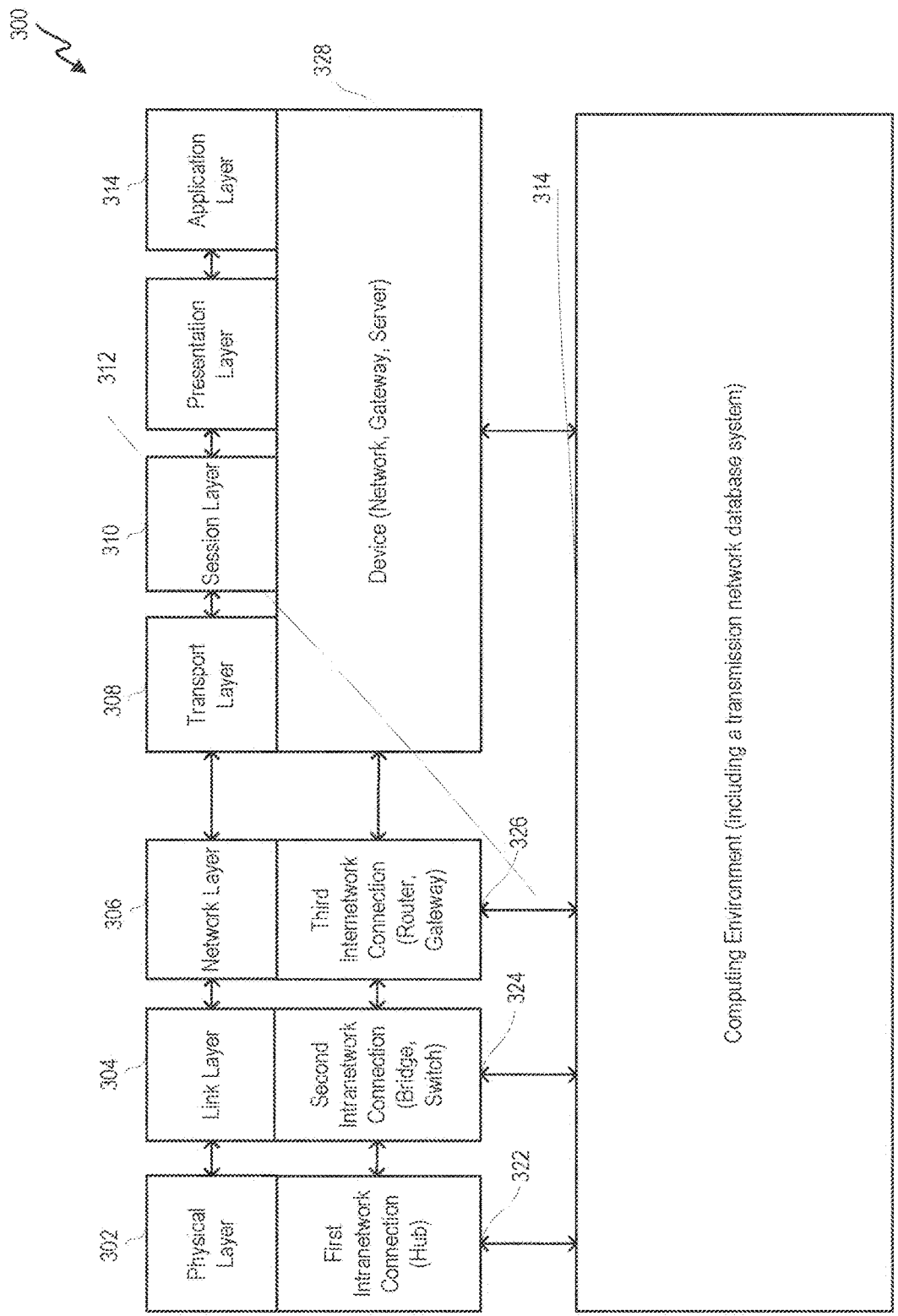
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
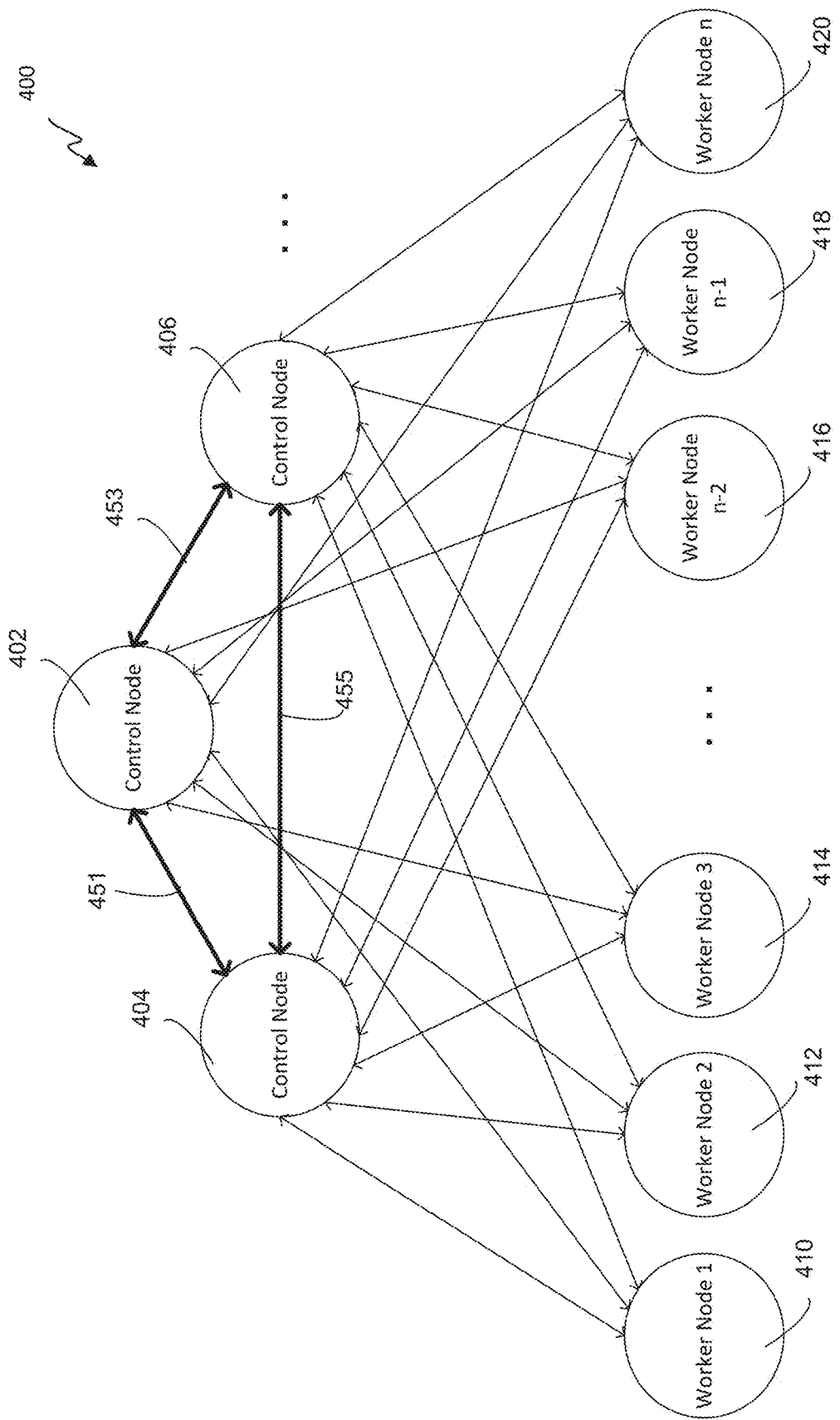
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
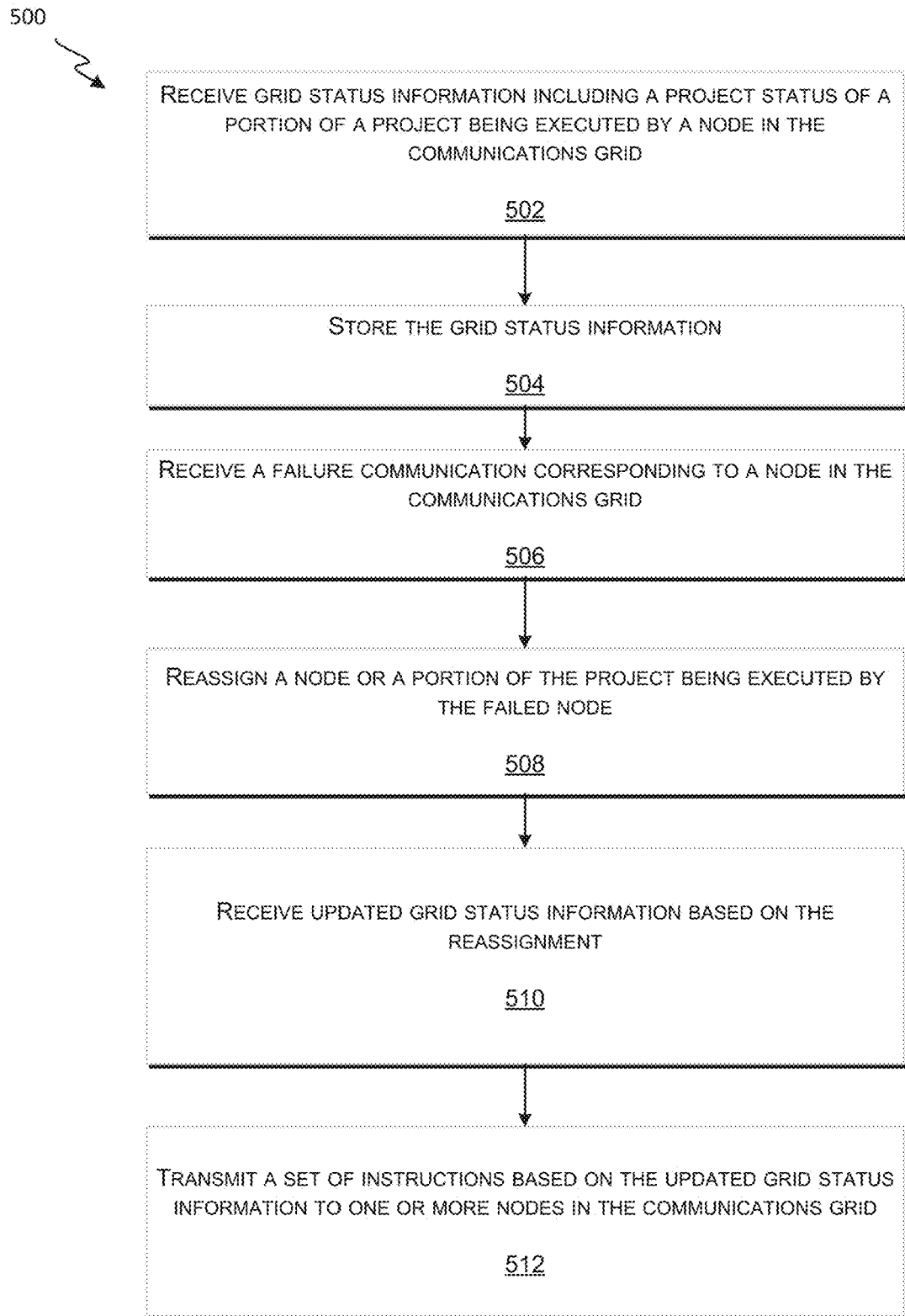
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
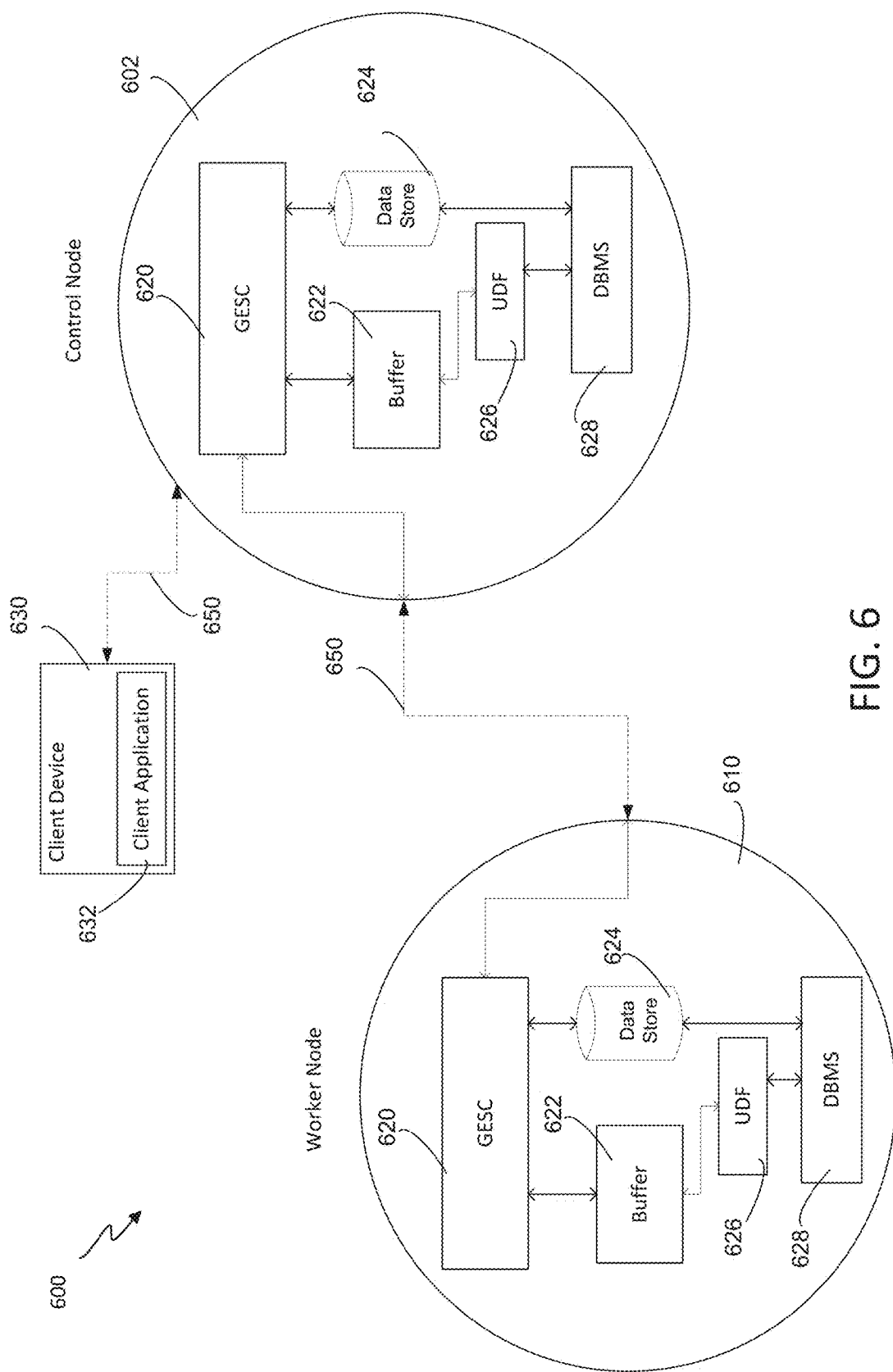
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
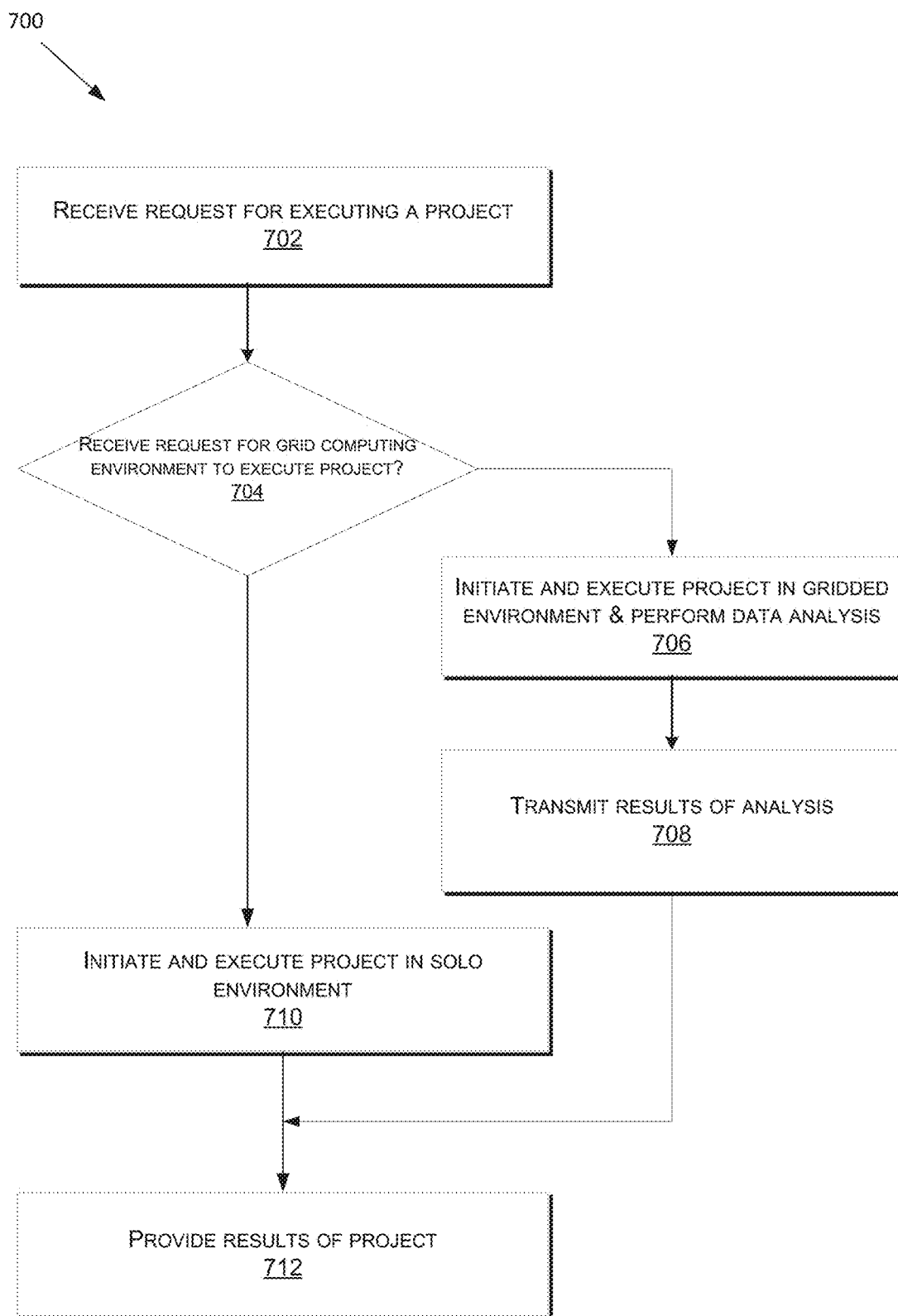
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874*a-c*, according to embodiments of the present technology. ESP system 850 may include ESP device or subsystem 851, event publishing device 872, an event subscribing device A 874*a*, an event subscribing device B 874*b*, and an event subscribing device C 874*c*. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874*a*, event subscribing device B 874*b*, and event subscribing device C 874*c*. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874*a*, event subscribing device B 874*b*, and event subscribing device C 874*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874*a*, event subscribing device B 874*b*, and event subscribing device C 874*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874*a* using the publish/subscribe API. Subscribing client B 856 may be started by an event subscription application B executing at event subscribing device B 874*b* using the publish/subscribe API. Subscribing client C 858 may be started by an event subscription application C executing at event subscribing device C 874*c* using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874*a*, event subscription device B 874*b*, and event subscription device C 874*c*. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874*a-c*. For example, subscribing client A 804, subscribing client B 806, and subscribing client C 808 may send the received event block object to event subscription device A 874*a*, event subscription device B 874*b*, and event subscription device C 874*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11A:
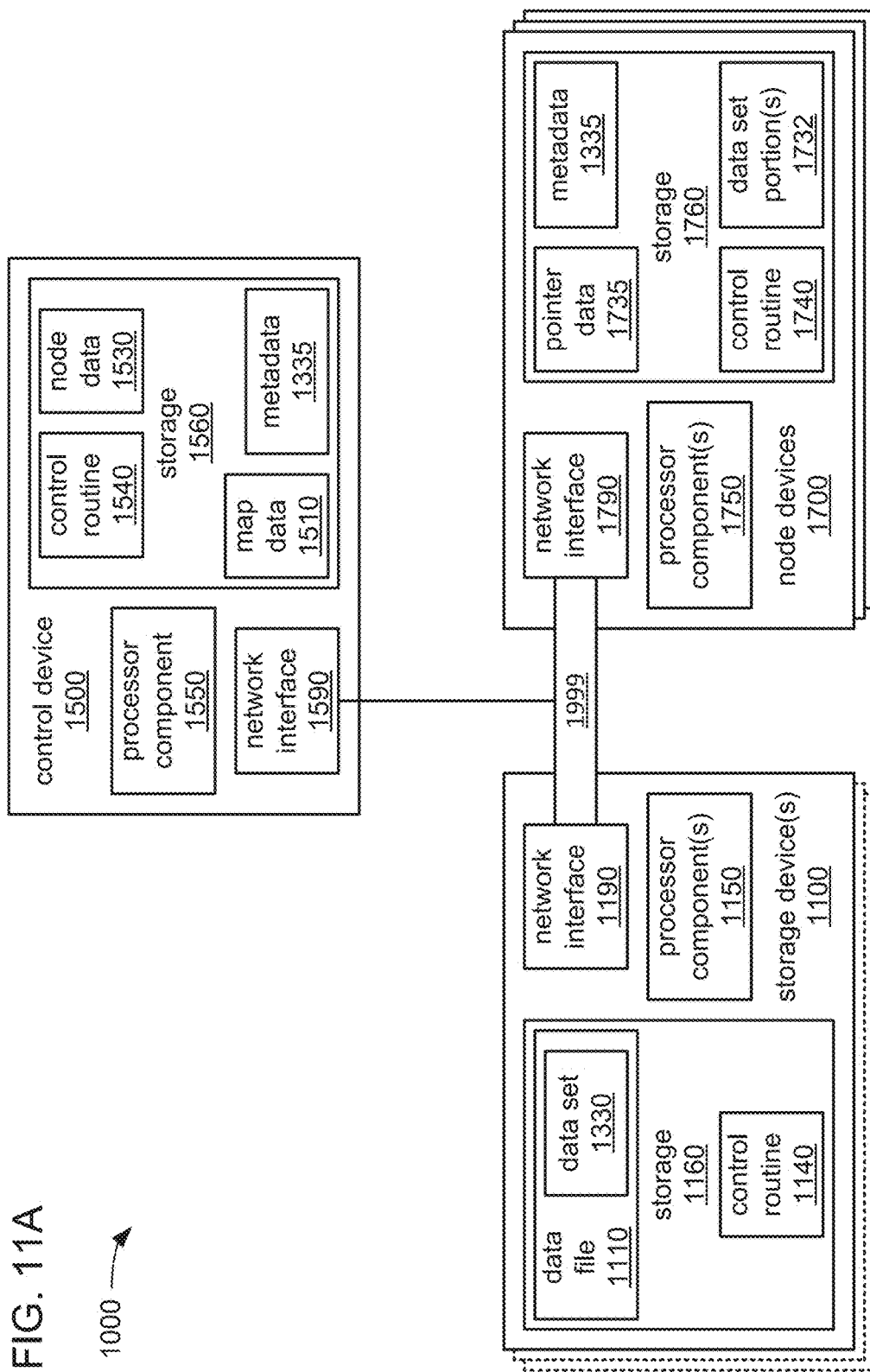
FIGS. 11A and 11B each illustrate an example embodiment of a distributed processing system.

FIG. 11A illustrates a block diagram of an example embodiment of a distributed processing system 1000 incorporating one or more storage devices 1100, multiple node devices 1700, and a control device 1500. As depicted, these devices 1100, 1500 and/or 1700 may exchange communications thereamong related to the storage and retrieval of a data set 1330 via a network 1999, including one or more of metadata 1335, data set portions 1732, node data 1530 and/or pointer data 1735. However, one or more of the devices 1100, 1500 and/or 1700 may exchange other data entirely unrelated to the storage and retrieval of the data set 1330 with each other and/or with still other devices (not shown) via the network 1999. In various embodiments, the network 1999 may be a single network that may extend within a single building or other relatively limited area, a combination of connected networks that may extend a considerable distance, and/or may include the Internet. Thus, the network 1999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

The data set 1330 may be divisible into the data set portions 1732. Different ones of the data set portions 1732 may be temporarily stored by different ones of the node devices 1700 as the multiple node devices 1700 separately, and at least partially in parallel, perform processing tasks with the data set portions 1732. Such at least partially parallel performances of processing tasks by the multiple node devices 1700 may be coordinated by the control device 1500. The control device 1500 may distribute indications of the processing tasks to be performed and/or other related information, such as the metadata 1335, among the multiple node devices 1700. The control device 1500 may also receive indications of progress in the separate, but at least partially parallel, performance of processing tasks from each of the node devices 1700.

In preparation for and/or in support of such processing tasks, the data set 1330 may be stored for longer term storage as a single data file 1110 by the one or more storage devices 1100. Where the data set 1330 is employed by the multiple node devices 1700 as an input to such processing tasks, the multiple node devices 1700 may retrieve corresponding ones of the data set portions 1732, at least partially in parallel, from the one or more storage devices 1100. Alternatively or additionally, where the data set 1330 is generated as an output of such processing tasks, the multiple node devices 1700 may store corresponding ones of the data set portions 1732, at least partially in parallel, to the one or more storage devices 1100. Such at least partially parallel exchanges of the data set 1330 between the multiple node devices 1700 and the one or more storage devices 1100 may also be coordinated by the control device 1500. The control device 1500 may distribute, to each node device 1700, one or more pointers to locations within the data file 1110 at which one or more corresponding data set portions 1732 may be stored, and/or from which one or more corresponding data set portions 1732 may be retrieved.

In various embodiments, each of the one or more storage devices 1100 may incorporate one or more of a processor component 1150, a storage 1160 and a network interface 1190 to couple each of the one or more storage devices 1100 to the network 1999. The storage 1160 may store a control routine 1140 and/or at least a portion of the data file 1110 in which the data set 1330 is stored. The control routine 1140 may incorporate a sequence of instructions operative on the processor component 1150 to implement logic to perform various functions. In executing the control routine 1140, the processor component 1150 of each of the one or more storage devices 1100 may operate the network interface 1190 to receive the data set portions 1732 from corresponding ones of the node devices 1700, and may store the received data set portions 1732 within the data file 1110. Alternatively or additionally, the processor component 1150 may retrieve the data set portions 1732 from the data file 1110, and may operate the network interface 1190 to transmit the retrieved data set portions 1732 to corresponding ones of the node devices 1700.

In various embodiments, each of the multiple node devices 1700 may incorporate one or more of a processor component 1750, a storage 1760 and a network interface 1790 to couple each of the node devices 1700 to the network 1999. The storage 1760 may store a control routine 1740, the metadata 1335, one or more of the data set portions 1732, and/or the pointer data 1735. The control routine 1740 may incorporate a sequence of instructions operative on the processor component 1750 to implement logic to perform various functions. In executing the control routine 1740, the processor component 1750 of each of the node devices 1700 may operate the network interface 1790 to receive indications of processing tasks to perform on one or more of the data set portions 1732 at partially in parallel with others of the multiple node devices 1700, and/or other related information, from the control device 1500. Alternatively or additionally, the processor component 1750 may operate the network interface 1790 to transmit one or more of the data set portions 1732 to the one or more storage devices 1100, and/or to receive one or more of the data set portions 1732 from the one or more storage devices 1100 in support of performing such processing tasks.

In various embodiments, the control device 1500 may incorporate one or more of a processor component 1550, a storage 1560 and a network interface 1590 to couple the control device 1500 to the network 1999. The storage 1560 may store a control routine 1540, the metadata 1335, map data 1510 and/or node data 1530. The control routine 1540 may incorporate a sequence of instructions operative on the processor component 1550 to implement logic to perform various functions. In executing the control routine 1540, the processor component 1550 of the control device 1500 may operate the network interface 1590 to transmit indications to each of the node devices 1700 of processing tasks to perform on one or more of the data set portions 1732 at partially in parallel with others of the multiple node devices 1700, and/or other related information. Alternatively or additionally, the processor component 1550 may operate the network interface 1590 to exchange one or more of the metadata 1335 and the map data 1510 with at least one of the one or more storage devices 1100.

Figure 11B:
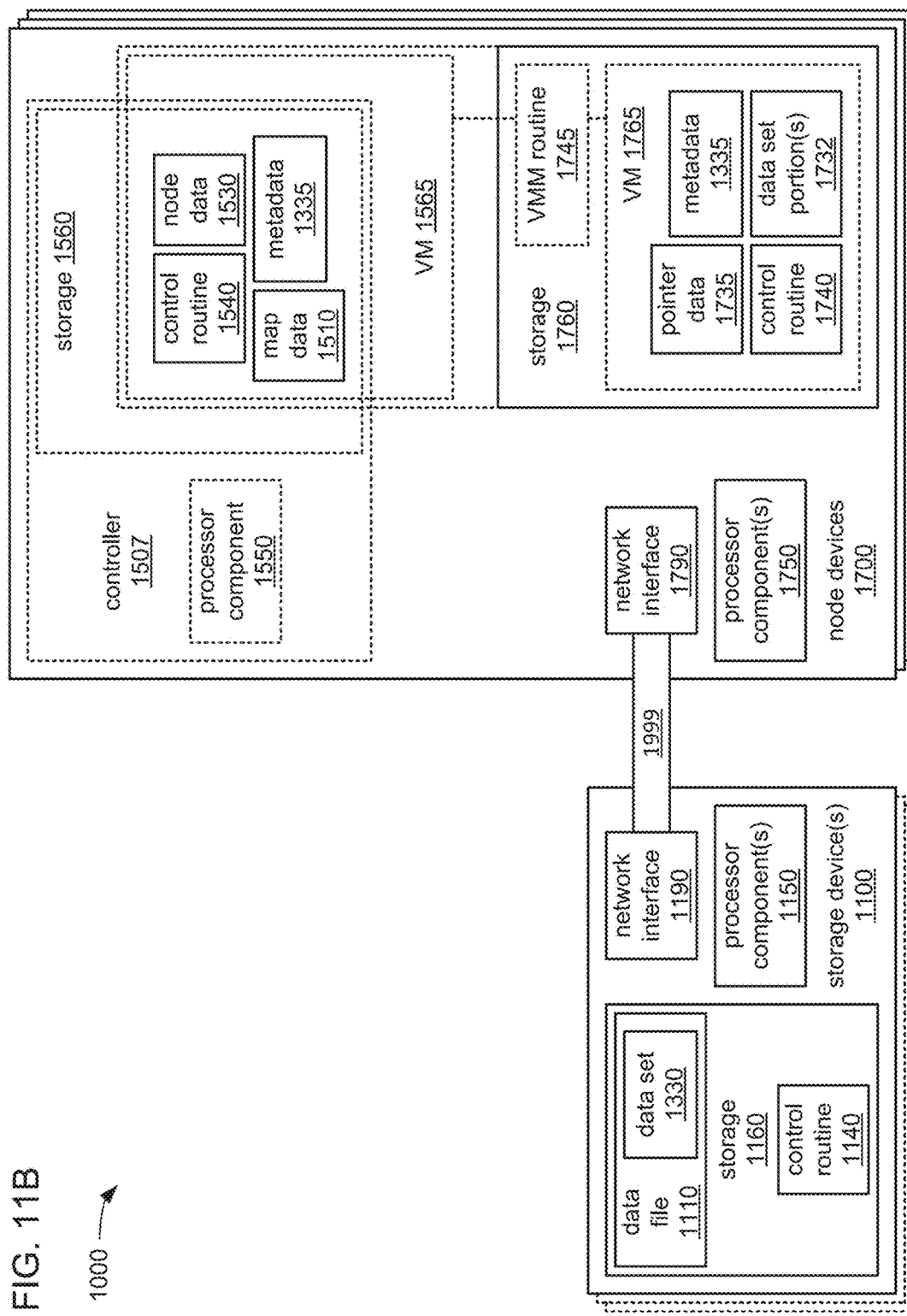

FIG. 11B illustrates a block diagram of an alternate example embodiment of the distributed processing system 1000 that is substantially similar to the example of FIG. 11A, but featuring an alternate embodiment of one of the node devices 1700 that additionally performs the coordinating functions of the control device 1500 in lieu of there being a separate and distinct control device 1500. As depicted, in some embodiments, such an alternate embodiment of the node device 1700 may additionally incorporate a controller 1507 that, itself, incorporates the processor component 1550 and the storage 1560 that were depicted as components of the separate control device 1500 of FIG. 11A to perform the coordinating functions. As also depicted as an alternative, in some embodiments, the processor component 1750 of such an alternate embodiment of the node device 1700 may be caused by its execution of a virtual machine manager (VMM) routine 1745 stored within the storage 1760 to generate a virtual machines VMs 1565 and/or 1765. Within the VM 1765, the processor component 1750 may execute the control routine 1740 to perform processing tasks with one or more data set portions 1732 at least partially in parallel with others of the node devices 1700. Alternatively or additionally, within the VM 1565, the processor component 1750 may execute the control routine 1540 to perform such coordinating tasks as have been described as being otherwise performed by the processor component 1550 of the control device 1500 of FIG. 11A and/or by the controller 1507.

Figure 12A:
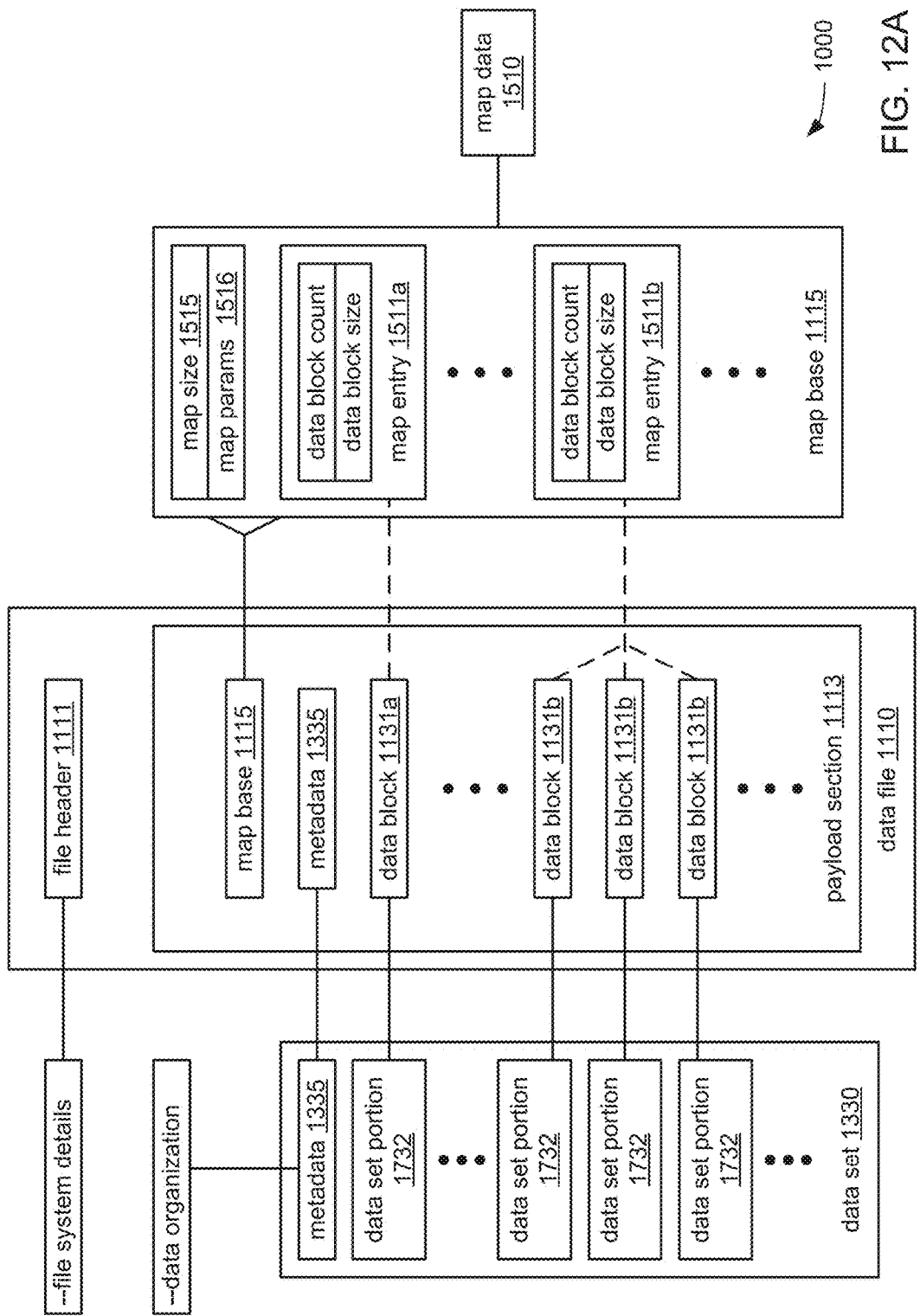
Figure 12B:
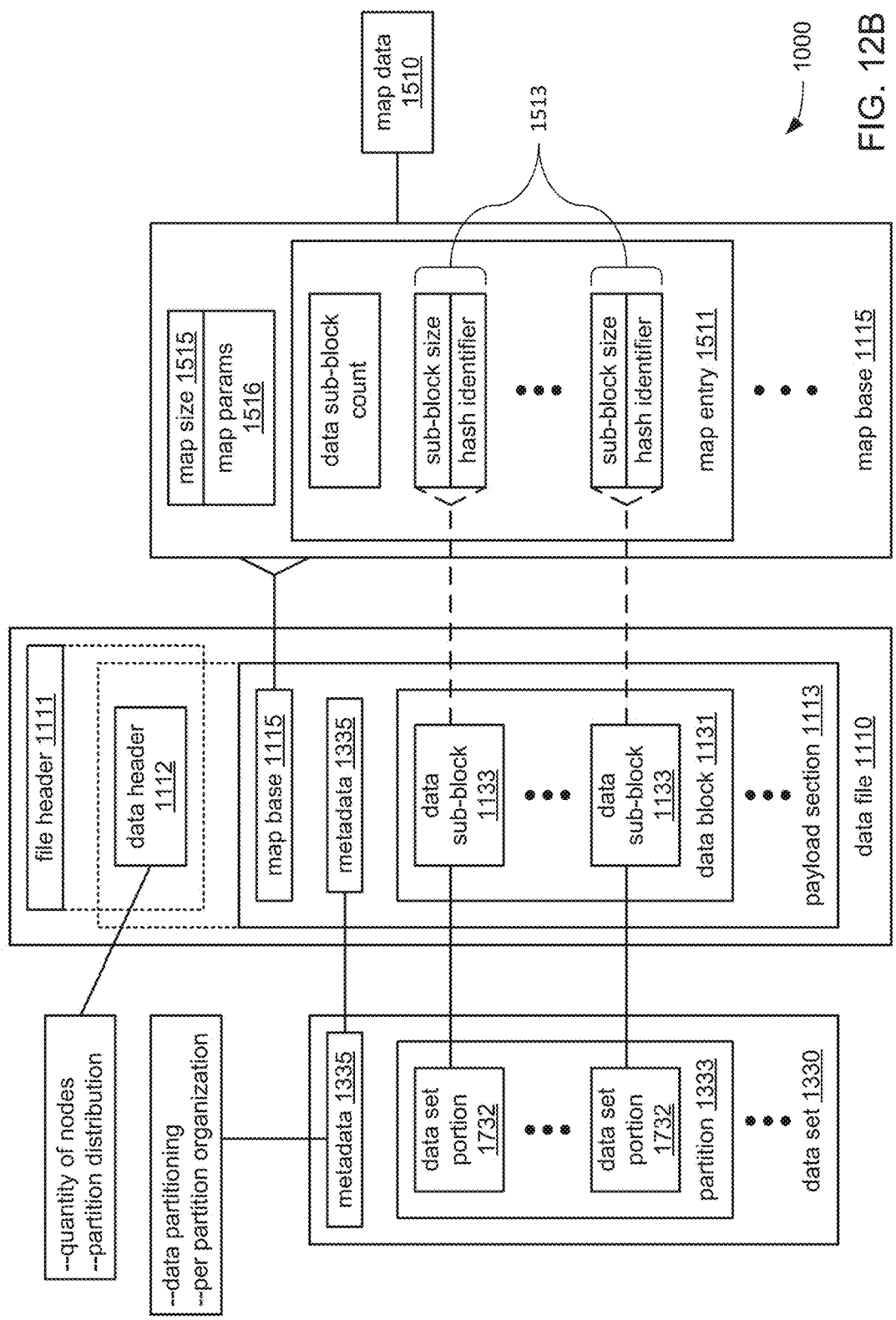

FIGS. 12A, 12B and 12C, together, illustrate an example of the manner in which the data set 1330 may be stored within the data file 1110 by the one or more storage devices 1100. The data of the data set 1330 may be any of a variety of types of data (e.g., societal statistics data, business operations data, raw data from an experiment, financial data, medical treatment analysis data, etc.), and may be organized within the data set 1330 in any of a variety of ways (e.g., rows and columns, columnar, hypercube, linked list, tree, etc.) that may be made traversable using any of a variety of mechanisms to find a particular data point. The data set 1330 may incorporate the metadata 1335, which may include a description of the manner in which the data of the data set 1330 is organized.

The size of the data set 1330 may be sufficiently large that processing the data set 1330 using a single processing device may be deemed highly impractical. Indeed, it may be that the data set 1330 also changes frequently enough over time (e.g., is updated hourly, daily, weekly, etc.) such that the length of time required to process the data set 1330 using a single processing device would yield results that would already be out of date before such processing could be completed. Thus, it may be deemed highly desirable to process the data set 1330 in a distributed and at least partially parallel manner using a group of interconnected processing devices (sometimes referred to as a "grid"), such as the distributed processing system 1000 of either FIG. 11A or 11B. As will be explained in greater detail, the manner in which the storage and retrieval of the data set 1330 is effected advantageously obviates the need for coordination among the node devices 1700 and minimizes the coordination required between the node devices 1700 and the control device 1500. This contributes to enabling the node devices 1700 to store, retrieve and process separate data set portions 1732 of the data set 1330 at least partially in parallel. Furthermore, the overhead required to store the map data 1510 which enables the accurate and flexible distribution of data blocks and/or the data sub-blocks representing data set portions 1732 is usually relatively small compared to the total size of the data set 1330. Therefore, the making of the tradeoff of storing the map data 1510 may result in comparatively significant improved retrieval performance and flexibility that outweighs the relatively small cost associated with creating and storing the map data. Although the degree of parallelism may be impacted by workload and environmental constraints common to various computing systems, parallelism during storage and retrieval more readily scales with progressively larger forms of the data set 1330 and/or as the quantity of node devices 1700 increases. The time required to request a pointer from the control device 1500 may be significantly smaller than the time to store or retrieve the corresponding data block(s) and/or data sub-block(s).

The data within the data set 1330 may be organized in a manner that enables such parallel distributed processing. More specifically, the organization of the data within the data set 1330 may enable the division of the data set 1330 into multiple ones of the data set portions 1732 (with varying degrees of flexibility, as will be explained) in which each of the data set portions 1732 is able to be processed without dependencies on the results of the processing of any of the other data set portions 1732. As a result, the data set portions 1732 may each be distributable to any of the node devices 1700 without regard to which one of the node devices 1700 that any of the other data set portions 1732 are distributed to. Such divisibility of the data set 1330 obviates the need to incur the latencies of serializing the processing of two or more of the data set portions 1732, as well as obviating the latencies of transferring an output of the processing of one data set portion 1732 by one node device 1700 through the network 1999 to another node device 1700 at which another data set portion 1732 is to be processed.

Such divisibility of the data set 1330 may also enable the exchange of the data set portions 1732 between the multiple node devices 1700 and the one or more storage devices 1100, either for storage or retrieval of the data set 1330, in a distributed and at least partially parallel manner. More specifically, each of the data set portions 1732 may be exchanged between one of the node devices 1700 and the one or more storage devices 1100 without regard to whether or when any of the other data set portions 1732 has been similarly exchanged between another of the node devices 1700 and the one or more storage devices 1100. To better enable such distributed and at least partially parallel exchanges of the data set portions 1732, the data set portions 1732 and the information required to access the data set portions 1732 may be stored within the data file 1110 in a manner that minimizes dependencies among the control device 1500 and the multiple node devices 1700 in the storage and retrieval of the data set portions 1732 and such associated information.

Referring to both FIGS. 12A and 12B, the data file 1110 may include a file header 1111 and a payload section 1113. The one or more storage devices 1100 may employ any of a variety of file systems in storing and managing access to files within the one or more storage devices 1100, including and not limited to, network file system (NFS), block device storage, any of the various versions of file allocation table (FAT), High Sierra Format (ISO-9660), write anywhere file layout (WAFL), XFS, etc. The file header 1111 may include indications of any of a variety of details of the data file 1110 that may be germane to, and that may be organized in compliance with the specifications of, one of the file systems employed by the one or more storage devices 1100.

The payload section 1113 may be a single contiguous series of bytes that occupies the majority of data file 1110, and depending on various aspects of the file system employed by the one or more storage devices 1100, the starting end of the payload section 1113 may follow at least the file header 1111. At the starting end, a first quantity of kilobytes of the payload section 1113 may be occupied by the base map 1115 that provides at least a portion of the map data 1510 that describes the manner in which the data set portions 1732 are organized within the payload section 1113. Such a first quantity of kilobytes of the payload section 1113 may be followed by a second quantity of kilobytes of the payload section 1113 that may be occupied by the metadata 1335. Following these two quantities of kilobytes may then be at least one contiguous series of the data blocks 1131

In some embodiments, the manner in which the data of the data set 1330 is organized within the data set 1330 may be relatively highly granular, thereby providing a relatively high degree of flexibility in the division of the data set 1330 into the data set portions 1732. By way of example, where the data of the data set 1330 is organized into rows and columns with a relatively large quantity of rows, a relatively high degree of granularity may be provided based on distribution of the rows among the data set portions 1732. With such a relatively high degree of flexibility in defining the data set portions 1732, the quantity and/or size of each data set portion 1732 may be more tightly correlated to the quantity of the node devices 1700 available at the time the data set 1330 is generated and/or to the resources within each of those available node devices 1700.

However, in other embodiments, the data of the data set 1330 may be organized within the data set 1330 in a manner that has relatively low granularity, thereby providing a relatively low degree of flexibility in the division of the data set 1330 into the data set portions 1732. As a result, the quantity of data set portions 1732 into which the data set 1330 may be divided, while still avoiding dependencies in processing therebetween, may be relatively limited such that at least some of the data set portions 1732 may be required to be relatively large. Such an embodiment of the data set 1330 may be described as being made up of partitioned data in which the relatively limited opportunities for division of the data set 1330 may define a relatively low quantity of partitions. An example of such partitioning may be an embodiment of the data set 1330 in which the data is partitioned such that it is divisible into no more than fifty data set portions 1732 that each correspond to one of the fifty states of the United States. The characteristics of the data within each of those partitions may be such that the data within one of the partitions may be processed with no dependencies on the data within any of the other partitions. However, the processing of the data within any one of the partitions may require access to at least a substantial portion of the data therein such that the data within each of the partitions cannot be distributed across more than one node device 1700 without a relatively high likelihood that time consuming exchanges of data would be required thereamong.

FIG. 12A depicts an example embodiment of the organization of the data of the data set 1330 within the data file 1110 where the data of the data set 1330 is of relatively high granularity such that the data of the data set 1330 is deemed to be non-partitioned data. For such a non-partitioned embodiment, each of the data blocks 1131 in the contiguous series of the data blocks 1131 (including the depicted data blocks 1131*a* and 1131*b*) that follows at least the base map 1115 and the metadata 1335 may correspond to a single data set portion 1732 that may be processed by one of the node devices 1700. As will be explained in greater detail, each of the node devices 1700 may act independently of the other node devices 1700 to store a single data set portion 1732 within the payload section 1113 as a single corresponding data block 1131 (e.g., the depicted single data block 1131*a*), or to store multiple data set portions 1732 within the payload section 1113 as multiple corresponding data blocks 1131 (e.g., the depicted multiple adjacent data blocks 1131*b*).

The control device 1500 may coordinate such independent actions by the node devices 1700 by providing each node device 1700 with at least one pointer at which the node device 1700 may so store one or more of the data set portions 1732. After coordinating the storage of all of the data set portions 1732 that are to be stored by the node devices 1700 through the distribution of pointers, the control device 1500 may store at least the base map 1115 and/or the metadata 1335 within the payload section 1113. As will be explained in greater detail, the control device 1500 may generate portions of the contents of the base map 1115 as the control device 1500 generates pointers and provides those pointers to the node devices 1700 for use in storing the data set portions 1732.

The base map 1115 may include a contiguous series of bytes. At the starting end of the base map 1115, a first quantity of bytes of the base map 1115 may be occupied by an indication of the map size 1515 that specifies how many bytes, words, doublewords, etc. in total are used to provide a map of the data blocks 1131 within the payload section 1113. Following such a first quantity of bytes may be a second quantity of bytes of the base map 1115 that are occupied by indications of one or more map parameters 1516 that may include an indication that the data of the data set 1330 is non-partitioned data. Following these first two such quantities of bytes may then be a series of map entries 1511 (including the depicted map entries 1511*a* and 1511*b*). The order of the map entries 1511 within at least the base map 1115 may correspond to the order of the data blocks 1131 within the payload section 1113.

For non-partitioned data within the data set 1330, it may be deemed likely that there will be a relatively high quantity of data set portions 1732, and therefore, a correspondingly relatively high quantity of data blocks 1131. It may also be deemed likely that among the numerous data blocks 1131 will be numerous instances of multiple adjacent ones of the data blocks 1131 within the payload section 1113 that are of identical size. Thus, in an effort to take advantage of such likely characteristics of the data blocks 1131 to reduce the overall storage space consumed by a map of the data blocks 1131, each map entry 1511 may include an indication of a data block size specifying a size in bytes, words, doublewords, etc. and a data block count specifying a quantity of adjacent ones of the data blocks 1131 within the payload section 1113 that are of the specified data block size. Thus, the depicted map entry 1511*a* that corresponds to the data block 1131*a* may specify a data block count of 1 and the size of just the data block 1131*a*, while the depicted map entry 1511*b* that corresponds to the trio of adjacent data blocks 1131*b* may specify a data block count of 3 and the single identical size of all three of the data blocks 1131*b*.

FIG. 12B depicts an example embodiment of the organization of the data of the data set 1330 within the data file 1110 where the data of the data set 1330 is of relatively low granularity such that the data of the data set 1330 is deemed to be partitioned data divided into multiple partitions 1333.

As previously discussed, the data of the data set 1330 within each partition 1333 may need to be processed by a single one of the node devices 1700 such that the data of the data set 1330 within each partition 1333 cannot be distributed among multiple ones of the node devices 1700. It may also be deemed likely that there will be wide variations in size among the partitions 1333 (e.g., as a result of the data including strings of widely varying character length, linked lists of widely varying quantities of entries, tree data structures with widely varying quantities of branches, etc.). Thus, while one of the node devices 1700 may be caused to process the data within a single large partition 1333, another of the node devices 1700 may be caused to process the data within multiple significantly smaller partitions 1333. In recognition of such differences between partitioned data and non-partitioned data, the manner in which an embodiment of the data set 1330 made up of partitioned data may be stored within the data file 1110 may differ from the manner in which an embodiment of the data set 1330 made up of non-partitioned data may be stored. More specifically, for partitioned data, the quantity and/or size of each data set portion 1732 may be more tightly correlated to the quantity and/or sizes of the partitions 1333.

Thus, for such a partitioned embodiment, each of the data blocks 1131 in the contiguous series of the data blocks 1131 that follows at least the base map 1115 and the metadata 1335 may include one or more data sub-blocks 1133, and each data sub-block 1133 may correspond to a single data set portion 1732. As will be explained in greater detail, each of the node devices 1700 may act independently of the other node devices 1700 to store a single data set portion 1732 within the payload section 1113 as a single corresponding data sub-block 1133 within a single data block 1131, or to store multiple data set portions 1732 within the payload section 1113 as multiple corresponding data sub-blocks 1133 within a single data block 1131. Again, the control device 1500 may coordinate such independent actions by the node devices 1700 by providing each node device 1700 with at least one pointer at which the node device 1700 may so store one or more of the data set portions 1732 as one or more data sub-blocks 1133 within a single data block 1131. After coordinating the storage of all of the data set portions 1732 that are to be stored by the node devices 1700 through the distribution of pointers, the control device 1500 may store at least the base map 1115 and/or the metadata 1335 within the payload section 1113. The control device 1500 may also store a data header 1112 that provides indications of the quantity of node devices 1700 that are involved in storing the data set 1330 within the payload section 1113. As depicted, in various embodiments, such a data header 1112 may form part of the file header 1111 or part of the payload section 1113 (e.g., part of the map base 1115 or part of the metadata 1335).

Such differences in the manner in which an embodiment of the data set 1330 made up of partitioned data is stored from the manner in which an embodiment of the data set 1330 made up of non-partitioned data is stored may be accompanied by corresponding differences in the content of the base map 1115. More specifically, among the indications of one or more map parameters 1516 may be an indication that the data of the data set 1330 is partitioned data. Again, following the two quantities of bytes at which the base map 1115 and the metadata 1335 are stored may be a series of map entries 1511 that may correspond to the order of the data blocks 1131 within the payload section 1113. However, each map entry 1511 may correspond solely to a single data block 1131, and may include a data sub-block count specifying a quantity of one or more adjacent ones of the data sub-blocks 1133 that are included within the single corresponding data block 1131. Following the sub-block count within each map entry 1511 may be a series of one or more map sub-entries 1513 that each correspond to one of the data sub-blocks 1133 within the corresponding data block 1131, and the order of those map sub-entries 1513 may correspond to the order of the data sub-blocks 1133 within the corresponding data block 1131. Each such map sub-entry 1513 may include an indication of the size of the corresponding data sub-block 1133 and a hashed identifier indicative of the partition 1333 to which the data within the corresponding data sub-block 1133 belongs.

In such a partitioned embodiment, each partition 1333 may be given a unique label that provides a form of unique identification. However, just as the data within the data set 1330 may be any of a variety of types of data, the labels given to each partition 1333 may take any of a variety of forms, including and not limited to, numerical values and/or alpha-numeric text that may be of any arbitrary length. The hashed identifiers may be normalized versions of those labels, and may be generated in some embodiments by taking a hash of the labels, and/or by performing any of a variety of other functions on those labels in other embodiments.

Referring again to both FIGS. 12A and 12B, in various embodiments, the quantity of data blocks 1131 and/or of data sub-blocks 1133 may become relatively numerous that a relatively large quantity of storage space within the payload section 1113 may need to be allocated to accommodate a correspondingly large quantity of map entries 1511 within the base map 1115. In some embodiments, additional space for the storage of map entries 1511 beyond what can be accommodated within the base map 1115 may be provided at one or more other locations within the payload section 1113.

More specifically, and referring to FIG. 12C, one or more map extensions 1117 may be positioned among the base map 1115 and the metadata 1335, and/or may be interspersed among the data blocks 1131 within the payload section 1113. As depicted, the map entries 1511 that may otherwise be stored within the base map 1115 may, instead, be stored within the first of the map extensions 1117 to be stored within the payload section 1113 following the base map 1115. This may be done to make room within the base map 1115 for a series of extension pointers 1517 that each provide an indication of the location of one of the map extensions 1117 within the payload section, and the order of the extension pointers 1517 within the base map 1115 may coincide with the order of the map extensions 1117 within the payload section 1113.

In some embodiments, each map extension 1117 may be required to be stored within the payload section 1113 at a location that is ahead of the locations of all of the data blocks 1131 for which the map extension 1117 includes map entries 1511 to enable more efficient retrieval of one or more of those data blocks 1131 from within the payload section 1113. In some embodiments, the base map 1115 and each of the map extensions 1117 may share a common size. In other embodiments, the first map extension 1117 following the base map 1115 within the payload section 1113 may have a size that is double the size of the base map 1115, and each additional map extension 1117 may have a size that is double the size of the preceding map extension 1117 within the payload section 1113. As a result, in embodiments in which the payload section 1113 includes multiple map extensions 1117, the size of the map extensions 1117 from the first to the last may grow exponentially. Where such a predictable pattern of increasing size in the map extensions 1117 is used, there may be no need to store an indication within the base map 1115 of the sizes of each of the map extensions 1117.

Figure 13A:
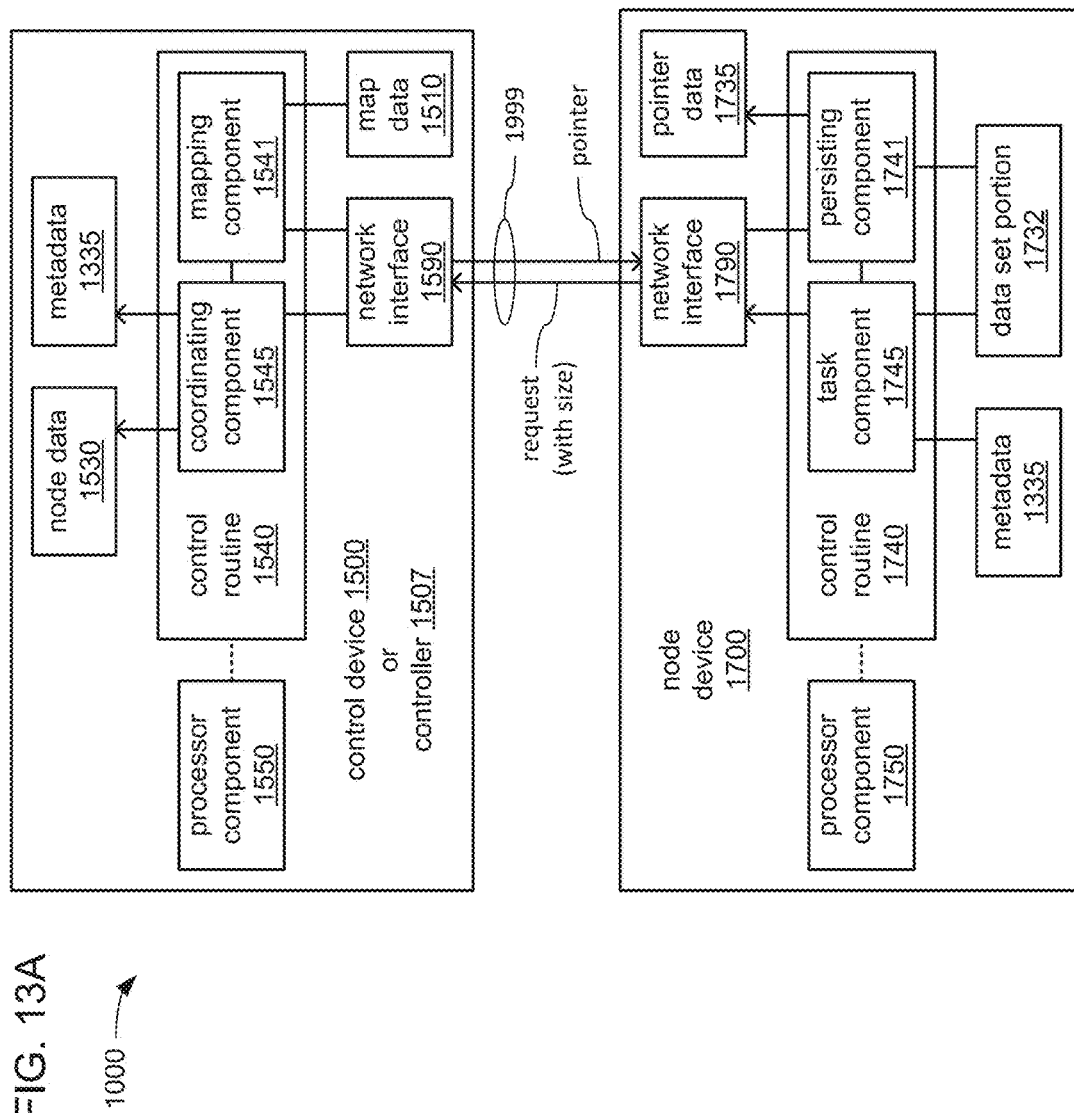
Figure 13B:
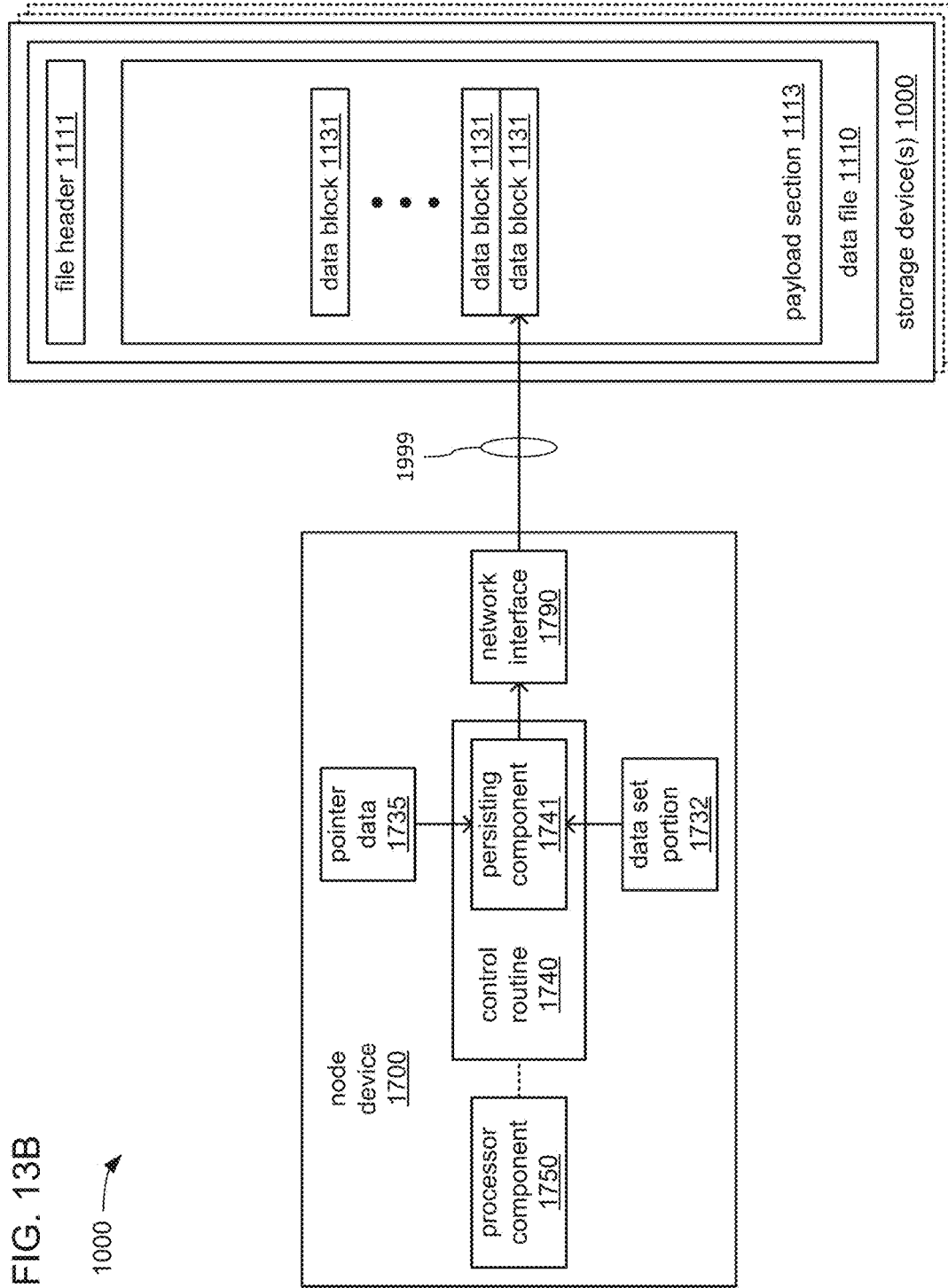
Figure 13D:
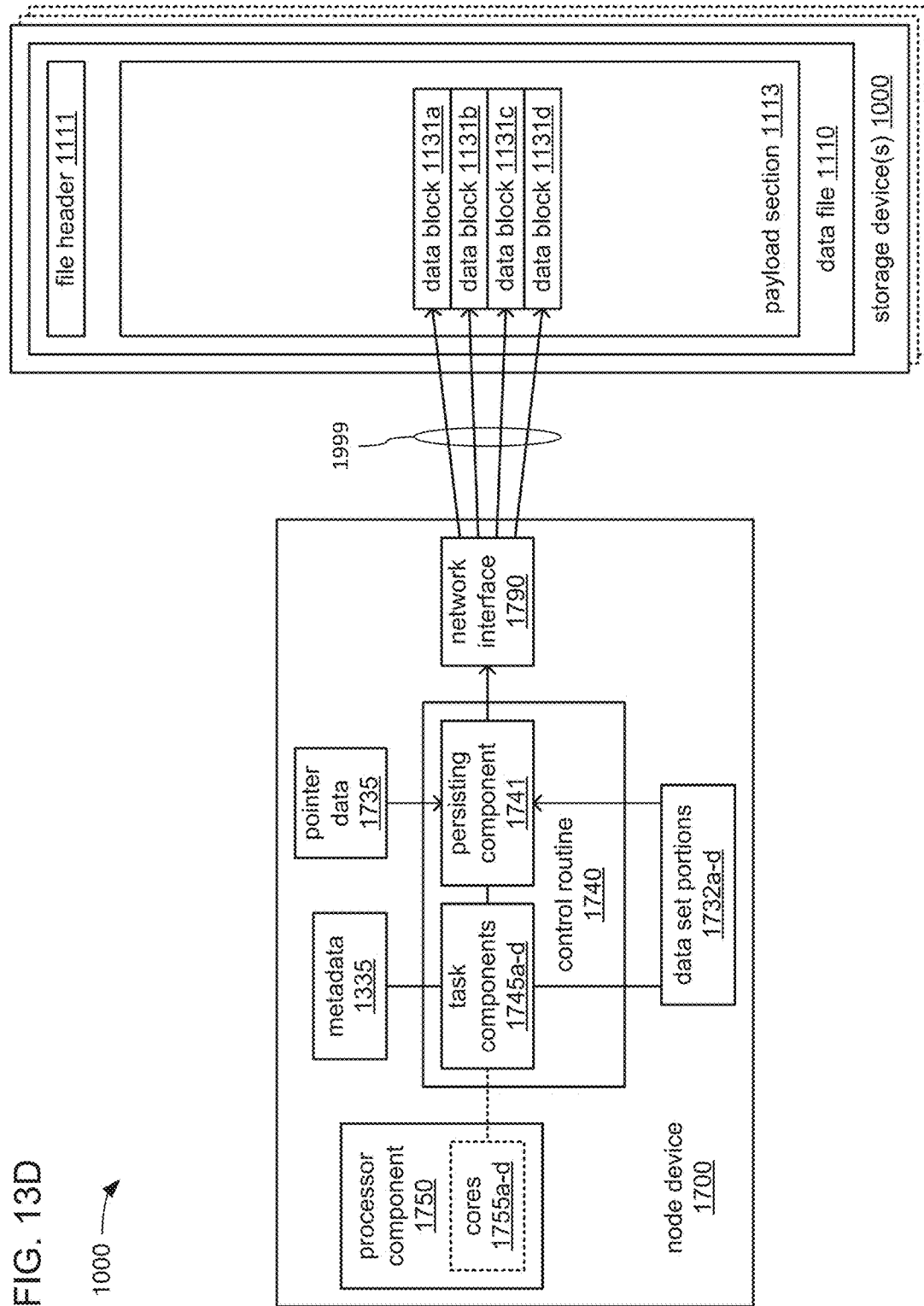
Figure 13E:
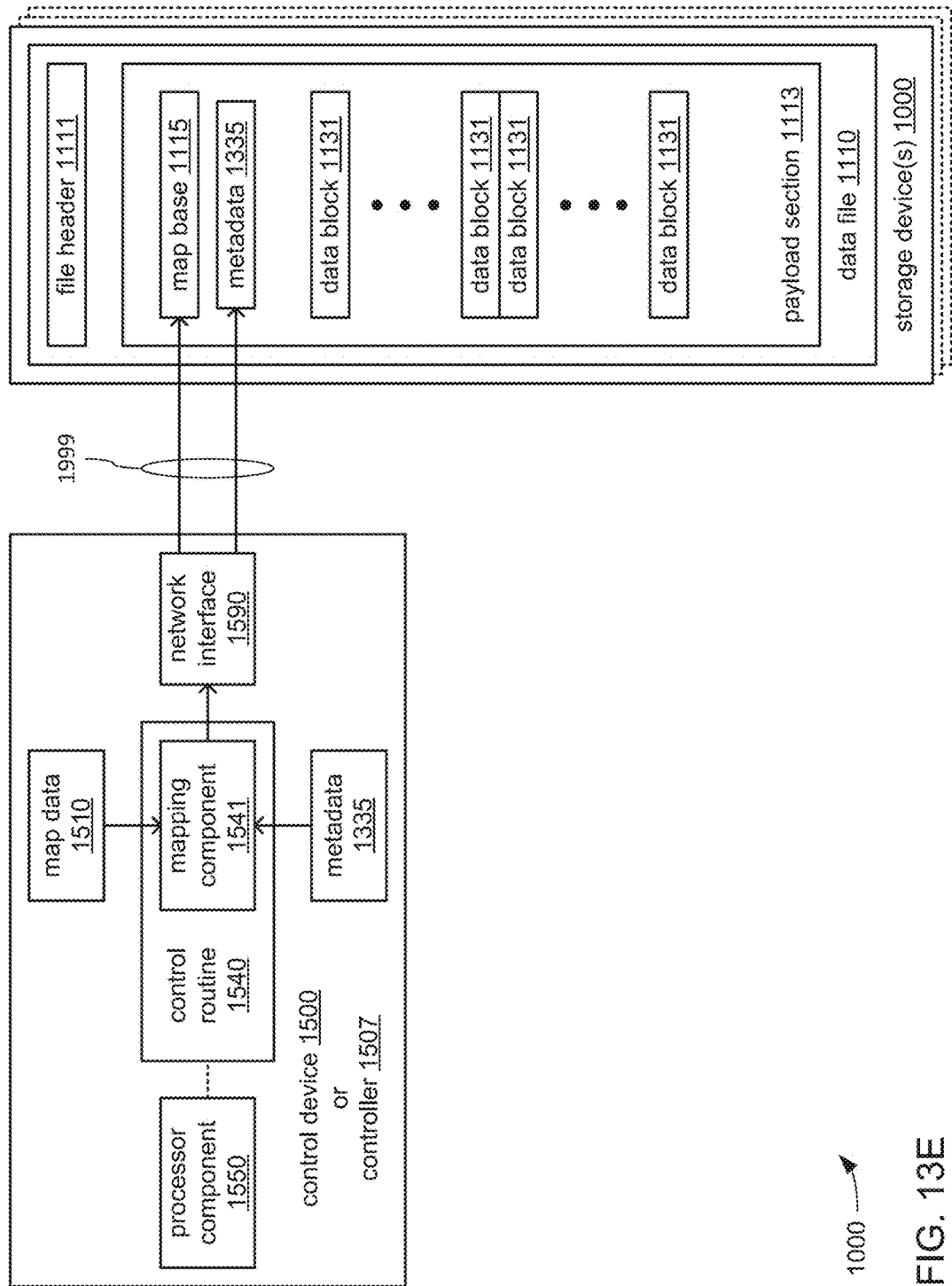

FIGS. 13A-E, together, illustrate an example of storing an embodiment of the data set 1330 made up of non-partitioned data in embodiments of the distributed processing system 1000 of FIG. 11A or 11B in greater detail. More specifically, FIGS. 13A and 13B, together, depict aspects of the storage of a single data set portion 1732 by a single node device 1700. FIGS. 13C and 13D, together, depict aspects of the storage of multiple data set portions 1732 by a single node device 1700. FIG. 13E depicts aspects of the storage of the map data 1510 by the control device 1500 (or the controller 1500).

As recognizable to those skilled in the art, the control routines 1540 and 1740, including the components of which each is composed, are selected to be operative on whatever type of processor or processors that are selected to implement applicable ones of the processor components 1550 and/or 1750. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor components 1550 and/or 1750. Where one or more device drivers are included, those device drivers may provide support for any of a variety of other components, whether hardware or software components, of the node devices 1700 and/or the control device 1500 (or the controller 1500 incorporated into one of the node devices 1700).

Turning to FIG. 13A, as depicted, the control routine 1740 may include a task component 1745 to perform processing tasks as directed by the control device 1500, and a persisting component 1741 to effect storage of a data set portion 1732 that may have been generated through a performance of a task by the task component 1745. Correspondingly, the control routine 1540 may include a coordinating component 1545 to coordinate the at least partially parallel distributed performances of various tasks among multiple ones of the node devices 1700, and a mapping component 1541 to coordinate the at least partially parallel and distributed performances of storage and retrieval of data set portions 1732 by the multiple ones of the node devices 1700.

In some embodiments, upon completion of a processing task involving a data set portion 1732 of the data set 1330, the task component 1745 may operate the network interface 1790 of the node device 1700 to transmit an indication of such completion to the control device 1500 via the network 1999. In embodiments in which the completed task includes the generation of the data set portion 1732, the task component 1745 may transmit at least a portion of the metadata 1335 that describes aspects of the organization of data within the data set portion 1732 to the control device 1500 via the network 1999. Additionally, in response to such completion of the processing task by the task component 1745, the persisting component 1741 may operate the network interface 1790 to transmit a request to the control device 1500 for a pointer to a location within the payload section 1113 of the data file 1110 (see FIG. 12A) at which to store the data set portion 1732. In so doing, the persisting component 1741 may transmit an indication of the size of the data set portion 1732 along with the request to provide the control device 1500 with an indication of how much storage space is needed within the payload section 1113 to store the data set portion 1732 as a data block 1131.

Within the control device 1500, the coordinating component 1545 may operate the network interface 1590 to recurringly monitor for received indications of the status of node devices 1700, and may maintain indications of the current state of each node device 1700 as part of the node data 1530. In response to receiving the indication of completion of the processing task involving the data set portion 1732 from the node device 1700, the coordinating component 1545 may update an indication of the current status of the node device 1700 within the node data 1530 to reflect such completion. Additionally, the mapping component 1541 may operate the network interface 1590 to recurringly monitor for requests for pointers. In response to receiving the request for a pointer from the node device 1700 for use in storing the data set portion 1732, the mapping component 1541 may employ indications earlier stored within the map data 1510 of portions of the payload section 1113 that have already been allocated to identify a location within the payload section 1113 at which the data set portion 1732 may be stored. The mapping component 1541 may then operate the network interface 1590 to transmit a pointer to that identified location back to the node device 1700 via the network 1999. The mapping component 1541 may then also update the map data 1510 with an indication of where the data set portion 1732 is to be stored within the payload section 1113 to enable the subsequent identification of another location within the payload section 1113 at which another data set portion 1732 may be stored and for which another pointer may be provided in response to another request from another node device 1700.

In response to receiving the pointer transmitted from the control device 1500 in response to the earlier transmitted request for a pointer, the persisting component 1741 may store an indication of the received pointer within the pointer data 1735. Turning to FIG. 13B, as depicted, the persisting component 1741 may then operate the network interface 1790 to transmit the data set portion 1732 to the one or more storage devices 1100 along with a command to the one or more storage devices 1100 to store the data set portion 1732 as a data block 1131 at the location within the payload section 1113 that is specified by the pointer. It should be noted that although FIG. 13B depicts an example of the node device 1700 storing the single data set portion 1732 of non-partitioned data as a single data block 1131, other embodiments are possible in which the node device 1700 may store multiple data set portions 1732 of non-partitioned data.

Turning to FIG. 13C, as depicted, embodiments are possible in which at least one of multiple node devices 1700 (e.g., the depicted node device 1700y) stores a single data set portion 1732 of an embodiment of the data set 1330 made up of non-partitioned data as a single data block 1131, while at least one other of the multiple node devices 1700 (e.g., the depicted node devices 1700x and 1700z) stores multiple data set portions 1732 thereof as corresponding multiple data blocks 1131. Also depicted in FIG. 13C is an example of how the timing of the transmitting of requests to the control device 1500 for pointers may result in interspersing of data blocks 1131 from different node devices 1700 within the payload section 1113. More specifically, upon completion of performing one or more processing tasks involving data set portions 1732a and 1732b, the depicted node device 1700x may have requested a pair of pointers to a pair of adjacent locations within the payload section 1113 at which to store the data set portions 1732a and 1732b as adjacent data blocks 1131*a* and 1131*b*. Alternatively, upon completion of such performance, the node device 1700*x* may have requested a single pointer to a single location within the payload section 1113 large enough thereat to store both of the data set portions 1732*a* and 1732*b* as the adjacent data blocks 1131*a* and 1131*b*.

In contrast, upon completion of performing one or more processing tasks involving data set portion 1732*d*, and before completion of the same one or more processing tasks involving data set portion 1732*e*, the depicted node device 1700*z* may have requested a single pointer to a single location within the payload section 1113 at which to store the data set portion 1732*d* as data block 1131*d*. Then, before the node device 1700*z* is able to complete such processing involving data set portion 1732*e* and/or request another single pointer to another single location within the payload section 1113 at which to store the data set portion 1732*e* as the data block 1131*e*, the depicted node device 1700*y* may complete such processing of data set portion 1732*c* and may request a pointer to a location within the payload section 1113 at which to store the data set portion 1732*c* as the data block 1131*c*. As a result, the node device 1700*y* may be provided with a pointer for use in storing the data set portion 1732*c* before the node device 1700*z* is provided with a pointer for use in storing the data set portion 1732*e*. This may lead to the data block 1131*c* being stored at a location within the payload section 1113 that is interposed between the locations at which the data blocks 1131*d* and 1131*e* are stored.

It should be noted that the timing by which requests for pointers are received at the control device 1500 and/or by which the control device 1500 transmits the requested pointers back to the ones of the node devices 1700 that requested them does not necessarily control the timing by which corresponding data set portions 1732 are stored within the payload section 1113. More specifically, any of a variety of factors may cause one node device 1700 to more quickly make use of a received pointer to a location within the payload section 1113 than another node device 1700. Thus, a data set portion 1732 for which a pointer was later received may at least begin to be stored before another data set portion 1732 for which a pointer was received earlier.

Turning to FIG. 13D, a single node device 1700 may output the depicted multiple data set portions 1732*a-d* as a result of performing multiple instances of a processing task at least partially in parallel within the single node device 1700 in which each instance generates one of the multiple data set portions 1732*a-d*. More specifically, as depicted, each of multiple instances of the task component 1745*a-d* may be executed in a separate thread of execution by the processor component 1750 of the single node device 1700, and/or the processor component 1750 may incorporate multiple cores 1755*a-d* that are each capable of executing one of the instances of the task component 1745*a-d* independently of the others. Thus, in such embodiments, the single one of the node devices 1700 may internally function in a manner akin to multiple ones of the node devices 1700 in generating the multiple data set portions 1732*a-d*.

In some of such embodiments, the multiple instances of the task component 1745*a-d* may be capable of coordinating thereamong to the extent of causing the persisting component 1741 to combine what might otherwise be multiple separate requests for multiple separate pointers into a single request for a single pointer for all of the multiple data set portions 1732*a-d*. The persisting component 1741 may then operate the network interface 1790 to transmit such a single request to the control device 1500 for a single pointer for use in storing all of the multiple data set portions 1732*a-d* as adjacently located data blocks 1131*a-d* within the payload section 1113. Such combining into a single request in which the multiple data set portions 1732*a-d* are then caused to be stored as a single data block 1131 may be deemed advantageous by allowing the one or more storage devices 1100 to determine a relatively optimal organization of the storage of that resulting data block 1131 among the one or more storage devices 1100 based on the configuration of storage components therein, including and not limited to, a relatively optimal splitting of that resulting data block 1131 among more than one storage component. The fact of the multiple data set portions 1732*a-d* also being transmitted by the depicted node device 1700 as a single data block 1131 may also allow some degree of optimization in the transmission to be arrived at between the depicted node device 1700 and the one or more storage devices 1100, thereby addressing possible issues of contention among the node devices 1700 as each acts at least partially in parallel to store one or more data blocks 1131. In some of such embodiments, the request may specify only a single size that is a sum of the sizes of all of the data set portions 1732*a-d*, while in others of such embodiments, the request may separately specify the sizes of alternatively may include specifications of a separate size for each data set portion 1732*a-d*. However, in other embodiments, the multiple instances of the task component 1745*a-d* may not be capable of such coordination (or may simply have not been architected to engage in such coordination) such that each causes the persisting component 1741 to transmit a separate request for a separate pointer for use in separately storing each of the multiple data set portions 1732*a-d*. As discussed with regard to FIG. 3C, the use of such separate requests for pointers may result in the multiple data set portions 1732*a-d* being stored within the payload section 1113 in a manner that is not contiguous.

Turning to FIG. 13E, following the provision of pointers for the storage of all data set portions 1732 of the non-partitioned embodiment of the data set 1330, the mapping component 1541 may operate the network interface 1590 to transmit the map data 1510 to the one or more storage devices 1100 for storage within the payload section 1113 as at least the base map 1115. However, as previously discussed in reference to FIG. 12C, where the map data 1510 becomes relatively large in the amount of storage required to store it within the payload section 1113, the map data 1510 may alternatively be stored as a combination of the base map 1115 and one or more map extensions 1117. In addition to storing the map data 1510 as at least the base map 1115, the mapping component 1541 may also operate the network interface 1590 to transmit the metadata 1335 to the one or more storage devices 1100 for storage within the payload section 1113.

In some embodiments, the mapping component 1541 may operate the network interface 1590 to recurringly monitor for indications from each node device 1700 of not needing to request any more pointers from the control device 1500. In such embodiments, the mapping component 1541 may delay the storage of at least the map data 1510 until indications have been received from all of the multiple node devices 1700 involved in processing the non-partitioned embodiment of the data set 1330 that there will be no more requests for pointers. However, in embodiments in which each of the node devices 1700 is required to request only a single pointer for all data set portions 1732 that are to be stored by that node device 1700, the control device 1500 may determine whether there are more data set portions 1732 for which pointers remain to be requested based on whether or not requests for pointers have been received from all of the node devices 1700 involved in processing the data set 1330. Thus, in such embodiments, exchanges of information between the control device 1500 and the node devices 1700 through the network 1999 for purposes of coordinating at least the storage of the data set 1330 may advantageously be further minimized by elimination of the need for exchanges of explicit indications of whether there are more data set portions 1732 for which pointers remain to be requested.

Figure 14A:
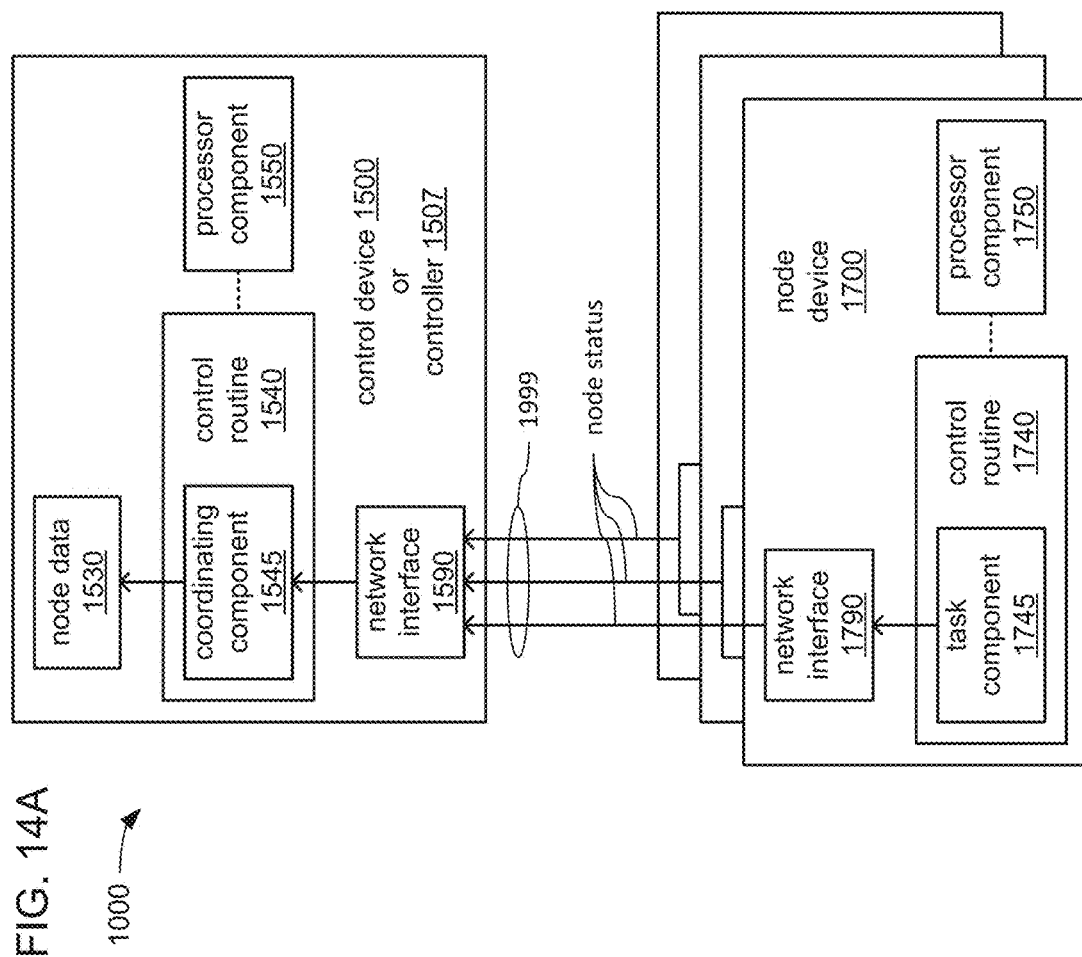
FIGS. 14A, 14B, 14C, 14D and 14E, together, illustrate an example of retrieving non-partitioned data of a data set.
Figure 14B:
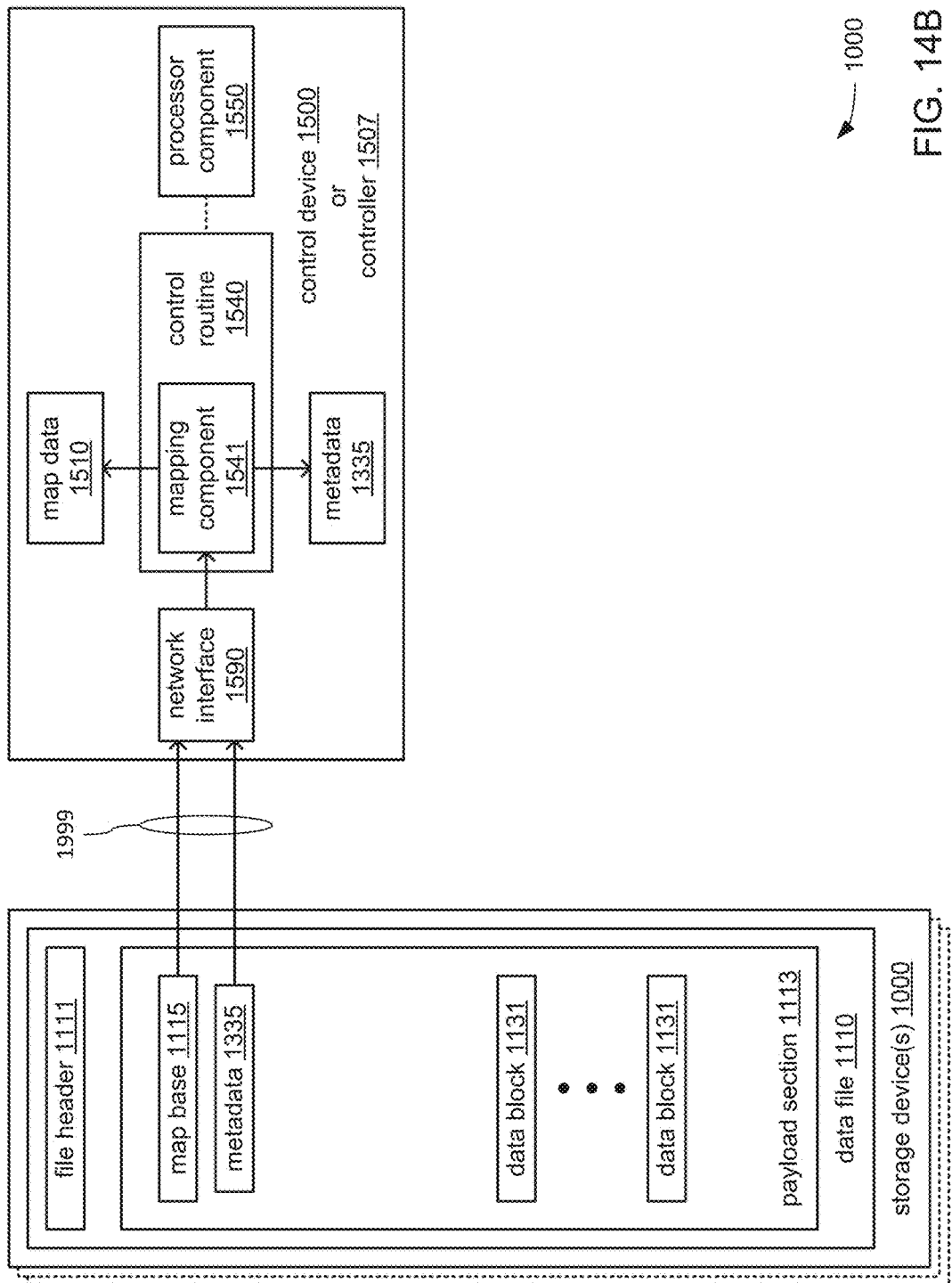
Figure 14C:
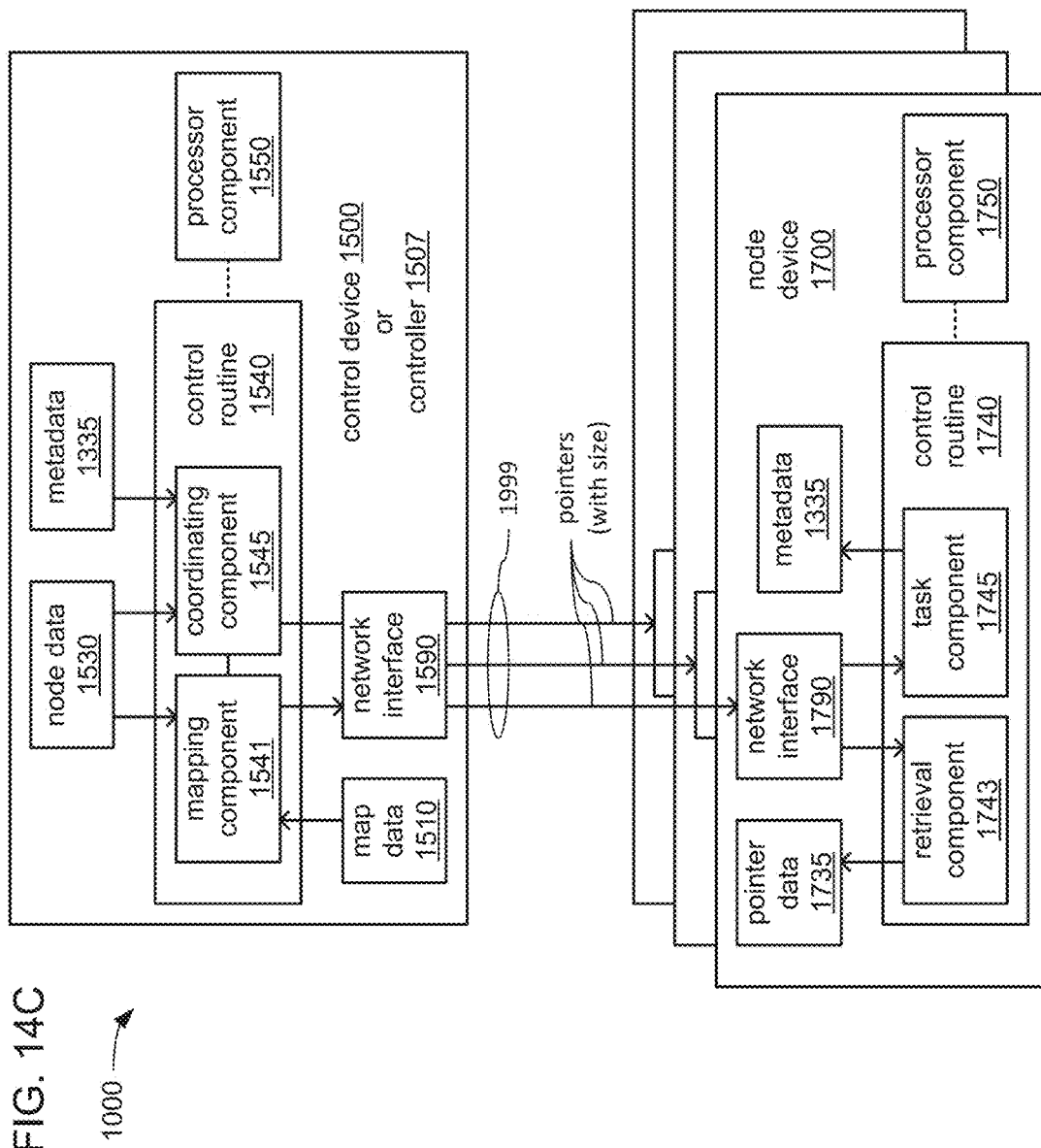
Figure 14D:
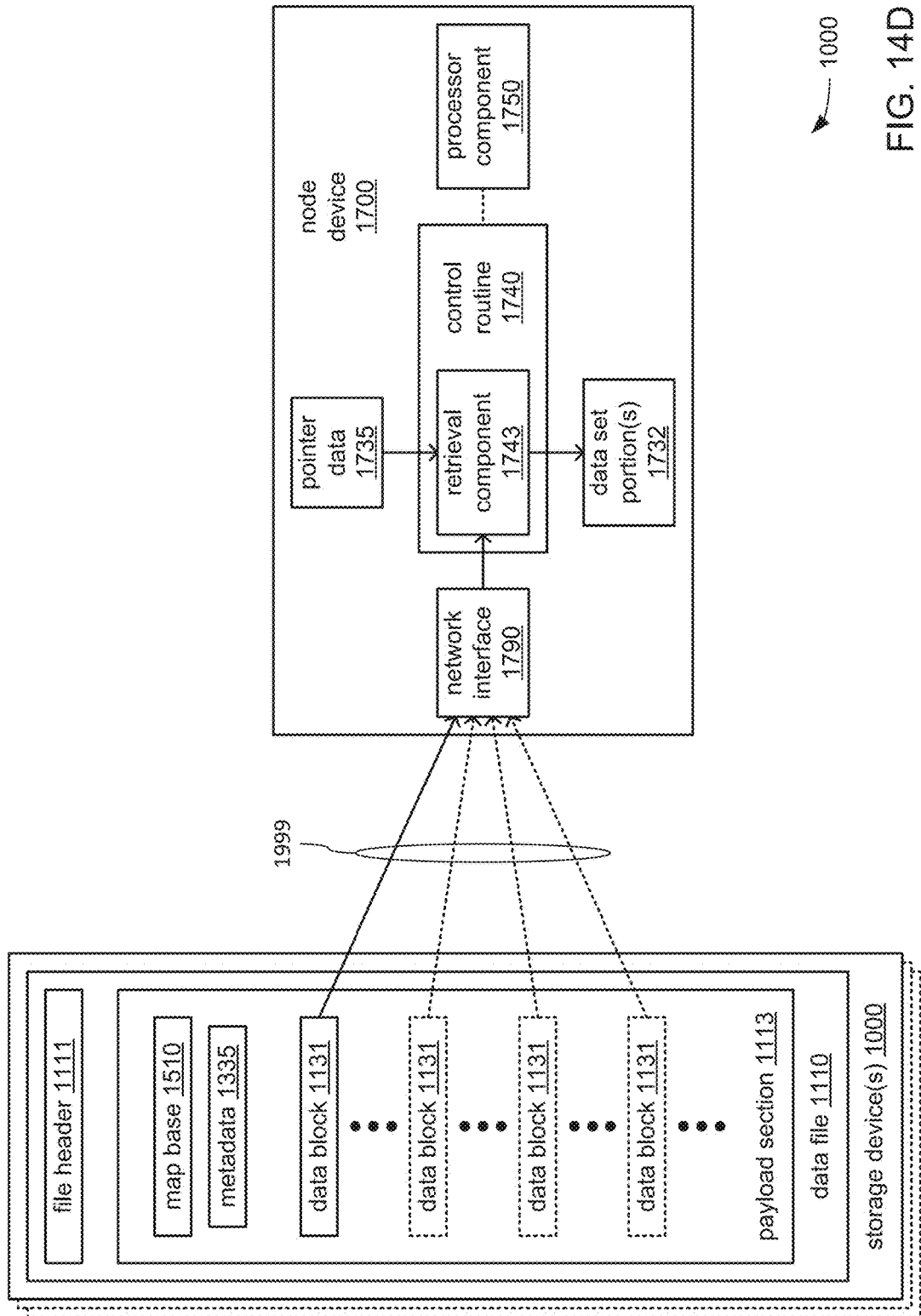
Figure 14E:
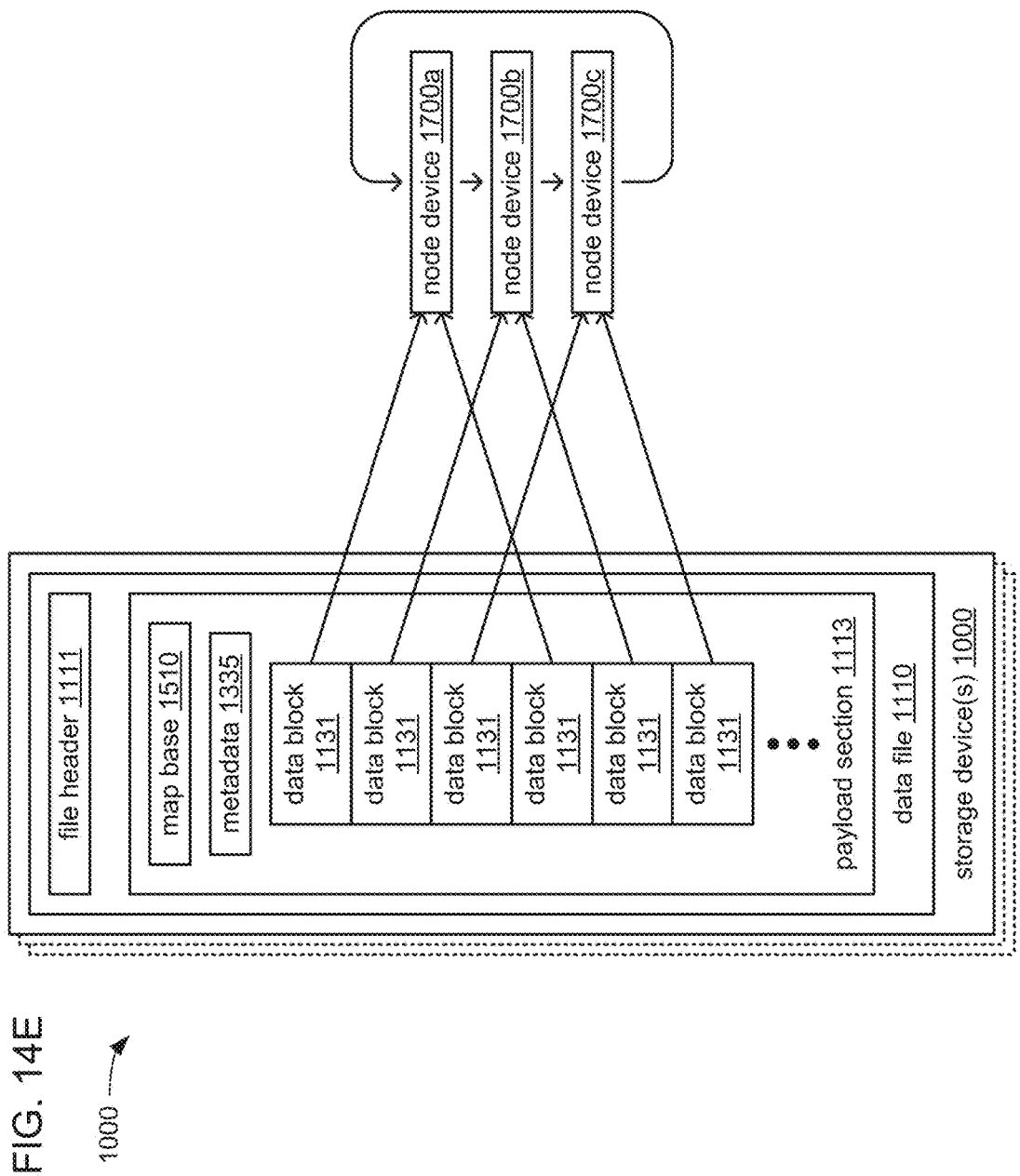

FIGS. 14A-E, together, illustrate an example of retrieving an embodiment of the data set 1330 made up of non-partitioned data in embodiments of the distributed processing system 1000 of FIG. 11A or 11B in greater detail. More specifically, FIGS. 14A and 14B, together, depict aspects of the collection of information needed by the control device 1500 to determine a distribution of data set portions 1732 among available ones of the node devices 1700. FIG. 14C depicts aspects of transmission of the pointers to available ones of the node devices 1700. FIG. 14D depicts aspects of the retrieval of one or more data set portions 1732 by a single node device 1700. FIG. 14E depicts aspects of an approach to effecting a relatively balanced distribution of the data set portions 1732 among available ones of the node devices 1700.

Turning to FIG. 14A, within each node device 1700 of multiple node devices 1700, the task component 1745 may operate the network interface 1790 to recurringly transmit indications of the current status of the node device 1700 to the control device 1500 via the network 1999. Such recurring transmissions may convey an indication of the availability of the node device 1700 to perform tasks on one or more portions of a data set.

Within the control device 1500, the coordinating component 1545 may operate the network interface 1590 to recurringly monitor for received indications of the status of node devices 1700, and may maintain and recurringly update indications of the current state of each node device 1700 as part of the node data 1530. More specifically, the coordinating component 1545 may recurringly monitor for indications of whether each node device 1700 of multiple node devices 1700 is available to be assigned to perform operations on a portion of a data set as part of a distributed and at least partially parallel performance of a processing task involving multiple portions of a data set, such as the embodiment of the data set 1330 made up of non-partitioned data.

Turning to FIG. 14B, as part of retrieving the non-partitioned data of such an embodiment of the data set 1330, the mapping component 1541 may operate the network interface 1590 to retrieve the base map 1115 (and any accompanying map extensions 1117—see FIG. 12C) via the network 1999 from the payload section 1113 of the data file 1110 stored within the one or more storage devices 1100. As previously discussed, the base map 1115 (and any accompanying map extensions 1117) may provide a map of the manner in which the multiple data set portions 1732 of the non-partitioned embodiment of the data set 1330 are stored within the payload section 1113 as multiple data blocks 1131, and the mapping component 1541 may store such a map as the map data 1510. Additionally, the mapping component 1541 may operate the network interface 1590 to retrieve the metadata 1335 that describes aspects of the organization of data within the data set 1330 via the network 1999 from the payload section 1113.

Turning to FIG. 14C, the coordinating component 1545 may refer to the recurringly updated indications of status of multiple node devices 1700 in the node data 1530 to determine which ones of the multiple node devices 1700 are currently available to perform a processing task on one or more data set portions 1732 of the non-partitioned embodiment of the data set 1330. The coordinating component 1545 may then operate the network interface 1590 to transmit an indication of what the processing task is to the available ones of the node devices 1700 via the network 1999. In so doing, the coordinating component 1545 may also distribute copies of at least a portion of the metadata 1335 to each of those available node devices 1700.

Additionally, the mapping component 1541 may operate the network interface 1590 to transmit, to the available ones of the node devices 1700, one or more pointers to data blocks 1131 within the payload section 1113. In so doing, the mapping component 1541 may refer to the map data 1510 to identify the locations within the payload section 1113 at which each of the pointers point to enable retrieval of the data blocks 1131 therefrom. In some embodiments, the mapping component 1541 may derive such locations for each data block 1131 within the payload section 1113, at least in part, by summing the sizes specified in the map data 1510 for all the data blocks 1131 that precede each data block 1131. The mapping component 1541 may receive indications of which ones of the multiple node devices 1700 are the available ones from the coordinating component 1545 or may directly retrieve such indications from the node data 1530. Each transmission of a pointer may include an indication of the size of the data block(s) 1131 pointed to by that pointer to enable each of the available ones of the node devices 1700 to retrieve the correct amount of data when retrieving each of the data blocks 1131 from the payload section 1113.

Within each node device 1700, the task component 1745 may operate the network interface 1790 to recurringly monitor for received indications from the control device 1500 of a task to perform, and may locally store any portion of the metadata 1335 received via the network 1999 for use in performing such a task. As depicted, the control routine 1740 may additionally include a retrieval component to effect retrieval of one or more data set portions 1732 from the payload section 1113, in which the one or more data set portions 1732 may be stored as one or more corresponding data blocks 1131, for use in the performance of a task by the task component 1745. The retrieval component may operate the network interface 1790 to recurringly monitor for any transmissions of pointers from the control device 1500 via the network 1999, and may store any such received pointers as part of the pointer data 1735.

Turning to FIG. 14D, which depicts a single example one of the available node devices 1700, in response to receiving one or more pointers to one or more data blocks 1131 within the payload section 1113, the retrieval component 1743 may operate the network interface 1790 to retrieve the one or more data blocks 1131 from the payload section 1113. In so doing, the retrieval component 1743 may transmit one or more commands to the one or more storage devices 1100 to provide the one or more data blocks 1131, employing the one or more pointers and/or the accompanying indications of size to specify the one or more data blocks 1131 to be provided. The retrieval component 1743 may locally store each of the retrieved data blocks 1131 as a data set portion 1732 for use by the task component 1745 in performing the task specified to the node device 1700 by the control device 1500.

How many of the data blocks 1131 are retrieved by each of the available ones of the node devices 1700 from the payload section 1113 may be determined by the manner in which pointers to the data blocks 1131 are distributed among the available ones of the node devices 1700 by the control device 1500. Turning to FIG. 14E, in some embodiments, the pointers may be distributed in a round robin manner to the available ones of the node devices 1700. It should be noted that FIG. 14E depicts a relatively simplistic example of distribution of among only three node devices 1700a-c in a round robin for purposes of illustration. It is envisioned that a considerably greater quantity of node devices 1700 would more likely be used. This approach may be deemed desirable due to its simplicity of implementation and/or as an approach to distributing the data set portions 1732 of the non-partitioned embodiment of the data set 1330 among the available ones of the node devices 1700 in relatively similar quantities.

Figure 15A:
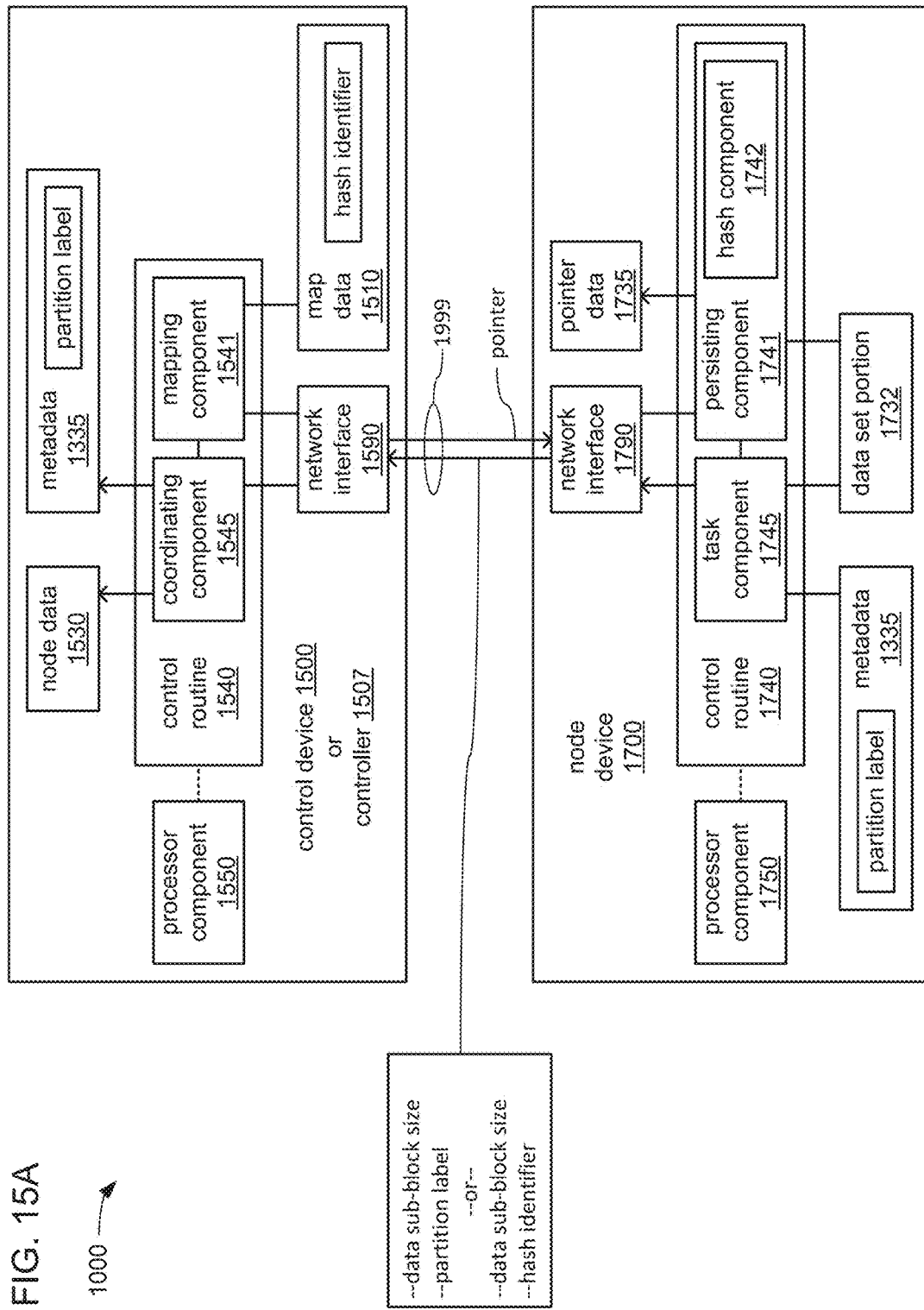
FIGS. 15A, 15B, 15C, 15D and 15E, together, illustrate an example of storing portions of partitioned data of a data set.
Figure 15B:
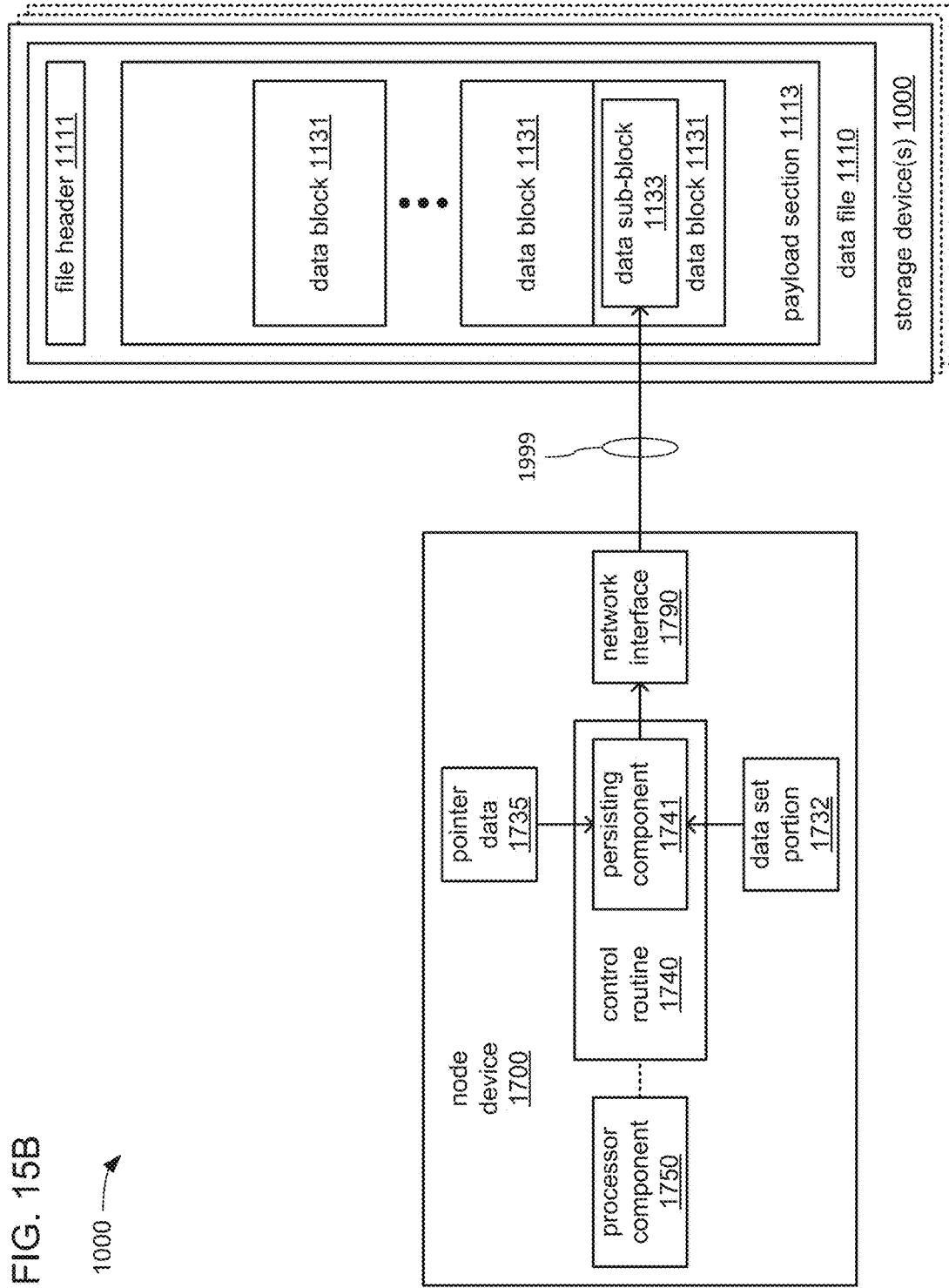
Figure 15C:
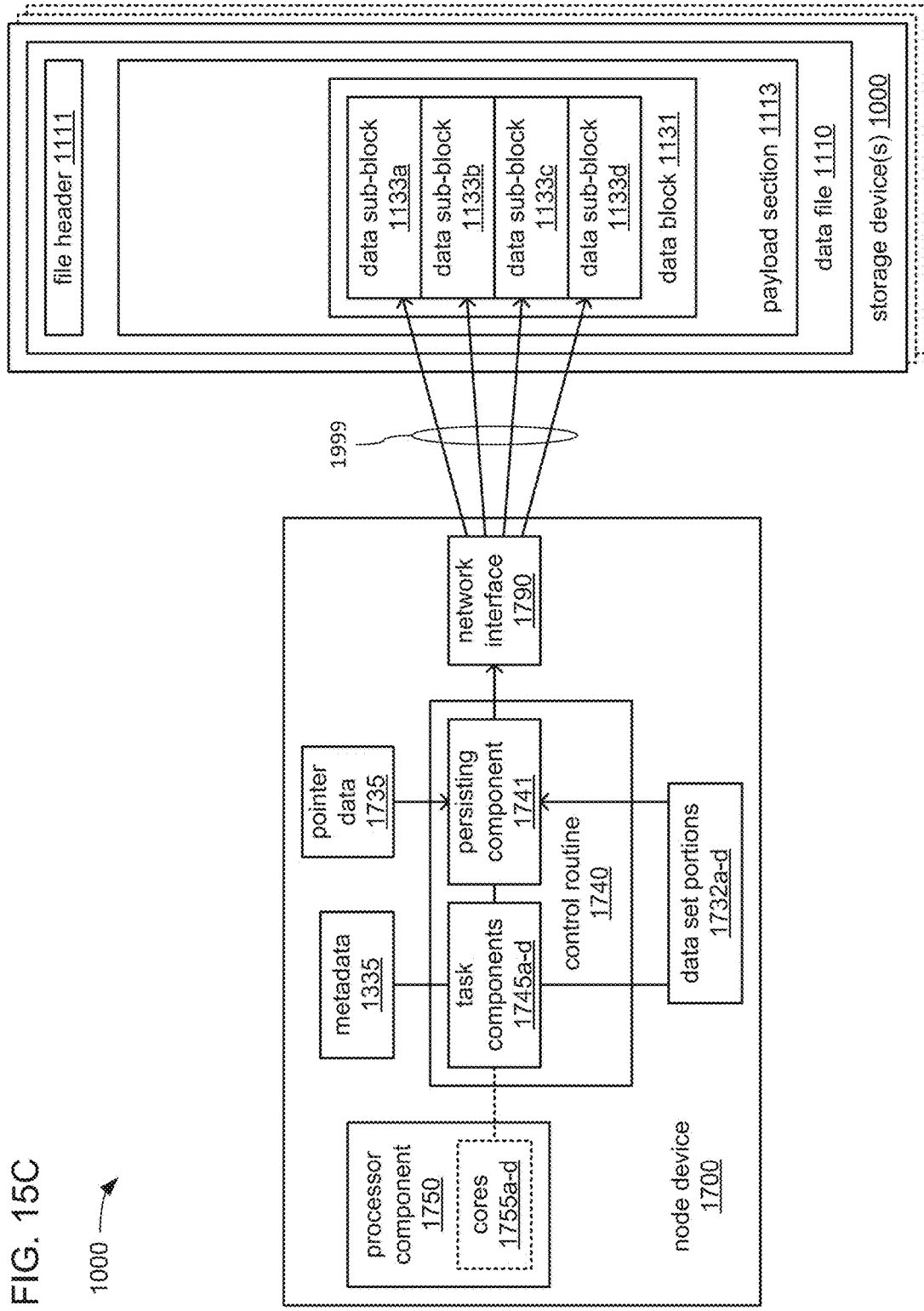
Figure 15D:
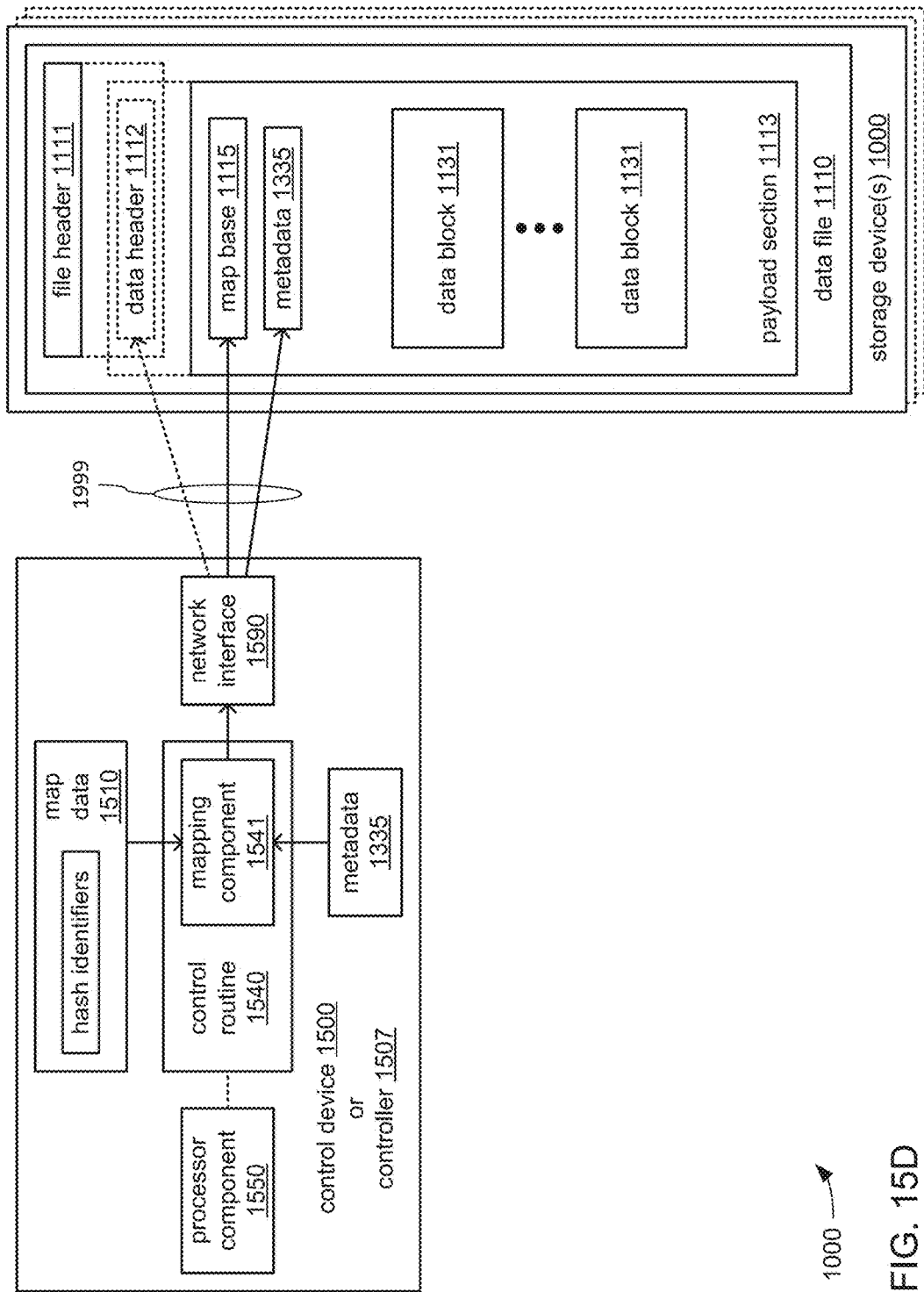
Figure 15E:
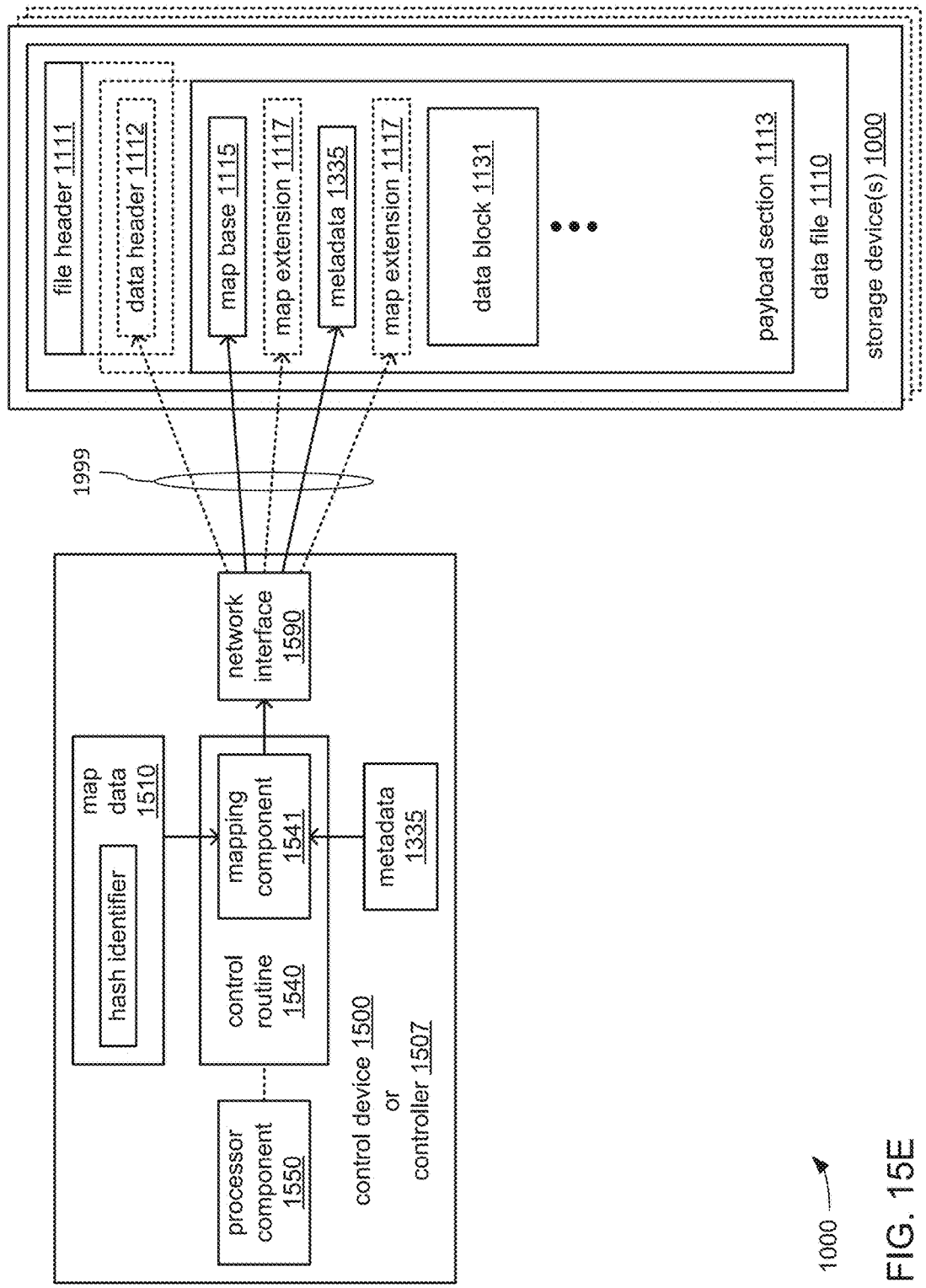

FIGS. 15A-E, together, illustrate an example of storing an embodiment of the data set 1330 made up of partitioned data in embodiments of the distributed processing system 1000 of FIG. 11A or 11B in greater detail. More specifically, FIGS. 15A and 15B, together, depict aspects of the storage of a single data set portion 1732 by a single node device 1700. FIG. 15C depicts aspects of the storage of multiple data set portions 1732 by a single node device 1700. FIGS. 15D and 15E, together, depict aspects of the storage of the map data 1510 by the control device 1500 (or the controller 1507).

Turning to FIG. 15A, in some embodiments, upon completion of a processing task involving a data set portion 1732 of the data set 1330, the task component 1745 may operate the network interface 1790 of the node device 1700 to transmit an indication of such completion to the control device 1500 via the network 1999. In embodiments in which the completed task includes the generation of the data set portion 1732, the task component 1745 may transmit to the control device 1500 at least a portion of the metadata 1335 that describes aspects of the organization of data within the data set portion 1732, including which partition 1333 (see FIG. 12B) the data set portion 1732 belongs to. Additionally, in response to such completion of the processing task by the task component 1745, the persisting component 1741 may operate the network interface 1790 to transmit a request to the control device 1500 for a pointer to a location within the payload section 1113 of the data file 1110 (see FIG. 12B) at which to store the data set portion 1732.

In transmitting the request for a pointer to the control device 1500, the persisting component 1741 may transmit an indication of the size of the data set portion 1732 along with the request to provide the control device 1500 with an indication of how much storage space is needed within the payload section 1113 to store the data set portion 1732 as a data sub-block 1133 within a data block 1131. Further, the persisting component 1741 may additionally transmit a hashed identifier generated from the label of the partition 133 to which the data set portion 1732 belongs. As depicted, in some embodiments, the persisting component 1741 may include a hash component 1742 to generate such hashed identifiers from the unique labels provided to each of one or more partitions 1333 of the partitioned data. In such embodiments, the hash component 1742 may take a hash of (or perform any of a variety of other normalization operations with) the partition label of the partition to which the data set portion 1732 belongs to generate the corresponding hashed identifier that the persisting component 1741 may transmit to the control device 1500 in the request for a pointer.

Within the control device 1500, the mapping component 1541 may store the hashed identifier as part of the map data 1510 in a manner that associates the hashed identifier with the data set portion 1732 and the partition 1333 to which the data set portion 1732 belongs. Also within the control device 1500, the coordinating component 1545 may operate the network interface 1590 to recurringly monitor for received indications of the status of node devices 1700, and may maintain indications of the current state of each node device 1700 as part of the node data 1530. In response to receiving the indication of completion of the processing task involving the data set portion 1732 from the node device 1700, the coordinating component 1545 may update an indication of the current status of the node device 1700 to reflect such completion within the node data 1530. Additionally, in response to receiving the request for a pointer from the node device 1700 for use in storing the data set portion 1732, the mapping component 1541 may employ indications earlier stored within the map data 1510 of portions of the payload section 1113 that have already been allocated to identify a location within the payload section 1113 at which the data set portion 1732 may be stored. More specifically, the mapping component 1541 may derive such locations for each data sub-block 1133 within the payload section 1113, at least in part, by summing the sizes specified in the map data 1510 for all preceding data sub-blocks 1133. The mapping component 1541 may then operate the network interface 1590 to transmit a pointer to that identified location back to the node device 1700 via the network 1999. The mapping component 1541 may then also update the map data 1510 with an indication of where the data set portion 1732 is to be stored within the payload section 1113 to enable the subsequent identification of another location within the payload section 1113 at which another data set portion 1732 may be stored and for which another pointer may be provided in response to another request from another node device 1700.

In response to receiving the pointer transmitted from the control device 1500 in response to the earlier transmitted request for a pointer, the persisting component 1741 may store an indication of the received pointer within the pointer data 1735. Turning to FIG. 15B, as depicted, the persisting component 1741 may then operate the network interface 1790 to transmit the data set portion 1732 to the one or more storage devices 1100 along with a command to the one or more storage devices 1000 to store the data set portion 1732 as a data sub-block 1133 within a data block 1131 at the location within the payload section 1113 that is specified by the pointer. It should be noted that although FIG. 15B depicts an example of the node device 1700 storing the single data set portion 1732 as a single data sub-block 1133, other embodiments are possible in which the node device 1700 may store multiple data set portions 1732 of the partitioned embodiment of the data set 1330 as multiple corresponding data sub-blocks 1133 within the single data block 1131.

Turning to FIG. 15C, in some embodiments, the node device 1700 may output the depicted multiple data set portions 1732a-d as a result of performing multiple instances of a processing task at least partially in parallel within the single node device 1700 in which each instance generates one of the multiple data set portions 1732a-d. More specifically, as depicted, each of multiple instances of the task component 1745a-d may be executed in a separate thread of execution by the processor component 1750 of the single node device 1700, and/or the processor component 1750 may incorporate multiple cores 1755a-d that are each capable of executing one of the instances of the task component 1745a-d independently of the others. Thus, in such embodiments, the single one of the node devices 1700 may internally function in a manner akin to multiple ones of the node devices 1700 in generating the multiple data set portions 1732*a-d*.

In such embodiments, the multiple instances of the task component 1745*a-d* may coordinate to cause the persisting component 1741 to transmit a single request to the control device 1500 for a single pointer for use in storing all of the multiple data set portions 1732*a-d* as adjacently located data sub-blocks 1133*a-d* within a single data block 1131 within the payload section 1113. The request may include separate indications of a hashed identifier for each of the data set portions 1732*a-d*. Where all of the multiple data set portions 1732*a-d* belong to the same partitions 1333, the same hashed identifier may be indicated in the request for all of the data set portions 1732*a-d*. However, where different ones of the multiple data set portions 1732*a-d* belong to different partitions 1333, different hashed identifiers may be indicated for different ones of the data set portions 1732*a-d*.

Turning to FIG. 15D, following the provision of pointers for the storage of all data set portions 1732 of the partitioned embodiment of the data set 1330 and/or following receipt of indications from the node devices 1700 involved in storing the data set 1330 that all data blocks 1131 and/or data sub-blocks 1133 have been successfully stored within the payload section 1113 of the data file 1110, the mapping component 1541 may operate the network interface 1590 to transmit the map data 1510 to the one or more storage devices 1100 for storage within the payload section 1113 as at least the base map 1115. However, as previously discussed in reference to FIG. 12C, where the map data 1510 becomes relatively large in the amount of storage required to store it within the payload section 1113, the map data 1510 may alternatively be stored as a combination of the base map 1115 and one or more map extensions 1117, as depicted in FIG. 15E.

Returning to FIG. 15D, in addition to storing the map data 1510 as at least the base map 1115, the mapping component 1541 may also operate the network interface 1590 to transmit the metadata 1335 to the one or more storage devices 1100 for storage within the payload section 1113. Further, the mapping component 1541 may also store indications of the quantity of node devices 1700 among which all of the data set portions 1732 of the data set 1330 were temporarily stored and/or were generated as the data header 1112. Again, in various embodiments, the data header 1112 may be incorporated into either the file header 1111 or the payload section 1113 (e.g., within the map base 1115 or as part of the metadata 1335). Regardless of where the indication of the quantity of node devices 1700 is stored, in some embodiments, the indication of whether the data of the data set 1330 is partitioned data or non-partitioned data may be combined with the indication of the quantity of node devices 1700. More specifically, in such embodiments, an indication of a zero quantity of node devices 1700 may serve as an indication that the data of the data set 330 is non-partitioned data. In contrast, an indication of a non-zero quantity of node devices 1700 may serve as an indication that the data set 330 is partitioned data, in addition to specifying the quantity of node devices 1700. This manner of combining these two indications may be employed where an indication of the quantity of node devices 1700 is deemed superfluous where the data is non-partitioned data.

In some embodiments, the mapping component 1541 may operate the network interface 1590 to recurringly monitor for indications from each node device 1700 of not needing to request any more pointers from the control device 1500. In such embodiments, the mapping component 1541 may delay the storage of at least the map data 1510 until indications have been received from all of the multiple node devices 1700 involved in processing the partitioned embodiment of the data set 1330 that there will be no more requests for pointers. However, in embodiments in which each of the node devices 1700 is required to request only a single pointer for all data set portions 1732 that are to be stored by that node device 1700, the control device 1500 may determine whether there are more data set portions 1732 for which pointers remain to be requested based on whether or not requests for pointers have been received from all of the node devices 1700 involved in processing the data set 1330. Again, in such embodiments, exchanges of information between the control device 1500 and the node devices 1700 through the network 1999 for purposes of coordinating at least the storage of the data set 1330 may advantageously be further minimized by elimination of the need for exchanges of explicit indications of whether there are more data set portions 1732 for which pointers remain to be requested. Again, an advantage of requiring only a single request be made by each node device 1700 for a pointer, thereby resulting in the handling of multiple data blocks 1131 together in the storage thereof may enable further optimization of such storage by the one or more storage devices 1100, and/or may enable further optimization of the transmission thereof between the node device 1700 and the one or more storage devices 1100 through the network 1999 that is responsive to competing transmissions of data by each of the node devices 1700 to the one or more storage devices 1100.

Figure 16B:
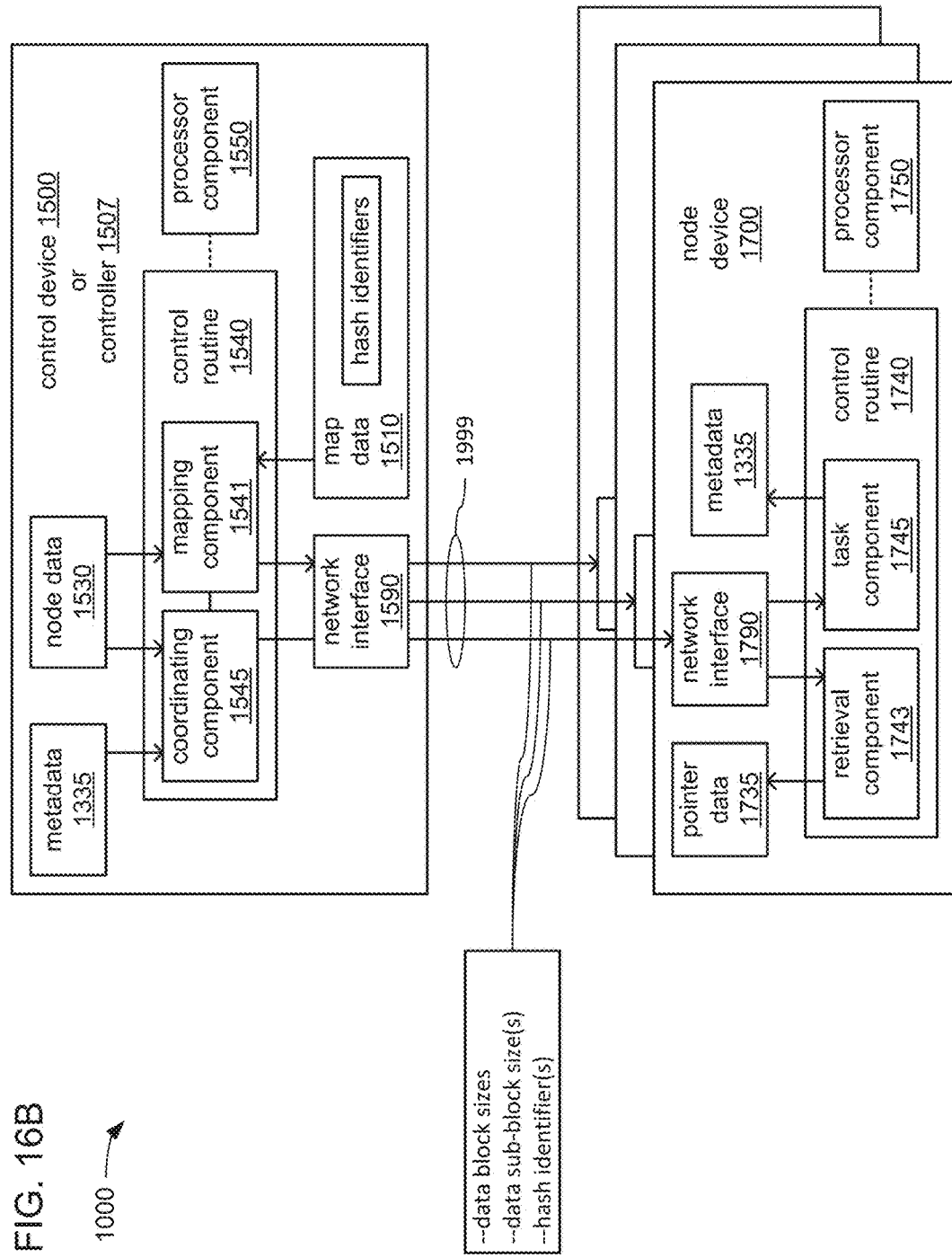
Figure 16C:
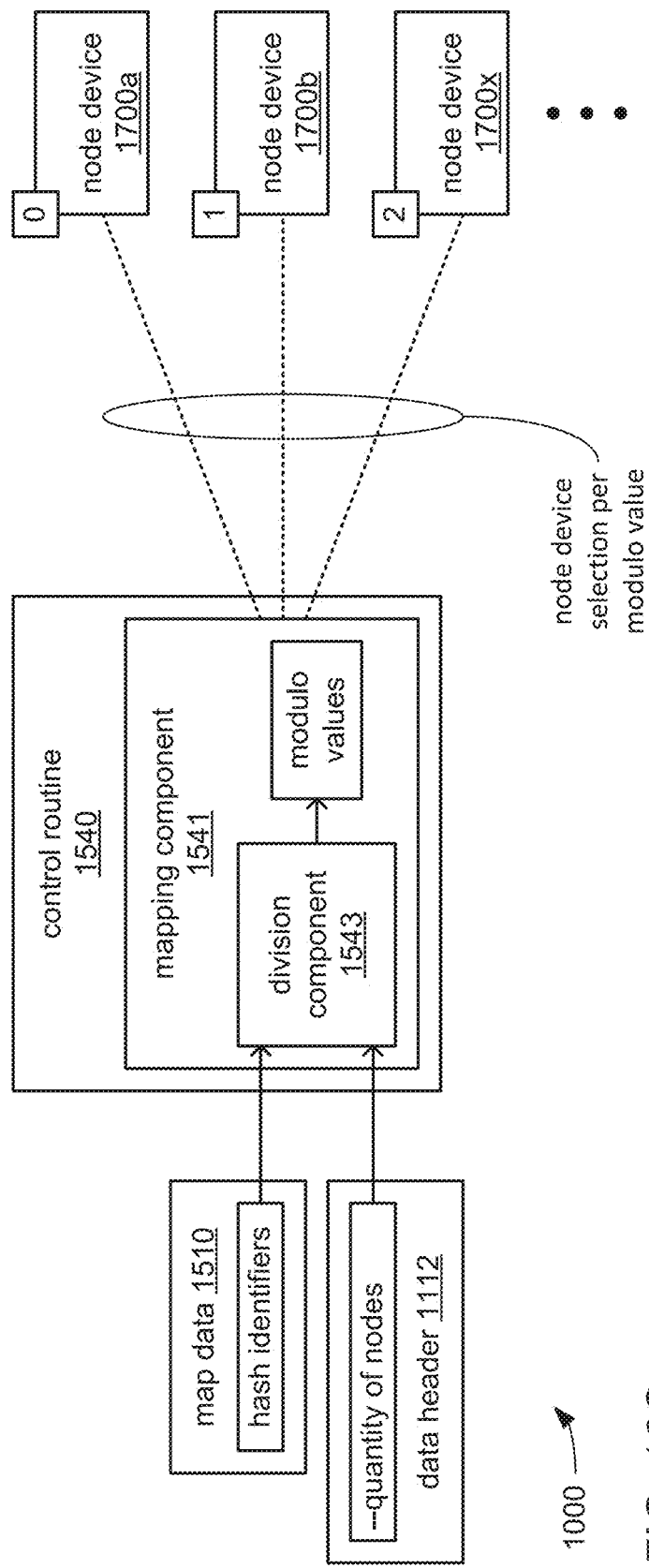
Figure 16D:
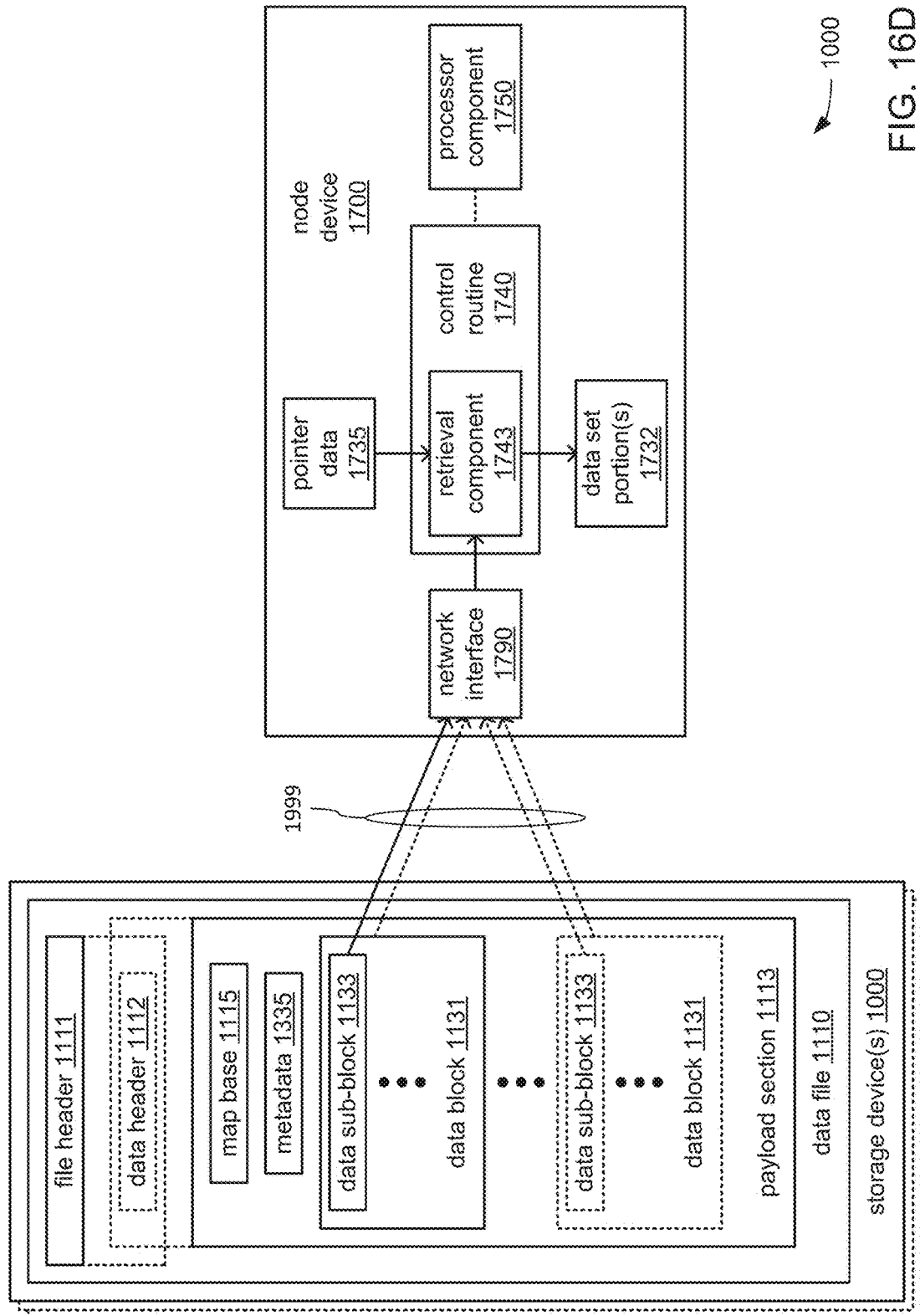

FIGS. 16A-D, together, illustrate an example of retrieving an embodiment of the data set 1330 made up of partitioned data in embodiments of the distributed processing system 1000 of FIG. 11A or 11B in greater detail. More specifically, FIG. 16A depicts aspects of the collection of information needed by the control device 1500 to determine a distribution of data set portions 1732 among available ones of the node devices 1700. FIG. 16B depicts aspects of transmission of the pointers to available ones of the node devices 1700. FIG. 16C depicts aspects of an approach to effecting a relatively balanced distribution of the data set portions 1732 among available ones of the node devices 1700. FIG. 16D depicts aspects of the retrieval of one or more data set portions 1732 by a single node device 1700.

Turning to FIG. 16A, as part of retrieving the data set 1330 in such a partitioned embodiment, the mapping component 1541 may operate the network interface 1590 to retrieve the base map 1115 (and any accompanying map extensions 1117—see FIG. 12C) via the network 1999 from the payload section 1113 of the data file 1110 stored within the one or more storage devices 1100. As previously discussed, the base map 1115 (and any accompanying map extensions 1117) may provide a map of the manner in which the multiple data set portions 1732 of the partitioned embodiment of the data set 1330 are stored within the payload section 1113, and the mapping component 1541 may store such a map as the map data 1510. The mapping component 1541 may additionally operate the network interface 1590 to retrieve the metadata 1335, describing aspects of the organization of data within the data set 1330 via the network 1999 from the payload section 1113. Alternatively or additionally, the mapping component 1541 may additionally operate the network interface 1590 to retrieve the data header 1112, which (if present) may describe the quantity of node devices 1700 that most recently stored the data set 1330 within the payload section 1113 of the data file 1110.

Again, in various embodiments, the data header 1112 may be incorporated into one or both of the base map 1115 and the metadata 1335.

Turning to FIG. 16B, the coordinating component 1545 may refer to recurringly updated indications of status of multiple node devices 1700 maintained within the node data 1530 to determine which ones of the multiple node devices 1700 are currently available to perform a processing task on one or more data set portions 1732 of the partitioned embodiment of the data set 1330. The coordinating component 1545 may then operate the network interface 1590 to transmit an indication of the processing task to the available ones of the node devices 1700 via the network 1999. In so doing, the coordinating component 1545 may also distribute copies of at least a portion of the metadata 1335 to each of those available node devices 1700.

The mapping component 1541 may first make a determination of which of two approaches to use in distributing data set portions 1732 of the data set 1330 among the currently available node devices 1700, and accordingly, which of two approaches to use in deriving and distributing pointers among the currently available node devices 1700. To do so, the mapping component 1541 may compare the quantity of the node devices 1700 that are currently available to the quantity of node devices 1700 that were involved in most recently storing the data set 1330 within the one data file 1110. If these two quantities of the node devices 1700 match, then the mapping component 1541 may make the determination to distribute the data set portions 1732 among the currently available node devices 1700 in a manner that effectively recreates the distribution of the data set portions 1732 that existed at the time the data set 1330 was most recently stored within the data file 1110. More precisely, the mapping component 1541 may distribute each entire data block 1131 within the payload section 1113 of the data file 1110 (thereby keeping together all data sub-blocks 1133 within each data block 1131) to a different one of the currently available node devices 1700. However, if these two quantities of the node devices 1700 do not match, then the mapping component 1541 may make the determination to derive a new distribution of individual ones of the data sub-blocks 1133 within each of the data blocks 1131 within the payload section 1113 of the data file 1110 among the currently available node devices 1700 (to thereby individually distribute each of the data set portions 1732).

Turning to both FIGS. 16B and 16C, to effect either such a distribution of whole data blocks 1131 or such a distribution of individual ones of the data sub-blocks 1133 among the currently available node devices 1700, the mapping component 1541 may employ at least a subset of the hashed identifiers associated by the map data 1510 with each of the data sub-blocks 1133. The mapping component 1541 may assign positive integer values as identifiers to each of the available node devices 1700, starting with the integer value of 0 and incrementing by the integer value of 1 for each such node device 1700. As depicted, the mapping component 1541 may include a division component 1543 to perform integer division in which hashed identifiers are divided by the quantity of currently available node devices 1700 to derive a modulo value from each such division.

More precisely, where the quantities of currently available node devices 1700 and of the node devices 1700 most recently involved in storing the data set 1330 do match, then for each of the data blocks 1131, the mapping component 1541 may retrieve a single hashed identifier associated by the map data 1510 with one of the data sub-blocks 1133 within that data block 1131, and the division component 1543 may divide that single hashed identifier by the quantity of currently available node devices 1700 to derive a modulo value. The mapping component 1541 may then match that modulo value to one of the positive integer values assigned to one of the currently available node devices 1700. The mapping component 1541 may then operate the network interface 1590 to transmit a pointer to the location of that data block 1131 within the payload section 1113 to that one of the node devices 1700 which had been assigned the matching one of the positive integer values.

In embodiments in which the data of the data set 330 is partitioned, and where there are one or more instances of data belonging to more than one partition 1333 being generated and/or processed by the same node device 1700, there may be a limitation on which partitions 1333 of data of the data set 330 may be generated and/or stored within the same node device 1700. The limitation may be that all partitions 1333 of data that so share the same node device 1700 must have partition labels that beget the same modulo value when the hashed identifiers derived from those partition labels (e.g., by taking hashes of those partition labels) are divided by the quantity of currently available node devices 1700. Thus, the use of only a single hashed identifier associated with only one of the data sub-blocks 1133 within each data block 1131 in deriving a modulo value by which the distribution of the entire data block 1131 is determined may rely on this requirement to ensure that it makes no difference which hashed identifier among all of those associated with each of the data sub-blocks 1133 is so used.

However, where the quantities of currently available node devices 1700 and of the node devices 1700 most recently involved in storing the data set 1330 do not match, then for each of the data sub-blocks 1133, the mapping component 1541 may retrieve the hashed identifier associated by the map data 1510 with that data sub-block 1133, and the division component 1543 may divide the hashed identifier by the quantity of currently available node devices 1700 to derive a modulo value. The mapping component 1541 may then match that modulo value to one of the positive integer values assigned to one of the currently available node devices 1700. The mapping component 1541 may then operate the network interface 1590 to transmit a pointer to the location of that data sub-block 1133 within the payload section 1113 to that one of the node devices 1700 which had been assigned the matching one of the positive integer values.

Such use of the hashed identifiers of each of the data sub-blocks 1133 to determine distribution of each of the data sub-block 1133, individually, may result in the derivation of a new distribution of the data set portions 1732 that is a relatively balanced distribution of data among the available node devices 1700. Also, the fact that all of the data sub-blocks 1133 associated with a single partition 1333 will have the same hashed identifier, such use of modulo values taken of the hashed identifiers ensures that all data belonging to any one of the partitions 1333 will be distributed to the same one of the available node devices 1700, and not among multiple node devices 1700.

Turning to FIG. 16D, in response to receiving one or more pointers to one or more data blocks 1131 or data sub-blocks 1133 within the payload section 1113, the retrieval component 1743 may operate the network interface 1790 to retrieve those one or more data blocks 1131 or data sub-blocks 1133 from the payload section 1113. In so doing, the retrieval component 1743 may transmit one or more commands to the one or more storage devices 1100 to provide the one or more data blocks 1131 or data sub-blocks 1133, employing the one or more pointers and/or the accompanying indications of size to specify the one or more data blocks 1131 or data sub-blocks 1133 to be provided. The retrieval component 1743 may locally store each of the retrieved data sub-blocks 1133 as a data set portion 1732 for use by the task component 1745 in performing the task specified to the node device 1700 by the control device 1500.

Returning to FIGS. 11A and 11B, in various embodiments, each of the processor components 1550 and 1750 may include any of a wide variety of commercially available processors. Further, one or more of these processor components may include multiple processors, a multi-threaded processor, a multi-core processor (whether the multiple processor cores coexist on the same or separate dies), and/or a multi-processor architecture of some other variety by which multiple physically separate processors are linked.

However, in a specific embodiment, the processor component 1550 of the control device 1500 may be selected to efficiently perform the derivation of distributions of data set portions 1732. Alternatively or additionally, the processor component 1750 of each of the node devices 1700 may be selected to efficiently perform processing tasks with multiple data set portions in parallel. By way of example, the processor component 1550 and/or 1750 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor component 1750 of at least one of the node devices 1700 may incorporate multi-threaded capabilities and/or multiple processor cores to enable parallel performances of the functions of both the control device 1500 and a node device 1700.

In various embodiments, each of the storages 1560 and 1760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 1760 of one or more of the node devices 1700 that stores one or more of the data set portions 1732 may be implemented with a redundant array of independent discs (RAID) of a RAID level selected to provide fault tolerance to prevent loss of one or more of these datasets and/or to provide increased speed in accessing one or more of these datasets.

In various embodiments, the network interfaces 1590 and 1790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, the network interface 1790 of one or more of the node devices 1700 that stores one or more of the data set portions 1732 may be implemented with multiple copper-based or fiber-optic based network interface ports to provide redundant and/or parallel pathways in exchanging one or more of the data set portions 1732 with the one or more storage devices 1100.

In various embodiments, the division of processing and/or storage resources among the control device 1500 and/or the node devices 1700, and/or the API architectures supporting communications among the control device 1500 and/or the node devices 1700, may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the organization and manner of representation of information within the data map 1510, as well as its usage in enabling parallelization of storage, retrieval and/or processing of data set portions 1732 of the data set 1330 are not dependent on, nor constrained by, existing API architectures and/or supporting communications protocols. More broadly, there is nothing in the inherit structure of the map data 1510, the metadata 1335, or the manner in which the data set 1330 may be organized in storage, transmission and/or distribution that is bound to existing API architectures or protocols.

Figure 17:
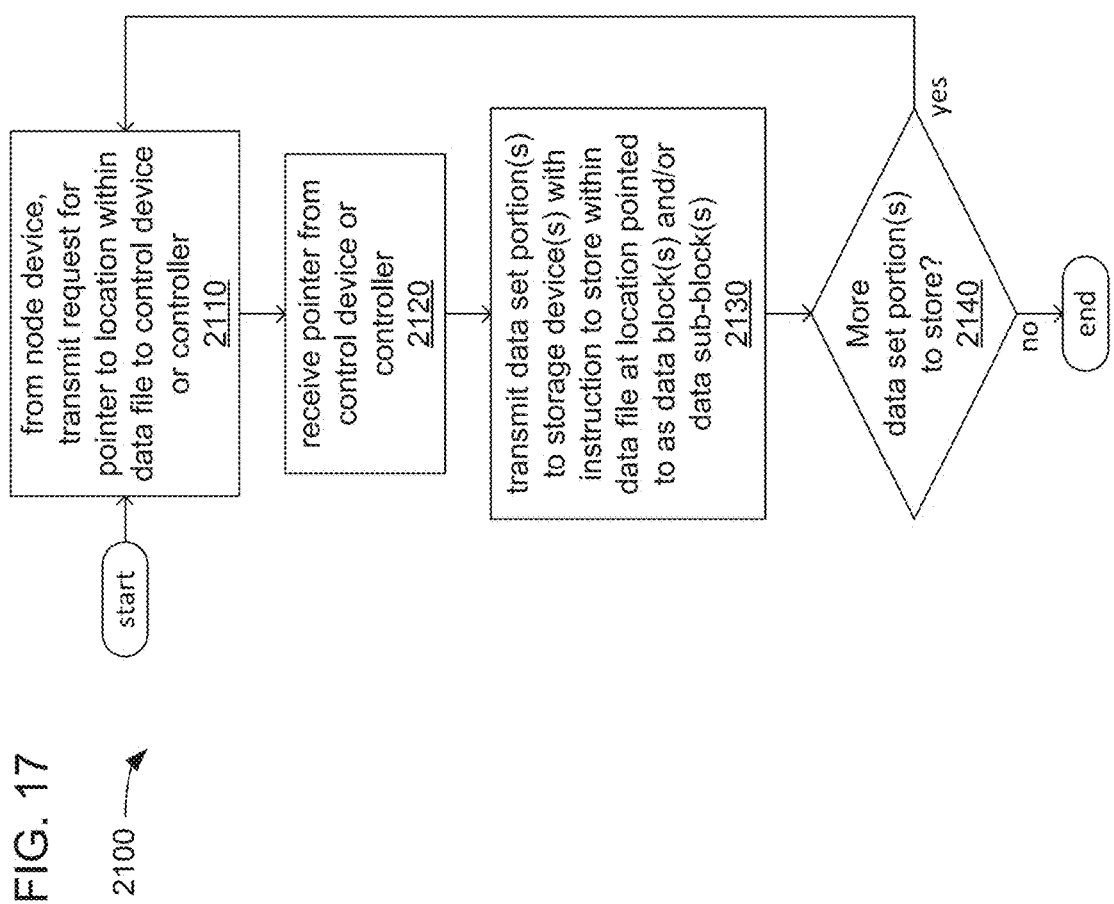
FIG. 17 illustrates an example embodiment of a logic flow of a node device storing data set portions.

FIG. 17 illustrates an example embodiment of a logic flow 2100. The logic flow 2100 may be representative of some or all of the operations executed by one or more embodiments described herein. More specifically, the logic flow 2100 may illustrate operations performed by the processor component 1750 in executing the control routine 1740, and/or performed by other component(s) of at least one of the node devices 1700.

At 2110, a processor component of a node device (e.g., the processor component 1750 of one of the node devices 1700) may transmit a request to a control device or to a controller implemented within another node device (e.g., the control device 1500, or the controller 1507 acting in place of the control device 1500 from within another of the node devices 1700) for a pointer to a location within a data file maintained by one or more storage devices (e.g., the data file 1110 maintained by the one or more storage devices 1100) at which the node device may store one or more data set portions of a data set (e.g., one or more of the data set portions 1732 of the data set 1330). As previously discussed, in embodiments in which the data of the data set is not partitioned, each data set portion may be stored as a data block (e.g., as data blocks 1131), and the node device may include an indication of the size (e.g., in bytes, words, doublewords, etc.) of each of the one or more data set portions to be stored starting at the location that will be pointed to by the requested pointer. However, as also previously discussed, in embodiments in which the data of the data set is partitioned, each data set portion may be stored as a data sub-block of a data block (e.g., as data sub-blocks 1133 within a data block 1131), and the node device may include indications of individual sizes for each data set portion to be stored, along with a hashed identifier generated by the node device from the partition label associated with each data set portion.

At 2120, the requested pointer may be received at the node device from the control device (or controller within another node device). At 2130, in response to having received the requested pointer, the processor component of the node device may transmit the one or more data set portions to the one or more storage devices with an instruction to the one or more storage devices to store the one or more data set portions at the location pointed to by the pointer as one or more data blocks or as one or more data sub-blocks within a data block.

At 2140, the processor component may check whether there are more data set portions to be stored that were not included in the last request for a pointer transmitted to the control device (or controller within another node device). As previously discussed, multiple instances of a processing task involving different data set portions may be performed within a single node device, and may result in a need to transmit more than one request for a pointer. Again, such multiple instances may be supported by multi-threaded execution and/or by multiple processor cores (e.g., the multiple processor cores 1755) of the processor component of the node device. If, at 2140, there are still one or more data set portions to be stored, then the processor component may return to transmitting a request for a pointer at 2110. Alternatively, as also previously discussed, coordination among such multiple instances of a processing task within the node device may coordinate such that only one such request is made that includes all of the data set portions of the data set that are processed and/or generated within the node device, such that the check at 2140 is not performed. Again, it may be that each node device is required to make only one request for a pointer that is to be used to store all data set portions processed and/or generated within the node device, and this requirement may be relied upon by the control device (or controller within another node device) as the basis for determining whether all requests for pointers have been received.

Figure 18:
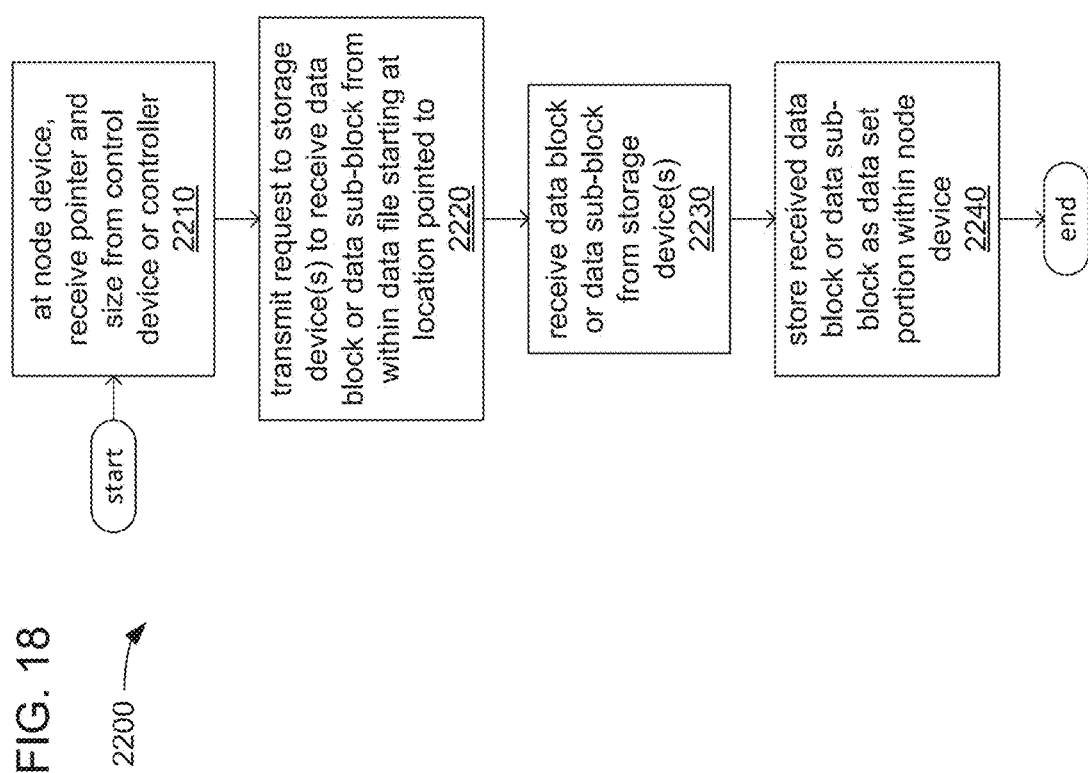
FIG. 18 illustrates an example embodiment of a logic flow of a node retrieving data set portions.

FIG. 18 illustrates an example embodiment of a logic flow 2200. The logic flow 2200 may be representative of some or all of the operations executed by one or more embodiments described herein. More specifically, the logic flow 2200 may illustrate operations performed by the processor component 1750 in executing the control routine 1740, and/or performed by other component(s) of at least one of the node devices 1700.

At 2210, a processor component of a node device (e.g., the processor component 1750 of one of the node devices 1700) may receive, from a control device or a controller implemented within another node device (e.g., the control device 1500 or the controller 1500 within another of the node devices 1700), a pointer to one or more data set portions of a data set stored within a data file (e.g., data set portions 1732 of the data set 1330 stored within the data file 1110) to be retrieved therefrom. As previously discussed, in embodiments in which the data of the data set is not partitioned, the pointer may be to a single data set portion stored in the data file as a data block, and the pointer may be accompanied by an indication of the size of the data block. However, as also previously discussed, in embodiments in which the data of the data set is partitioned, the pointer may be to a single data sub-block within a data block, and the pointer may be accompanied by an indication of the size of the data sub-block.

At 2220, the processor component may transmit a request to the one or more storage devices to provide the data block or data sub-block that starts at the location in the data file pointed to by the pointer, and including the quantity of data specified by the indication of size that accompanied the pointer. At 2230, the requested data block or data sub-block may be received at the node device from the one or more storage devices. At 2240, the processor component may locally store the received data block or data sub-block as a data set portion to be processed by the processor component in a processing task specified by the control device (or controller within another node device).

Figure 19A:
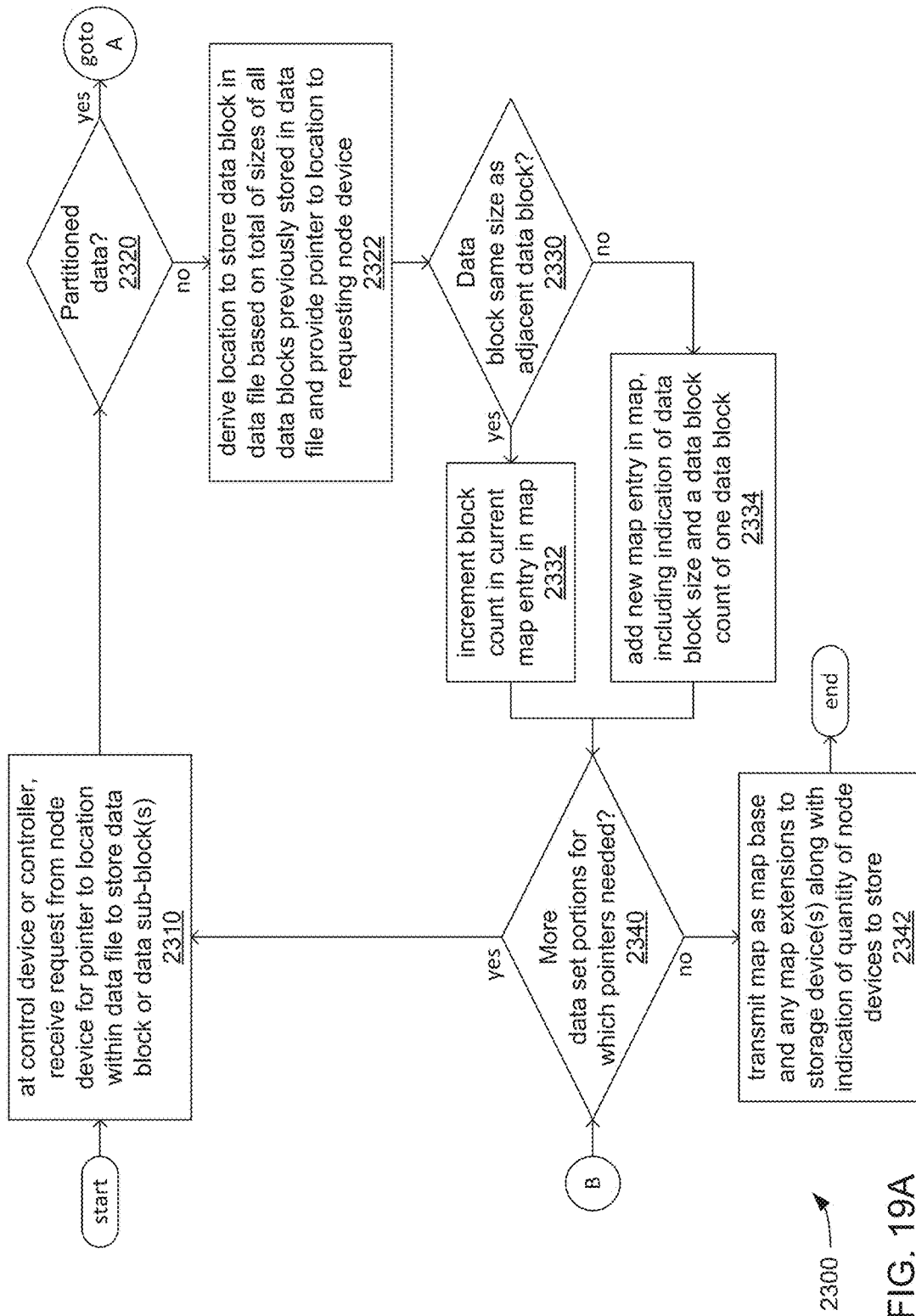
FIGS. 19A and 19B, together, illustrate an example embodiment of a logic flow of a control device coordinating storage of data set portions.
Figure 19B:
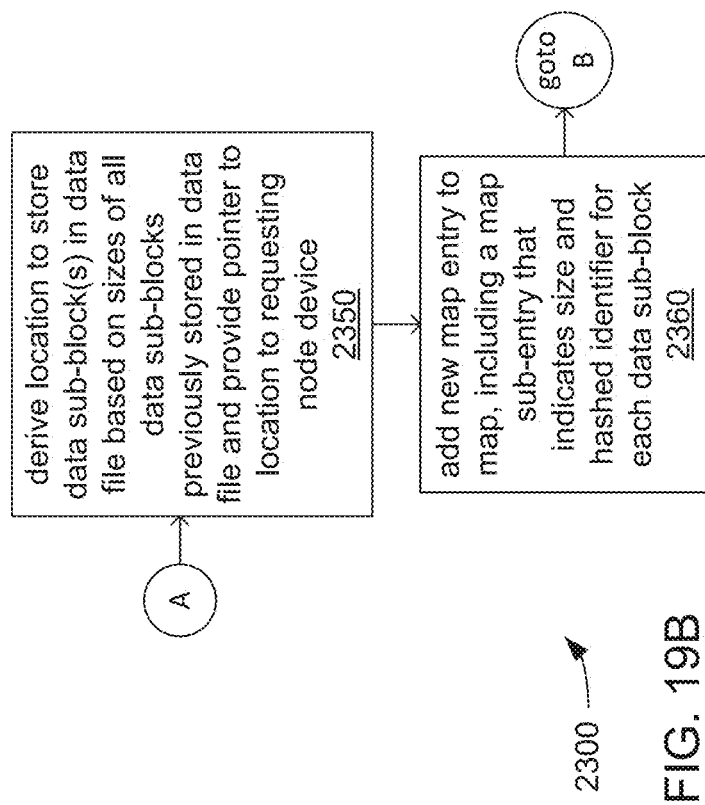

FIGS. 19A and 19B, together, illustrate an example embodiment of a logic flow 2300. The logic flow 2300 may be representative of some or all of the operations executed by one or more embodiments described herein. More specifically, the logic flow 2300 may illustrate operations performed by the processor component 1550 in executing the control routine 1540, and/or performed by other component(s) of the control device 1500 or the controller 1500 implemented within at least one of the node devices 1700.

At 2310, a processor component of a control device or a controller implemented within a node device (e.g., the processor component 1550 of the control device 1500 or of the controller 1507) may receive a request for a pointer to a location within a data file maintained by one or more storage devices (e.g., the data file 1110 maintained by the one or more storage devices 1100) at which the node device may store one or more data set portions of a data set (e.g., one or more of the data set portions 1732 of the data set 1330). As previously discussed, in embodiments in which the data of the data set is not partitioned, each data set portion may be stored as a data block (e.g., as data blocks 1131), and the node device may include with the request an indication of the size (e.g., in bytes, words, doublewords, etc.) of the one or more data set portions to be stored starting at the location that will be pointed to by the requested pointer. However, as also previously discussed, in embodiments in which the data of the data set is partitioned, each data set portion may be stored as a data sub-block within a data block (e.g., as data sub-blocks 1133 within a data block 1131), and the node device may include with the request indications of individual sizes for each data set portion to be stored, along with a hashed identifier generated by the node device from the partition label for each data set portion.

Thus, if at 2320, the data of the data set is not partitioned, then at 2322, the processor component may derive the location within the data file at which to store the data set portion for which the pointer was requested as a data block based on a total of the sizes of all of the data blocks previously stored in the data file, and may generate a pointer to point to that location. The processor component may then transmit that pointer to the node device.

At 2330, the processor component may perform a check of whether the size of the data block for which the pointer was requested is the same as that of the immediately preceding and adjacent data block in the data file. If so, then at 2332, the processor component may increment a block count of adjacent data blocks of the same size in the map entry that corresponds to that immediately preceding and adjacent data block in a map of the data blocks within the data file (e.g., one of the map entries 1511 in the map stored as the map data 1510). However, if the size of the data block for which the pointer was requested is not the same as that of the immediately preceding and adjacent data block in the data file, then at 2334, the processor component may generate a new map entry in the map that includes an indication of the size of the data block for which the pointer was requested and a block count of one block of that size.

At 2340, following either an incrementing of a block count at 2332 or the addition of a new map entry in the map at 2334, if there are still more data set portions of the non-partitioned data to be stored as data blocks, then the processor component may await the reception of another request for a pointer at 2310. As previously discussed, each of the node devices may transmit an indication to the control device (or the controller within one of the node devices) of whether there are still more data set portions for which requests for pointers are to be made. If, at 2340, there are no more data set portions of the partitioned data to be stored as data blocks, then the processor component may transmit the map of the data blocks to the one or more storage devices to be stored as a map base and/or one or more map extensions, depending on the amount of storage space needed to store the map.

Returning to 2320, if the data of the data set is partitioned, then at 2350, the processor component may derive the location within the data file at which to store the one or more data set portions as one or more data sub-blocks based on a total of the sizes of all of the data sub-blocks previously stored in the data file, and may generate a pointer to point to that location. The processor component may then transmit that pointer to the node device.

At 2360, the processor component may generate a new map entry in the map for a new data block that includes a separate sub-entry (e.g., a separate sub-entry 1513) for each data sub-block associated with one of the data set portions for which the pointer was requested. Each sub-entry may include an indication of the size of its corresponding data sub-block, and a hashed identifier generated by the node device from the partition label for each data set portion.

At 2340, following the addition of a new block entry in the map at 2360, if there are still more data set portions of the partitioned data to be stored as data sub-blocks, then the processor component may await the reception of another request for a pointer at 2310. However, if at 2340, there are no more data set portions of the partitioned data to be stored as data sub-blocks, then the processor component may transmit the map of the data blocks and data sub-blocks within those data blocks to the one or more storage devices to be stored as a map base and/or one or more map extensions, depending on the amount of storage space needed to store the map. As previously discussed, for partitioned data, the processor component may also store an indication of a quantity of the node devices involved in storing the data set.

Figure 20A:
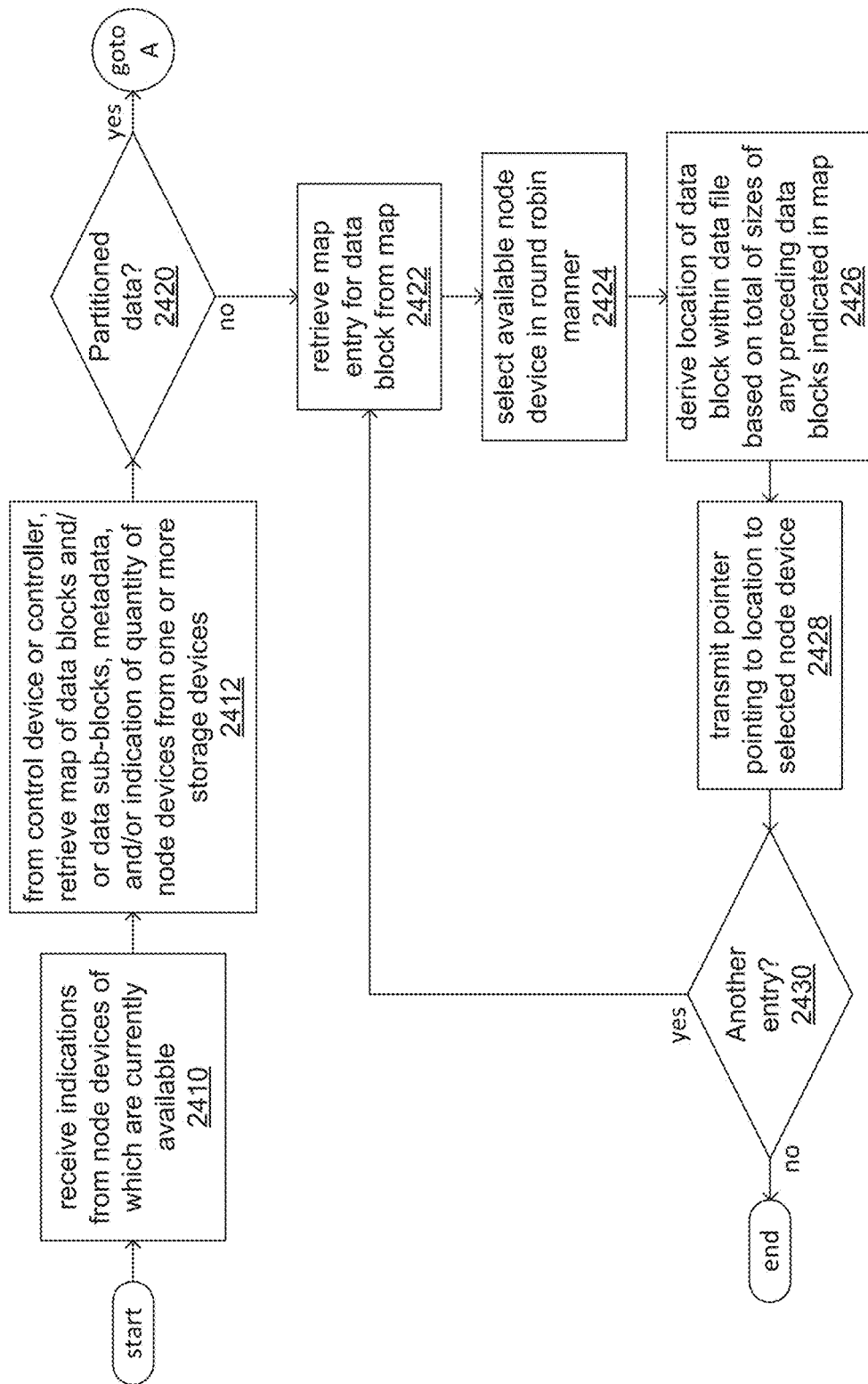
Figure 20C:
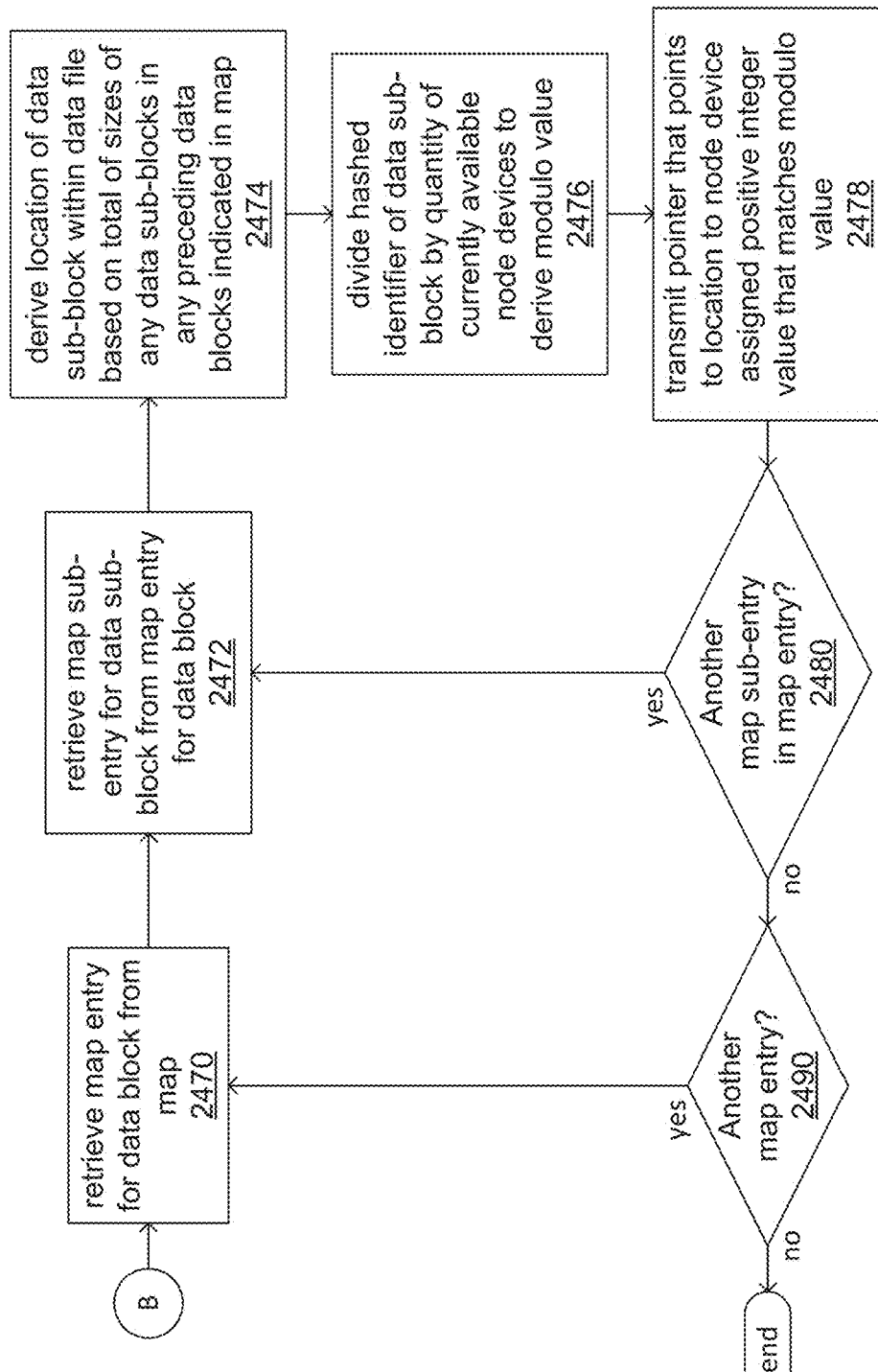

FIGS. 20A, 20B and 20C, together, illustrate an example embodiment of a logic flow 2400. The logic flow 2400 may be representative of some or all of the operations executed by one or more embodiments described herein. More specifically, the logic flow 2400 may illustrate operations performed by the processor component 1550 in executing the control routine 1540, and/or performed by other component(s) of the control device 1500 or the controller 1500 implemented within at least one of the node devices 1700.

At 2410, a processor component of a control device or a controller implemented within a node device (e.g., the processor component 1550 of the control device 1500 or of the controller 1507) may receive indications from multiple node devices (e.g., the node devices 1700) concerning their current availability to perform processing tasks on a portion of a data set (e.g., the data set portions 1732 of the data set 1330). As previously discussed, each node device may recurringly transmit indications of its current status, including its availability to perform processing tasks on a portion of a data set.

At 2412, the processor component may retrieve, from a data file maintained within one or more storage devices (e.g., the data file 1110 maintained by the one or more storage devices 1100), a map of data blocks and/or data sub-blocks, and metadata of a data set (e.g., the map base 1115 and any map extensions 1117, and the metadata 1335). Additionally, the processor component may retrieve an indication of the quantity of node devices that were involved in the most recent storage of the data set in the data file (e.g., the data header 1112, or again, the metadata 1335). As previously discussed, in embodiments in which the data of the data set is not partitioned, each data set portion may be stored in the data file as a data block (e.g., each data set portion 1732 as a data block 1131), and the map may provide indications of sizes of data blocks and/or block counts of adjacent sets of data blocks that have the same size. However, as also previously discussed, in embodiments in which the data of the data set is partitioned, each data set portion may be stored as a data sub-block within a data block (e.g., as a data sub-block 1133 within a data block 1131), and the map may provide indications of size and hashed identifiers for each data sub-block within each data block.

Thus, if at 2420, the data of the data set is not partitioned, then at 2422, the processor component may retrieve a single map entry corresponding to a single data block from the map at 2422 (e.g., a single map entry 1511). At 2424, the processor component may select one of the available node devices 2424 in a round robin manner to which to distribute the single data block. At 2426, the processor component may derive the location within the data file from which to retrieve the single data block based on a total of the sizes of all of the data blocks stored in preceding locations within the data file, and may generate a pointer to point to that location. At 2428, the processor component may then transmit that pointer to the selected node device. At 2430, if there is another map entry in the map, then the processor component may retrieve that next map entry at 2422.

However, if at 2420, the data of the data set is partitioned, then at 2440, the processor component may assign a series of increasing positive integer values (specifically, the series 0, 1, 2, 3, etc., created by repeated incrementing by the positive integer value of 1) to each of the available node devices. At 2450, the processor component may then perform a check of whether the quantity of currently available node devices matches the quantity of node devices that were last involved in storing the data set within the data file.

If at 2450, the two quantities of node devices match, then the distribution of the data set that existed at the time the data set was most recently stored may be recreated among the available node devices by the processor component. At 2452, the processor component may retrieve a single map entry corresponding to a single data block from the map. At 2454, the processor component may derive the location within the data file from which to retrieve the data block based on a total of the sizes of all of the data blocks in preceding locations within the data file, and may generate a pointer to point to the data block.

At 2456, the processor component may divide a hashed identifier associated by the map with one of the data sub-blocks within the data block by the quantity of available node devices (thereby treating the hashed identifier as a positive integer value), and derive a modulo value from the division operation. At 2458, the processor component may then transmit that pointer to the one of the available node devices that was assigned (at 2440) an integer value from the series of integer values that matches the modulo value.

At 2460, if there is another map entry in the map, then the processor component may retrieve that map entry at 2452.

However, if at 2450, the two quantities of node devices do not match, then a derivation of a new distribution of the data set among the available node devices may be performed by the processor component. At 2470, the processor component may retrieve a single map entry corresponding to a single data block from the map, and may then retrieve a single sub-entry corresponding to a single data sub-block from within that single map entry (e.g., a single map sub-entry 1513 from within a single map entry 1511) at 2472. At 2474, the processor component may derive the location within the data file from which to retrieve the data sub-block based on a total of the sizes of all of the data sub-blocks in any data blocks stored in preceding locations within the data file, and may generate a pointer to point to the data sub-block.

At 2476, the processor component may divide a hashed identifier associated by the map with the data sub-block by the quantity of available node devices (thereby treating the hashed identifier as a positive integer value), and derive a modulo value from the division operation. At 2478, the processor component may then transmit that pointer to the one of the available node devices that was assigned (at 2440) an integer value from the series of integer values that matches the modulo value.

At 2480, if there is another map sub-entry within the map entry, then the processor component may retrieve that next map sub-entry at 2472. If there isn't another map sub-entry in the map entry at 2480, then at 2490, if there is another map entry in the map, then the processor component may retrieve that map entry at 2470.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising a processor component and a storage to store instructions that, when executed by the processor component, cause the processor component to perform operations comprising:
   analyze metadata indicative of an organization of data within a data set or map data indicative of an organization of multiple data blocks of the data set within a data file to determine whether the data set comprises partitioned data;
   determine whether the analyzed metadata indicates whether the data set comprises partitioned data, wherein when the data set comprises partitioned data the data set is organized into multiple partitions and each whole partition is distributable to a single node device to be processed;
   in response to a determination that data set does not comprise partitioned data, wherein the map data comprises multiple map entries in which each map entry corresponds to one or more data blocks of the multiple data blocks, perform operations comprising:
      for each map entry of the map data, retrieve, from the map entry, a data block size and a data block quantity, wherein the data block quantity indicates a quantity of adjacent data blocks of the multiple data blocks within the data file that correspond to the map entry; and
      for each data block that corresponds to the map entry:
         determine a location of the corresponding data block within the data file;
         select one of a first quantity of node devices that are currently available to perform a processing task; and
         provide a pointer to the selected one of the first quantity of node devices, wherein the pointer comprises:
            an indication of the location of the corresponding data block within the data file; and
            the data block size; and
   in response to a determination that the data set comprises partitioned data, perform operations comprising:
      compare the first quantity of node devices to a second quantity of node devices that were last involved in storage of the data set within the data file;

assign a numerical designation value to each node device of the first quantity of node devices; and in response to a match between the first and second quantities of node devices, for each data block of the multiple data blocks, perform operations comprising:

retrieve, from the map data, a hashed identifier for one data sub-block indicated by the map data to be within the data block, wherein:
the data sub-block comprises data of the data set that belongs to a partition of the multiple partitions; and
the hashed identifier is derived from a partition label of the partition;

retrieve, from the map data, a data sub-block size for each of the data sub-blocks indicated by the map data to be within the data block;

determine a location of the data block within the data file;

divide the hashed identifier by the first quantity of node devices to obtain a modulo value; and transmit a pointer to a node device of the first quantity of node devices that is assigned a designation value that matches the modulo value, wherein the pointer comprises:
an indication of the location of the data block within the data file; and
a sum of data sub-block sizes of the data sub-blocks within the data block.

2. The apparatus of claim 1, wherein the selection of one of the first quantity node devices comprises a round robin selection of one of the first quantity of node devices.

3. The apparatus of claim 1, wherein in response to the determination that the data set comprises partitioned data and in response to a lack of a match between the first and second quantities of node devices, the processor component is caused to perform operations comprising:

for each data sub-block within each data block of the multiple data blocks, perform operations comprising:
retrieve, from the map data, the data sub-block size and hashed identifier of the data sub-block;
determine a location of the data sub-block within the data file;
divide the hashed identifier by the first quantity of node devices to obtain a modulo value; and
provide a pointer to the node of the first quantity of node devices that is assigned a designation value that matches the modulo value, wherein the pointer comprises:
an indication of the location of the data sub-block within the data file; and
the data sub-block size of the data sub-block.

4. The apparatus of claim 1, wherein:
the apparatus comprises a node device of the first quantity of node devices; and
the processor component is caused to retrieve, via a network, a portion of the data set from the data file as one of the first quantity of node devices at least partially in parallel with at least one other node device of the first quantity of node devices.

5. The apparatus of claim 4, wherein the processor component is caused to perform the processing task with a portion of the data set retrieved from the data file as the one of the first quantity of node devices at least partially in parallel with at least one other node device of the first quantity of node devices.

6. The apparatus of claim 4, wherein the processor component is caused to perform operations comprising:
in response to the determination that the data set does not comprise partitioned data, the processor component is caused to retrieve a whole data block of the multiple data blocks as the portion of the data set retrieved;
in response to the determination that the data set does comprise partitioned data and in response to a match between the first and second quantities of node devices, the processor component is caused to retrieve a whole data block of the multiple data blocks as the portion of the data set retrieved; and
in response to the determination that the data set does comprise partitioned data and in response to a lack of a match between the first and second quantities of node devices, the processor component is caused to retrieve a data sub-block of a data block of the multiple data blocks as the portion of the data set retrieved.

7. The apparatus of claim 1, wherein:
the data file is maintained by one or more storage devices; and
the processor component is caused to retrieve, from the one or more storage devices through a network, the map data and the metadata.

8. The apparatus of claim 7, wherein, to retrieve the map data from the data file, the processor component is caused to perform operations comprising:
transmit, via the network, a first command to the one or more storage devices to provide a map base of the data map from the data file;
receive, via the network, a map base from the data file;
analyze the map base to determine whether at least a portion of the map data is stored within one or more map extensions within the data file; and
in response to a determination that at least a portion of the map data is stored within one or more map extensions, perform operations comprising:
transmit, via the network, a second command to the one or more storage devices to provide at least one map extension of the one or more map extensions; and
receive, via the network, the at least one map extension from the data file.

9. The apparatus of claim 1, comprising a control device coupled to a grid of multiple node devices, wherein the processor component is caused to perform operations comprising:
recurringly receive, via a network, indications of availability to perform processing tasks from each node device of the multiple node devices;
recurringly update a stored indication of availability of each node device of the multiple node devices; and
analyze the stored indications of availability to identify the first quantity of node devices.

10. The apparatus of claim 9, wherein the processor component is caused to perform operations comprising provide an indication of the processing task to the first quantity of node devices to enable more than one node device of the first quantity of node devices to each perform the processing task with a portion of the data set at least partially in parallel.

11. A computer-program product tangibly embodied in a non-transitory machine-readable storage medium, the computer-program product including instructions operable to cause a processor component to perform operations comprising:
analyze metadata indicative of an organization of data within a data set or map data indicative of an organization of multiple data blocks of the data set within a data file to determine whether the data set comprises partitioned data;

determine whether the analyzed metadata indicates whether the data set comprises partitioned data, wherein when the data set comprises partitioned data the data set is organized into multiple partitions and each whole partition is distributable to a single node device to be processed;

in response to a determination that data set does not comprise partitioned data, wherein the map data comprises multiple map entries in which each map entry corresponds to one or more data blocks of the multiple data blocks, perform operations comprising:

for each map entry of the map data, retrieve, from the map entry, a data block size and a data block quantity, wherein the data block quantity indicates a quantity of adjacent data blocks of the multiple data blocks within the data file that correspond to the map entry; and for each data block that corresponds to the map entry:
determine a location of the corresponding data block within the data file;
select one of a first quantity of node devices that are currently available to perform a processing task; and
provide a pointer to the selected one of the first quantity of node devices, wherein the pointer comprises:
an indication of the location of the corresponding data block within the data file; and
the data block size; and in response to a determination that the data set comprises partitioned data, perform operations comprising:
compare the first quantity of node devices to a second quantity of node devices that were last involved in storage of the data set within the data file;
assign a numerical designation value to each node device of the first quantity of node devices; and
in response to a match between the first and second quantities of node devices, for each data block of the multiple data blocks, perform operations comprising:
retrieve, from the map data, a hashed identifier for one data sub-block indicated by the map data to be within the data block, wherein:
the data sub-block comprises data of the data set that belongs to a partition of the multiple partitions; and
the hashed identifier is derived from a partition label of the partition;
retrieve, from the map data, a data sub-block size for each of the data sub-blocks indicated by the map data to be within the data block;
determine a location of the data block within the data file;
divide the hashed identifier by the first quantity of node devices to obtain a modulo value; and
transmit a pointer to a node device of the first quantity of node devices that is assigned a designation value that matches the modulo value, wherein the pointer comprises:
an indication of the location of the data block within the data file; and
a sum of data sub-block sizes of the data sub-blocks within the data block.

12. The computer-program product of claim 11, wherein the selection of one of the first quantity node devices comprises a round robin selection of one of the first quantity of node devices.

13. The computer-program product of claim 11, wherein in response to the determination that the data set comprises partitioned data and in response to a lack of a match between the first and second quantities of node devices, the processor component is caused to perform operations comprising:
for each data sub-block within each data block of the multiple data blocks, perform operations comprising:
retrieve, from the map data, the data sub-block size and hashed identifier of the data sub-block;
determine a location of the data sub-block within the data file;
divide the hashed identifier by the first quantity of node devices to obtain a modulo value; and
provide a pointer to the node of the first quantity of node devices that is assigned a designation value that matches the modulo value, wherein the pointer comprises:
an indication of the location of the data sub-block within the data file; and
the data sub-block size of the data sub-block.

14. The computer-program product of claim 11, wherein:
the processor component is incorporated into a node device of the first quantity of node devices; and
the processor component is caused to retrieve, via a network, a portion of the data set from the data file as one of the first quantity of node devices at least partially in parallel with at least one other node device of the first quantity of node devices.

15. The computer-program product of claim 14, wherein the processor component is caused to perform the processing task with a portion of the data set retrieved from the data file as the one of the first quantity of node devices at least partially in parallel with at least one other node device of the first quantity of node devices.

16. The computer-program product of claim 11, wherein:
the data file is maintained by one or more storage devices; and
the processor component is caused to retrieve, from the one or more storage devices through a network, the map data and the metadata.

17. The computer-program product of claim 16, wherein, to retrieve the map data from the data file, the processor component is caused to perform operations comprising:
transmit, via the network, a first command to the one or more storage devices to provide a map base of the data map from the data file;
receive, via the network, a map base from the data file;
analyze the map base to determine whether at least a portion of the map data is stored within one or more map extensions within the data file; and
in response to a determination that at least a portion of the map data is stored within one or more map extensions, perform operations comprising:
transmit, via the network, a second command to the one or more storage devices to provide at least one map extension of the one or more map extensions; and
receive, via the network, the at least one map extension from the data file.

18. The computer-program product of claim 17, wherein the processor component is caused to perform operations comprising:
in response to the determination that at least a portion of the map data is stored within one or more map extensions, retrieve an extension pointer to each map extension of the at least one map extension from the map base, and retrieve at least one map entry of the map data from each map extension of the one or more map extensions; and in response to a determination that no portion of the map data is stored within one or more map extensions, retrieve each map entry of the map data from the map base.

19. The computer-program product of claim 11, wherein:
the processor component is incorporated into a control device coupled to a grid of multiple node devices; and
the processor component is caused to perform operations comprising:
recurringly receive, via a network, indications of availability to perform processing tasks from each node device of the multiple node devices;
recurringly update a stored indication of availability of each node device of the multiple node devices; and
analyze the stored indications of availability to identify the first quantity of node devices.

20. The computer-program product of claim 19, wherein the processor component is caused to perform operations comprising provide an indication of the processing task to the first quantity of node devices to enable more than one node device of the first quantity of node devices to each perform the processing task with a portion of the data set at least partially in parallel.

21. A computer-implemented method comprising:
analyzing, by a processor component, metadata indicative of an organization of data within a data set or map data indicative of an organization of multiple data blocks of the data set within a data file to determine whether the data set comprises partitioned data;
determining whether the analyzed metadata indicates whether the data set comprises partitioned data, wherein when the data set comprises partitioned data the data set is organized into multiple partitions and each whole partition is distributable to a single node device to be processed;
in response to a determination that data set does not comprise partitioned data, wherein the map data comprises multiple map entries in which each map entry corresponds to one or more data blocks of the multiple data blocks, performing operations comprising:
for each map entry of the map data, retrieving, from the map entry, a data block size and a data block quantity, wherein the data block quantity indicates a quantity of adjacent data blocks of the multiple data blocks within the data file that correspond to the map entry; and
for each data block that corresponds to the map entry:
determining a location of the corresponding data block within the data file;
selecting one of a first quantity of node devices that are currently available to perform a processing task; and
providing a pointer to the selected one of the first quantity of node devices, wherein the pointer comprises:
an indication of the location of the corresponding data block within the data file; and
the data block size; or
in response to a determination that the data set comprises partitioned data, performing operations comprising:
comparing, by the processor component, the first quantity of node devices to a second quantity of node devices that were last involved in storage of the data set within the data file;
assigning, by the processor component, a numerical designation value to each node device of the first quantity of node devices; and
in response to a match between the first and second quantities of node devices, for each data block of the multiple data blocks, performing operations comprising:
retrieving, from the map data, a hashed identifier for one data sub-block indicated by the map data to be within the data block, wherein:
the data sub-block comprises data of the data set that belongs to a partition of the multiple partitions; and
the hashed identifier is derived from a partition label of the partition;
retrieving, from the map data, a data sub-block size for each of the data sub-blocks indicated by the map data to be within the data block;
determining a location of the data block within the data file;
dividing the hashed identifier by the first quantity of node devices to obtain a modulo value; and
transmitting a pointer to a node device of the first quantity of node devices that is assigned a designation value that matches the modulo value, wherein the pointer comprises:
an indication of the location of the data block within the data file; and
a sum of data sub-block sizes of the data sub-blocks within the data block.

22. The computer-implemented method of claim 21, wherein the selection of one of the first quantity node devices comprises a round robin selection of one of the first quantity of node devices.

23. The computer-implemented method of claim 21, wherein in response to the determination that the data set comprises partitioned data and in response to a lack of a match between the first and second quantities of node devices, performing operations comprising:
for each data sub-block within each data block of the multiple data blocks, performing operations comprising:
retrieving, from the map data, the data sub-block size and hashed identifier of the data sub-block;
determining a location of the data sub-block within the data file;
dividing the hashed identifier by the first quantity of node devices to obtain a modulo value; and
providing a pointer to the node of the first quantity of node devices that is assigned a designation value that matches the modulo value, wherein the pointer comprises:
an indication of the location of the data sub-block within the data file; and
the data sub-block size of the data sub-block.

24. The computer-implemented method of claim 21, wherein:
the processor component is incorporated into a node device of the first quantity of node devices; and
the method comprises retrieving, via a network, a portion of the data set from the data file as one of the first quantity of node devices at least partially in parallel with at least one other node device of the first quantity of node devices.

25. The computer-implemented method of claim 24, comprising performing, by the processor component, the processing task with a portion of the data set retrieved from the data file as the one of the first quantity of node devices at least partially in parallel with at least one other node device of the first quantity of node devices.

26. The computer-implemented method of claim 21, wherein:
the data file is maintained by one or more storage devices; and
the method comprises retrieving, from the one or more storage devices through a network, the map data and the metadata.

27. The computer-implemented method of claim 26, wherein retrieving the map data from the data file comprises:
transmitting, via the network, a first command to the one or more storage devices to provide a map base of the data map from the data file;
receiving, via the network, a map base from the data file;
analyzing, by the processor component, the map base to determine whether at least a portion of the map data is stored within one or more map extensions within the data file; and
in response to a determination that at least a portion of the map data is stored within one or more map extensions, performing operations comprising:
transmitting, via the network, a second command to the one or more storage devices to provide at least one map extension of the one or more map extensions; and
receiving, via the network, the at least one map extension from the data file.

28. The computer-implemented method of claim 21, wherein:
the processor component is incorporated into a control device coupled to a grid of multiple node devices; and
the method comprises:
recurringly receiving, via a network, indications of availability to perform processing tasks from each node device of the multiple node devices;
recurringly updating, by the processor component, a stored indication of availability of each node device of the multiple node devices; and
analyzing, by the processor component, the stored indications of availability to identify the first quantity of node devices.

29. The computer-implemented method of claim 28, comprising providing an indication of the processing task to the first quantity of node devices to enable more than one node device of the first quantity of node devices to each perform the processing task with a portion of the data set at least partially in parallel.

30. The computer-implemented method of claim 29, comprising:
receiving, via the network, a request from a node device of the first quantity of node devices for a pointer to a location at which to store a portion of data generated by the performance of the processing task by the first quantity of node devices, wherein the request comprises an indication of size of the portion of the generated data;
deriving, by the processor component, a location within another data file at which to store the portion of generated data based on a sum of sizes of portions of the generated data associated with previously received requests for pointers; and
transmitting, via the network, an indication of the requested pointer to the node device.

* * * * *